(12) United States Patent
Isozaki et al.

(10) Patent No.: US 9,391,961 B2
(45) Date of Patent: Jul. 12, 2016

(54) INFORMATION OPERATING DEVICE, INFORMATION OUTPUT DEVICE, AND INFORMATION PROCESSING METHOD

(71) Applicant: KABUSHIKI KAISHA TOSHIBA, Minato-ku, Tokyo (JP)

(72) Inventors: Hiroshi Isozaki, Kanagawa-ken (JP); Jun Kanai, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

(21) Appl. No.: 13/967,616

(22) Filed: Aug. 15, 2013

(65) Prior Publication Data

US 2014/0052993 A1 Feb. 20, 2014

(30) Foreign Application Priority Data

Aug. 17, 2012 (JP) ................................ 2012-181067

(51) Int. Cl.
*H04L 9/00* (2006.01)
*H04L 9/32* (2006.01)
*H04L 29/06* (2006.01)
*H04L 29/08* (2006.01)

(52) U.S. Cl.
CPC ........ *H04L 63/0428* (2013.01); *H04L 63/0823* (2013.01); *H04L 67/02* (2013.01); *H04L 63/168* (2013.01)

(58) Field of Classification Search
CPC ..... H04L 93/08; H04L 63/10; H04L 63/0428; H04L 63/0823
USPC ............. 713/12–186, 202; 726/2–8; 709/206, 709/225, 229, 249, 389
See application file for complete search history.

(56) References Cited

U.S. PATENT DOCUMENTS

| | | | |
|---|---|---|---|
| 7,484,089 B1* | 1/2009 | Kogen et al. .................. 713/156 |
| 2007/0056025 A1* | 3/2007 | Sachdeva et al. ................. 726/5 |
| 2008/0059607 A1* | 3/2008 | Schneider .............. G06Q 10/06 709/218 |
| 2012/0079551 A1 | 3/2012 | Isozaki et al. |

(Continued)

OTHER PUBLICATIONS

Digital Transmission Licensing Administrator, DTCP vol. 1 Supplement E Mapping DTCP to IP, Revision 1.4 ed1 (Informational Version), Dec. 12, 2011.

(Continued)

*Primary Examiner* — Evans Desrosiers
*Assistant Examiner* — Quazi Farooqui
(74) *Attorney, Agent, or Firm* — Amin, Turocy & Watson LLP

(57) ABSTRACT

An information operating device has a first connection unit, a second connection unit, a machine operating command for operating the information output device and a usage certificate certifying that the machine operating web application, a domain name attacher to attach a domain name of the first communication device, when the connection is established by the second connection unit to transmit the machine operating command for operating the information output device using the connection, an application executing unit to execute the PIN code input web application acquired from the first communication device through the first connection unit, an encryption information generator to generate encryption information and transmit it to the information output device, and a client processing unit to transmit the usage certificate and the encryption information to the information output device through the second connection unit.

18 Claims, 68 Drawing Sheets

(56) References Cited

U.S. PATENT DOCUMENTS

2012/0254352 A1* 10/2012 Ito .................... G06F 17/30902 709/217
2013/0055340 A1 2/2013 Kanai et al.
2013/0318354 A1* 11/2013 Entschew .............. G06F 21/645 713/175

OTHER PUBLICATIONS

High-bandwidth Digital Content Protection System, HDCP Specification Revision 1.4, Jul. 8, 2009.

Japanese Office Action for Japanese Patent Application No. 2012-181067 mailed Jul. 22, 2014.

* cited by examiner

INFORMATION OPERATING DEVICE, INFORMATION OUTPUT DEVICE, AND INFORMATION PROCESSING METHOD

CROSS REFERENCE TO RELATED APPLICATIONS

This application is based upon and claims the benefit of priority from the prior Japanese Patent Application No. 2012-181067, filed on Aug. 17, 2012, the entire contents of which are incorporated herein by reference.

FIELD

Embodiments of the present invention relate to an information operating device, an information output device, and an information output method for transmitting and receiving machine operating commands.

BACKGROUND

Recently, a new technique has been proposed, in which an information operating terminal such as smartphone, tablet, etc. is connected to a TV through an interface to operate the TV.

BRIEF DESCRIPTION OF THE DRAWINGS

FIG. 50 is a block diagram showing the internal configuration of a PIN input Web app distribution server 4a.

DETAILED DESCRIPTION

Embodiments will now be explained with reference to the accompanying drawings.

According to one embodiment, an information operating device has a first connection unit to establish a first connection for acquiring a machine operating web application and a PIN code input web application from a first communication device, a second connection unit to establish a second connection for transmitting, to the information output device, a machine operating command for operating the information output device and a usage certificate certifying that the machine operating web application requesting transmission of the machine operating command has been acquired from a legitimate first communication device, a domain name attacher to attach a domain name of the first communication device transmitting the machine operating web application to a header of the second connection with the information output device, when the second connection is established by the second connection unit to transmit the machine operating command for operating the information output device using the second connection, an application executing unit to execute the PIN code input web application acquired from the first communication device through the first connection unit, execute the machine operating web application acquired through the first connection unit, and receive, from the first communication device, a usage certificate for the machine operating web application, an encryption information generator to generate encryption information and transmit it to the information output device, the encryption information being generated using a common key shared with the information output device, based on random numbers and the PIN code inputted by a user as the result of the execution of the PIN code input web application, and a client processing unit to transmit the usage certificate and the encryption information to the information output device through the second connection unit, and transmit the machine operating command included in the machine operating web application to the information output device through the second connection unit if the usage certificate and the encryption information are judged to be legitimate based on inspection performed by the information output device.

(First Embodiment)

Figure 1:
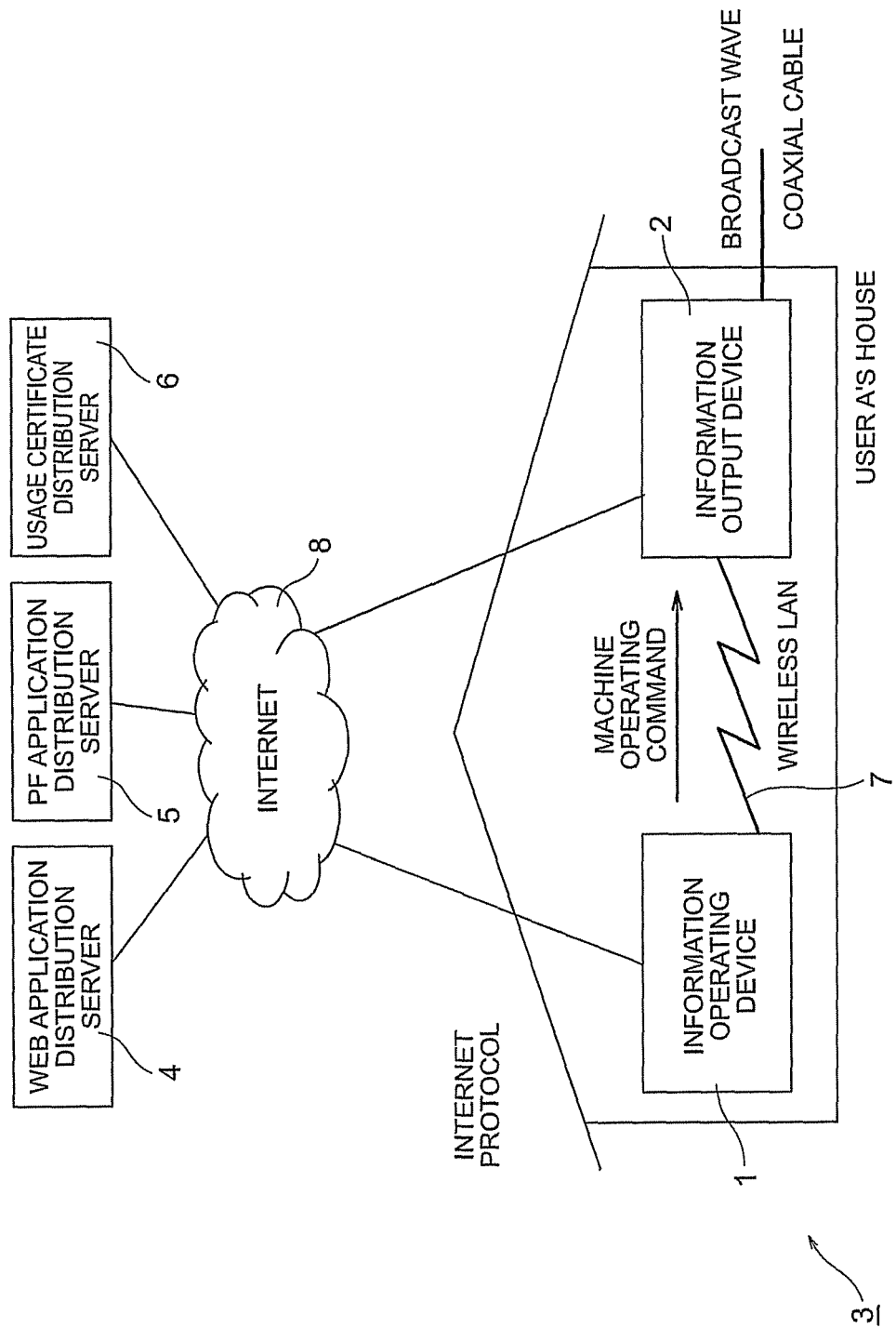
FIG. 1 is a diagram showing a schematic configuration of an information processing system 3 according to a first embodiment.

FIG. 1 is a diagram showing a schematic configuration of an information processing system 3 having an information operating device 1 and an information output device 2 according to a first embodiment. The information processing system 3 of FIG. 1 has the information output device 2 capable of outputting AV data and character information included in broadcast waves as video, the information operating device 1 which operates the information output device 2, a Web app distribution server 4 which distributes a web application (hereinafter referred to as Web application), a PF application distribution server 5 which distributes an application unique to a platform (hereinafter referred to as PF application), and a usage certificate distribution server 6 which distributes a usage certificate is required to operate the information output device 2.

Here, the usage certificate is information certifying that the Web application is a legitimate application developed by a Web application developer having a right to transmit a machine operating command to the information output device 2, and that the Web application is distributed from a legitimate Web application distribution server 4. The usage certificate is issued on a Web-application basis. The usage certificate is not issued corresponding to every Web application, and limited Web applications can utilize the usage certificate, as mentioned later.

The information operating device 1 and the information output device 2 are connected through a wired or wireless network 7. The information operating device 1 transmits, to the information output device 2, a machine operating command for operating various functions of the information output device 2. Further, the information operating device 1 transmits the above usage certificate to the information output device 2 to inform the information output device 2 that the machine operating command is generated from a legitimate Web application.

The information operating device 1 is connected to the Web application distribution server 4, PF application distribution server 5, and usage certificate distribution server 6 through Internet 8, and receives a Web application, a PF application, and a usage certificate from these servers, respectively. The information output device 2 is connected to the usage certificate distribution server 6 through the Internet 8.

Various communication systems such as infrared communication, wireless LAN based on the IEEE 802.11 standard, and Ethernet (registered trademark) can be employed in the physical layer and link layer to transmit the machine operating command from the information operating device 1 to the information output device 2. FIG. 1 shows the wireless LAN 7 as an example.

Note that it does not matter whether these interfaces are wired or wireless. When using the Internet Protocol (IP) in the network layer, it may be IPv4 or IPv6. When the interface is based on IP, a wireless access point or a router (not shown) may be connected between the information operating device 1 and information output device 2. Here, explanation will be given on an example of transmitting the machine operating command from the information operating device 1 to the information output device 2 through the wireless LAN 7. However, the network form should not be particularly limited.

Here, the machine operating command is a command for controlling the functions of the information output device 2, such as a command for controlling a tuner of the information output device 2 (to select a channel of the tuner), a command for adjusting volume, and a command for switching input (to switch between broadcasting tuner input and external input). When the information output device 2 has a function of recording/storing broadcasting content, the machine operating command includes a command for displaying a list of recorded content items, a command for playbacking a specific recorded content item, a command for requesting playback of a specific recorded content item from a specific position, a command for deleting a specific recorded content item, etc.

The information operating device 1 has an IP interface for communicating with the Web application distribution server 4, PF application distribution server 5, and usage certificate distribution server 6, separately from the connection for communicating with the information output device 2. Similarly, the information output device 2 has an IP interface for communicating with the usage certificate distribution server 6, separately from the connection for communicating with the information operating device 1. Such an IP interface is incorporated in an HTTP processing unit processing unit as mentioned later.

Various communication systems such as Ethernet and wireless LAN based on the IEEE 802.11 standard can be employed in the physical layer and link layer of the IP interface. When using the Internet Protocol (IP) in the network layer, it may be IPv4 or IPv6.

Further, the information operating device 1 is connected to the Web application distribution server 4, PF application distribution server 5, and usage certificate distribution server 6 through, e.g., the Internet 8 based on the Internet Protocol (IP). Similarly, the information output device 2 is connected to the usage certificate distribution server 6 through, e.g., the Internet 8 based on the IP.

The information operating device 1 downloads a PF application from the PF application distribution server 5 and downloads a Web application from the Web application distribution server 4, to execute the applications. The information operating device 1 may download a plurality of PF applications from different PF application distribution servers 5, or may download a plurality of Web applications from different Web application distribution servers 4.

Figure 2:
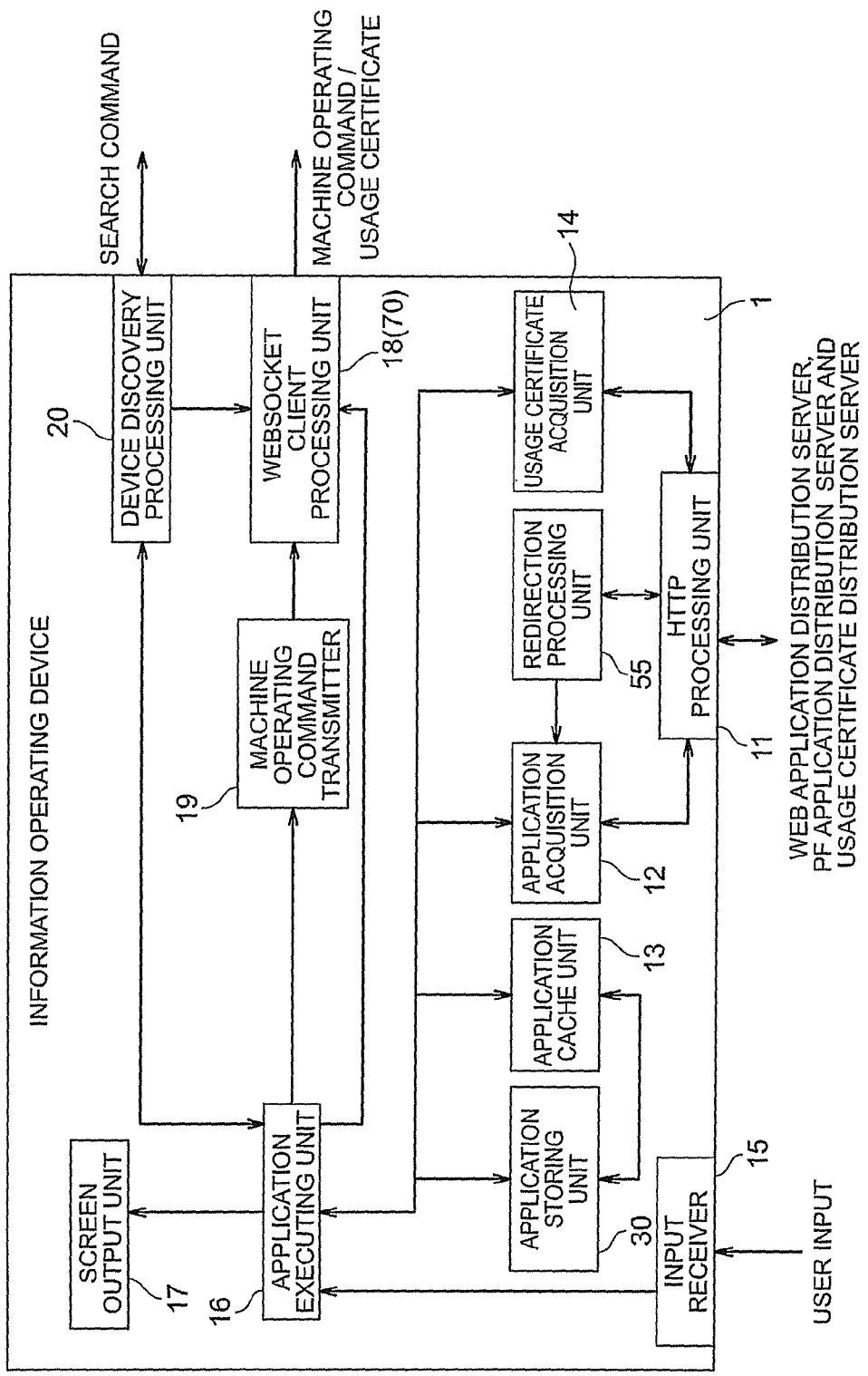
FIG. 2 is an internal block diagram of an information operating device 1 according to the first embodiment.

FIG. 2 is a block diagram showing the internal configuration of the information operating device 1 according to the first embodiment. The information operating device 1 of FIG. 2 has an application storing unit 30, an HTTP processing unit processing unit 11, an application acquisition unit 12, an application cache unit 13, a usage certificate acquisition unit 14, an input receiver 15, an application executing unit 16, a screen output unit 17, a WebSocket client processing unit (client processing unit) 18, a machine operating command transmitter 19, a redirection processing unit 55, and a device discovery processing unit 20.

The application storing unit 30 records cache of PF applications and Web applications, data utilized by the PF application, and data stored by the Web application. The application storing unit 30 records the cache data of the PF applications and Web applications in a hard disk drive in the information operating device 1 or a general-purpose recording medium such as flash memory, external hard disk drive, SD card, etc.

The HTTP processing unit 11 communicates with a Web server (HTTP server) via the HTTP (Hypertext Transfer Protocol) or HTTPS (Hypertext Transfer Protocol over Secure Socket Layer) protocol to perform HTTP client processing, TCP/IP processing, link layer processing, and physical layer processing required to request and acquire a Web application and a usage certificate, as mentioned later.

The HTTP processing unit 11 has a first connection unit which establishes a first connection for acquiring a Web application from the Web application distribution server 4.

The HTTP processing unit 11 transmits a PF/Web application acquisition request (mentioned later) to a predetermined Web server (Web application distribution server 4, PF application distribution server 5) responding to a request from the application acquisition unit 12 (mentioned later), and receives the PF/Web application corresponding to the acquisition request. The HTTP processing unit 11 transmits the received PF application and Web application to the application acquisition unit 12.

The HTTP processing unit 11 transmits a usage certificate acquisition request (mentioned later) to the usage certificate distribution server 6 responding to a request from the usage certificate acquisition unit 14 (mentioned later), and receives the requested usage certificate by the usage certificate acquisition unit 14. The HTTP processing unit 11 transmits the received usage certificate to the usage certificate acquisition unit 14.

The application acquisition unit 12 acquires a PF/Web application from a predetermined Web server (Web application distribution server 4, PF application distribution server 5) using the HTTP processing unit 11, as mentioned later.

The application cache unit 13 stores entire or partial data of the PF application or Web application acquired by the application acquisition unit 12 in the application storing unit 30 as cache. Which parts in the Web application should be stored in the application storing unit 30 as cache should be previously described in a configuration file by the developer of the Web application. The application cache unit 13 stores, in the application storing unit 30, the parts specified by the configuration file as cache.

The usage certificate acquisition unit 14 acquires a usage certificate from the usage certificate distribution server 6 using the HTTP processing unit 11.

The input receiver 15 receives information inputted by a user through an input tool such as touch pad, keyboard, mouse, etc., and notifies the application executing unit 16 about the inputted information.

The application executing unit 16 executes the Web application and PF application acquired by the application acquisition unit 12 or stored in the application storing unit 30. In the case of Web application, the application is executed using a Web browser. Details will be mentioned later.

The screen output unit 17 displays a screen generated by the application executing unit 16 on a monitor (not shown) in the information operating device 1, or outputs the screen to an external output interface. The external output interface shows an interface such as HDMI (High-Definition Multimedia Interface), composite interface, S-Video interface, and component interface.

The WebSocket client processing unit 18 performs client processing for communicating with the information output device 2 in accordance with a protocol called WebSocket (WebSocket) based on the RFC6455 standard. The WebSocket client processing unit 18 processes data (machine operating command, usage certificate) transmitted from the machine operating command transmitter 19 and application executing unit 16, and transmits the data to the information output device 2 after attaching a header etc. thereto in accordance with the format determined by the RFC6455 standard. The WebSocket client processing unit 18 has a domain attacher 70. The domain attacher 70 of the WebSocket client processing unit 18 attaches the domain name (origin information) of a Web application being executed by a Web application executing unit 22 to a WebSocket header (header of WebSocket connection (corresponding to a header of the connection in the claims)). Reasons for this attachment will be mentioned later.

The WebSocket client processing unit 18 has a second connection unit which establishes a second connection for transmitting a machine operating command and a usage certificate to the information output device 2.

The machine operating command transmitter 19 transmits, based on a command from the application executing unit 16, a machine operating command to the information output device 2 using the WebSocket client processing unit 18.

When an HTTP redirection command is included in the message received by the HTTP processing unit 11, the redirection processing unit 55 acquires a URL included in the command, and instructs the application acquisition unit 12 to acquire the Web application specified by the URL.

The device discovery processing unit 20 searches, based on a request from an application, whether another device such as the information output device 2 exists on the network, and if exists, the device discovery processing unit 20 acquires the IP address, TCP port number for WebSocket, etc. of the information output device 2. Concretely, based on a request from an application, the application executing unit 16 transmits a device discovery request to the device discovery processing unit 20, the device discovery processing unit 20 notifies a search result to the application executing unit 16, and the application executing unit 16 notifies the application about the result.

As stated above, the device discovery processing unit 20 has a connection unit which establishes a network session for transmitting a device search request to the information output device 2 and receiving the name, IP address, etc. of the information output device 2 transmitted from the information output device 2. Details of the device discovery will be mentioned later. Note that the device discovery processing unit 20 is not an essential component.

More concretely, the device discovery processing unit 20 has a third connection unit which establishes a network session for acquiring identification information (e.g., ID) of the information output device. After the IP address etc. of the information output device 2 is acquired by this third connection unit, the WebSocket client processing unit 18 establishes a connection for transmitting a machine operating command and a usage certificate to the information output device 2 using the second connection unit, based on the IP address etc. of the information output device 2 received by the device discovery processing unit 20.

Note that the present embodiment is based on the premise that two kinds of application software, that is, a Web application and a platform-specific application (PF application) are provided.

The Web application shows an application executed in the execution environment of a Web, browser capable of interpreting HTML (HyperText Markup Language), JavaScript (registered trademark), etc. Note that the HTML version may be ver. 4 or 5. The Web application generally has a plurality of page files and media files.

Here, the media file shows a file storing moving image data such as JPEG, GIF, and MPEG or a file storing audio data such as MP3. On the other hand, the page file may store control program information such as JavaScript, in addition to displaying text data and layout information of characters, images, etc. described in HTML etc. Further, HTML5 or JavaScript can achieve communication with an HTTP server or a WebSocket server via a protocol called HTTP (XML HTTP Request) or WebSocket.

The platform-specific application shows an application executed not on a Web browser but on an operating system (OS) or a virtual machine (Virtual Machine), which means that the platform-specific application depends on the processing unit, OS, or virtual machine. The platform-specific application is distributed as one file packaging an executable file (executable binary file) of the application and data (e.g., still image data and text data) utilized by the application. Hereinafter, the platform-specific application is referred to simply as PF application.

Figure 3:
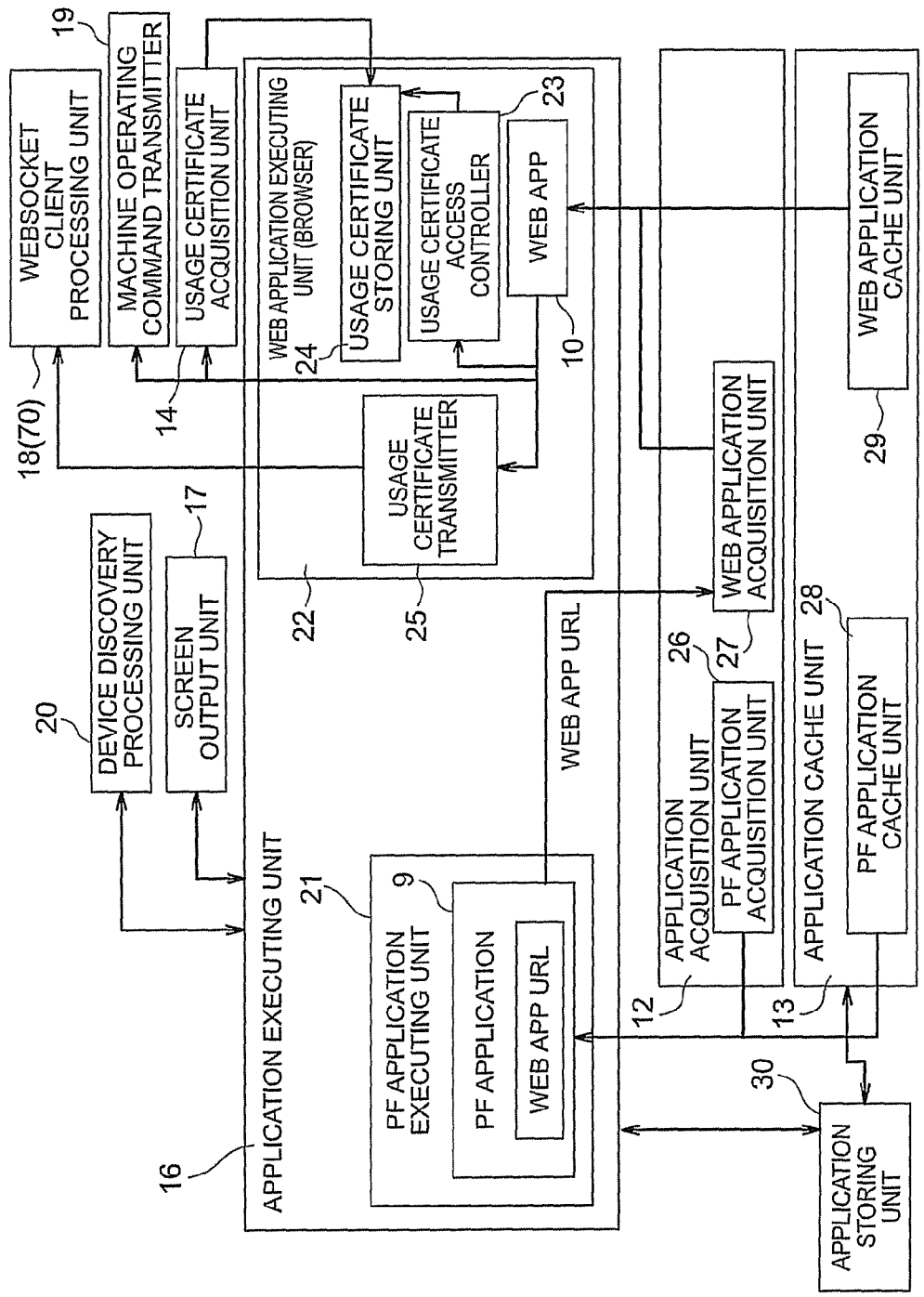
FIG. 3 is an internal block diagram of the information operating device 1.

FIG. 3 is a block diagram showing an example of the internal configuration of the application executing unit 16, application acquisition unit 12, and application cache unit 13 in the information operating device 1.

The application executing unit 16 of FIG. 3 has a PF application executing unit (first application executing unit) 21 which executes a PF application 9, and the Web application executing unit (second application executing unit) 22 which executes a Web application 10.

The Web application executing unit 22 is realized as a general-purpose Web browser having a usage certificate access controller 23, a usage certificate storing unit 24, and a usage certificate transmitter 25.

The application acquisition unit 12 has a PF application acquisition unit (first application acquisition unit) 26 which acquires the PF application 9 by communicating with the Web server (PF application distribution server 5) through the HTTP processing unit 11, and a Web application acquisition unit 27 which acquires the Web application 10 by communicating with the Web server (Web application distribution server 4) also through the HTTP processing unit 11.

The application cache unit 13 has a PF application cache unit 28 which stores the PF application 9 acquired by the PF application acquisition unit 26 in the application storing unit 30, and a Web application cache unit 29 which stores the Web application 10 acquired by the Web application acquisition unit 27 in the application storing unit 30. The function of AppCache in the HTML5 specification defined by the W3C may be utilized as a technique for accumulating the Web application 10 in the application storing unit 30 as cache.

Next, the Web application executing unit 22 will be explained in detail.

The usage certificate storing unit 24 stores, in the application storing unit 30, usage certificates acquired by the usage certificate acquisition unit 14 from the usage certificate distribution server 6.

The Web application executing unit 22 functioning as a Web browser may store the Web application in the application storing unit 30 in the information operating device 1 in accordance with the Web Storage specification currently being standardized by the W3C, or may store the Web application in the application storing unit 30 in the information operating device 1 in accordance with the HTTP Cookie specified by RFC 6265.

The usage certificate access controller 23 manages the usage certificates stored in the usage certificate storing unit 24 with respect to the respective domains of the Web application distribution server 4. The information operating device 1 may possibly communicate with a plurality of Web application distribution servers 4 to acquire and execute a plurality of different Web applications. In order to restrict the Web applications capable of utilizing the usage certificate, the usage certificate distribution server 6 specifies the range of domains of the Web applications permitted to utilize the usage certificate and stores it in the information operating device 1.

Concretely, when storing a usage certificate in the information operating device 1 as Cookie, the usage certificate distribution server 6 should specify the domain name as a parameter of a command for storing Cookie, such as the Set-Cookie header specified by RFC 2965 or RFC6265.

When a Web application requests to utilize a usage certificate stored in the usage certificate storing unit 24, the usage certificate access controller 23 inspects whether the domain name of the Web application is included in the domain range specified by the usage certificate distribution server 6, and if included, the usage certificate access controller 23 permits the Web application to utilize the usage certificate. For example, when the information operating device 1 stores a usage certificate as Cookie, if the usage certificate distribution server 6 specifies "example.foo.bar.com" as a range of utilization (domain), the domain name of the Web application utilizing the usage certificate should show a domain including "example.foo.bar.com" such as "example.foo.bar.com" and "a.example.foo.bar.com". If the domain of the Web application is "foo.foo.bar.com", which is not included in the domain specified by the usage certificate distribution server 6, the usage certificate access controller 23 does not transmit a usage certificate to the Web application requesting to utilize the usage certificate.

Note that when a Web application having a domain name beyond the domain range specified by the usage certificate distribution server 6 requests to utilize a usage certificate accumulated in the usage certificate storing unit 24, Web application receives no reply or receives an error.

The usage certificate transmitter 25 transmits, based on an instruction from a Web application, a usage certificate stored in the usage certificate storing unit 24 to the WebSocket client processing unit 18.

Figure 4:
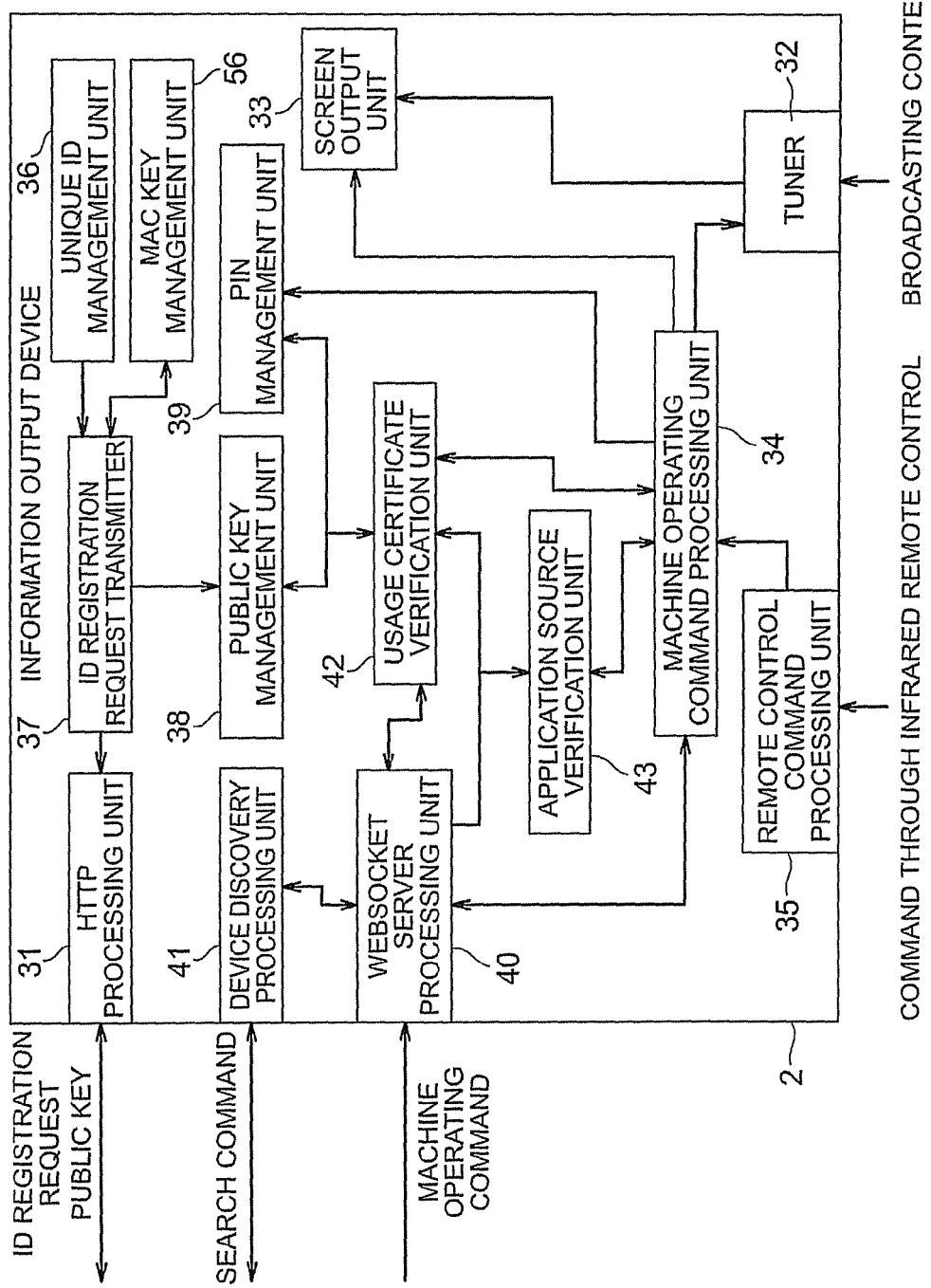
FIG. 4 is an internal block diagram of an information output device 2 according to the first embodiment.

FIG. 4 is a block diagram showing the internal configuration of the information output device 2 according to the first embodiment. The information output device 2 of FIG. 4 has an HTTP processing unit 31, a tuner 32, a screen output unit 33, a machine operating command processing unit 34, a remote control command processing unit 35, a unique ID management unit 36, an ID registration request transmitter 37, a MAC key management unit 56, a public key management unit 38, a PIN management unit 39, a WebSocket server processing unit 40, a device discovery processing unit 41, a usage certificate verification unit 42, and an application source inspection unit 43.

The HTTP processing unit 31 communicates with a Web server (HTTP server) via the HTTP (Hypertext Transfer Protocol) or HTTPS (Hypertext Transfer Protocol over Secure Socket Layer) protocol to perform HTTP client processing, TCP/IP processing, link layer processing, and physical layer processing required to transmit an ID registration request and receive a public key, as mentioned later.

The tuner 32 extracts a specific broadcast program and broadcasting-related information from the broadcast waves received by an antenna etc., and performs a decoding process thereon.

The screen output unit 33 outputs the audiovisual data and audio data outputted from the tuner 32 to a liquid crystal monitor or an external output interface (not shown). The external output interface shows an interface such as HDMI (High-Definition Multimedia Interface), composite interface, S-Video interface, and component interface.

The machine operating command processing unit 34 processes the machine operating command received from the information operating device 1 or an infrared remote control, controls the tuner 32, and transmits an instruction for switching the video etc. to be displayed on the screen output unit 33.

The remote control command processing unit 35 processes a command received from an infrared remote control (not shown), and notifies the machine operating command processing unit 34 about the command. Note that the remote control command processing unit is not an essential component.

The unique ID management unit 36 manages an ID unique to the information output device 2. The unique ID may be written in the information output device 2 before shipped from the factory, may be stored as random numbers generated using a random number generator (not shown) when the information output device 2 is started for the first time, may be the Ethernet physical address (MAC address) of the HTTP processing unit 31, may be random numbers generated based on the MAC address, or may be stored as random numbers generated using a random number generator (not shown) when the information output device 2 receives a command for generating a unique ID through an infrared remote control based on an instruction from the user. The unique ID may be generated by employing any one of the above techniques or by employing the combination of above techniques.

The ID registration request transmitter 37 communicates with the usage certificate distribution server 6 via the HTTP protocol. The ID registration request transmitter 37 attaches the unique ID managed by the unique ID management unit 36 to a message requesting a public key, transmits the message to the usage certificate distribution server 6 as a registration request, and receives the public key from the usage certificate distribution server 6 as a response.

The MAC key management unit 56 manages a common key shared with the usage certificate distribution server 6, and generates a message authentication code (MAC) using the key. Note that the MAC key management unit 56 is not an) essential component.

The public key management unit 38 stores and manages the public key received from the usage certificate distribution server 6.

The PIN management unit 39 manages a password (a PIN code, more concretely, a PIN code, which is hereinafter referred to simply as PIN). The PIN value may be written in the information output device 2 before shipped from the factory, may be random numbers generated by the information output device 2 using a random number generator (not shown), may be random numbers generated using a random number generator (not shown) when the information output device 2 receives a command for generating a PIN through an infrared remote control based on an instruction from the user, may be character string data or numerical string data received by the information output device 2 through an infrared remote control based on an instruction from the user, or may be random numbers generated based on the MAC address of the HTTP processing unit. The PIN value may be generated by employing any one of the above techniques or by employing the combination of above techniques.

The WebSocket server processing unit 40 performs server processing for communicating with the information operating device 1 in accordance with a protocol called WebSocket based on the RFC6455 standard. The WebSocket server processing unit 40 receives data transmitted from the information operating device 1 such as a usage certificate, and allocates the data to the usage certificate verification unit 42, application source inspection unit 43, and machine operating command processing unit 34.

As a response to a device search request from the information operating device 1, the device discovery processing unit 41 returns the name and IP address of the information output device 2 and the TCP port number of the WebSocket server processing unit 40, as mentioned later. The protocol to be used for device search may be selected based on the DLNA (Digital Living Network Alliance) standard or the UPnP (Universal Plug and Play) standard or a name search method using NetBIOS (Network Basic Input Output System). As stated above, the device discovery processing unit 41 has a connection unit which establishes a network session for returning the name, IP address, etc. of the information output device 2 responding to a device search request from the information operating device 1. Note that the device discovery processing unit 41 is not an essential component.

The usage certificate verification unit 42 verifies whether the usage certificate transmitted from the information operating device 1 and received by the WebSocket server processing unit 40 is legitimate, and notifies the machine operating command processing unit 34 about the verification result. The verification performed by the usage certificate verification unit 42 will be mentioned in detail later.

The application source inspection unit 43 inspects whether header information included in the machine operating command transmitted from the information operating device 1 and received by the WebSocket server processing unit 40 is legitimate, and notifies the machine operating command processing unit 34 about the inspection result. The inspection performed by the application source inspection unit 43 will be mentioned in detail later.

Figure 5:
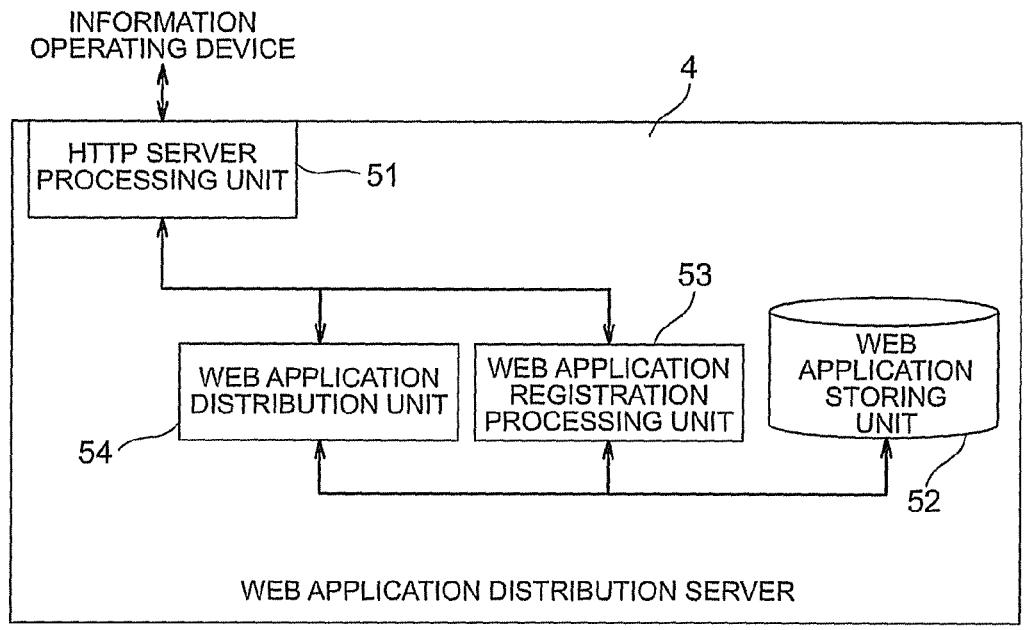
FIG. 5 is an internal block diagram of a Web app distribution server 4 according to the first embodiment.

FIG. 5 is a block diagram showing the internal configuration of the Web application distribution server 4 according to the first embodiment. The Web application distribution server 4 communicates with the information operating device 1 via the HTTP or HTTPS protocol, and distributes a Web application in accordance with a request from the information operating device 1. The Web application distribution server 4 of FIG. 5 has an HTTP server processing unit 51, a Web application storing unit 52, a Web application registration processing unit 53, and a Web application distribution unit 54.

The HTTP server processing unit 51 communicates with the information operating device 1 via the HTTP or HTTPS protocol, and performs HTTP server processing, TCP/IP processing, link layer processing, and physical layer processing required to handle a Web application acquisition request and to distribute the Web application.

The Web application storing unit 52 stores Web applications, each of which is attached with a unique ID (Web application ID).

The Web application registration processing unit 53 stores Web applications in the Web application storing unit 52. FIG. 5 shows an example of storing a Web application through the network using the HTTP server processing unit 51, but the Web application should not necessarily be stored through the network, and may be stored through an external memory such as a USB memory. Note that the Web application registration processing unit 53 is not an essential component.

When the Web application distribution unit 54 is instructed by the information operating device 1 through the network to transmit a Web application specified by a unique application ID, the Web application distribution unit 54 searches the Web application corresponding to the specified ID from the Web applications stored in the Web application storing unit 52, and transmits various resources of the Web application to the information operating device 1 through the HTTP server processing unit 51. Note that the unique application ID may be a URL.

Note that the Web application distribution server 4 may distribute a plurality of Web applications. In this case, the Web applications may be stored in the same domain of the Web application distribution server 4, or may be stored in different domains. Storing a plurality of Web applications in the same domain shows storing Web application X and Web application Y in the domain of "domain1.example-Webserver.com", for example. As a concrete example, the URL for acquiring Web application X is set to "http://domain1.example-Webserver.com/appidX/", while the URL for acquiring Web application Y is set to "http://domain1.example-Webserver.com/appidY/".

As another example, the URL for acquiring Web application X may be set to "http://domain1.example-Webserver.com/appid=X", while the URL for acquiring Web application Y may be set to "http://domain1.example-Webserver.com/appid=Y".

Storing a plurality of Web application in different domains shows storing Web application X in the URL of "http://appX.example-Webserver.com" while storing Web application Y in the URL of "http://appY.example-Webserver.com", for example. Note that, in this embodiment, explanation will be given on an example of storing a plurality of Web applications in the same domain.

Figure 6:
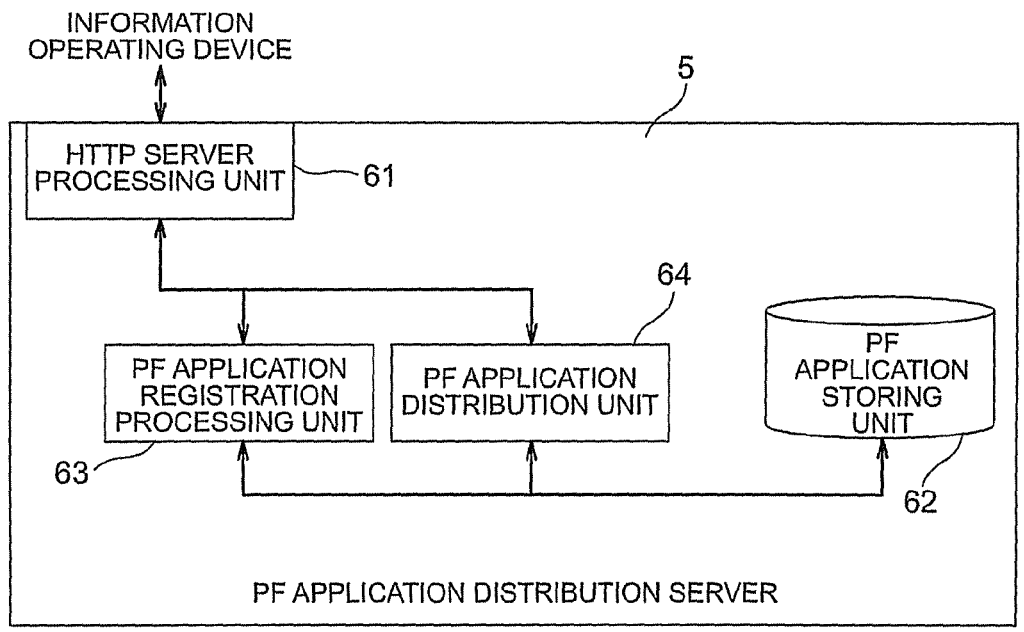
FIG. 6 is an internal block diagram of a PF app distribution server 5 according to the first embodiment.

FIG. 6 is a block diagram showing the internal configuration of the PF application distribution server 5 according to the first embodiment. The PF application distribution server 5 communicates with the information operating device 1 via the HTTP or HTTPS protocol, and distributes a PF application based on a request from the information operating device 1. The PF application distribution server 5 of FIG. 6 has an HTTP server processing unit 61, a PF application storing unit 62, a PF application registration processing unit 63, and a PF application distribution unit 64.

The HTTP server processing unit 61 functions similarly to the HTTP server processing unit 51 of the Web application distribution server 4.

The PF application storing unit 62 stores PF applications, each of which is attached with a unique ID. As stated above, a Web application generally consists of a plurality of resources (files) such as still image data and text data. A PF application is distributed as one compressed file containing those resources. Therefore, the PF application is provided as one PF application file corresponding to the unique ID.

The PF application registration processing unit 63 stores (registers) PF applications in the PF application storing unit 62. FIG. 6 shows an example of registering a PF application through the network using the HTTP server processing unit 61, but the PF application should not necessarily be registered through the network, and may be registered through an external memory such as a USB memory. Note that the PF application registration processing unit 63 is not an essential component.

When the PF application distribution unit 64 is instructed by the information operating device 1 through the network to transmit a PF application specified by a unique application ID, the PF application distribution unit 64 searches the PF application corresponding to the specified ID from the PF applications accumulated in the PF application storing unit 62, and transmits the file corresponding to the PF application to the information operating device 1 through the HTTP server processing unit 61.

Figure 7A:
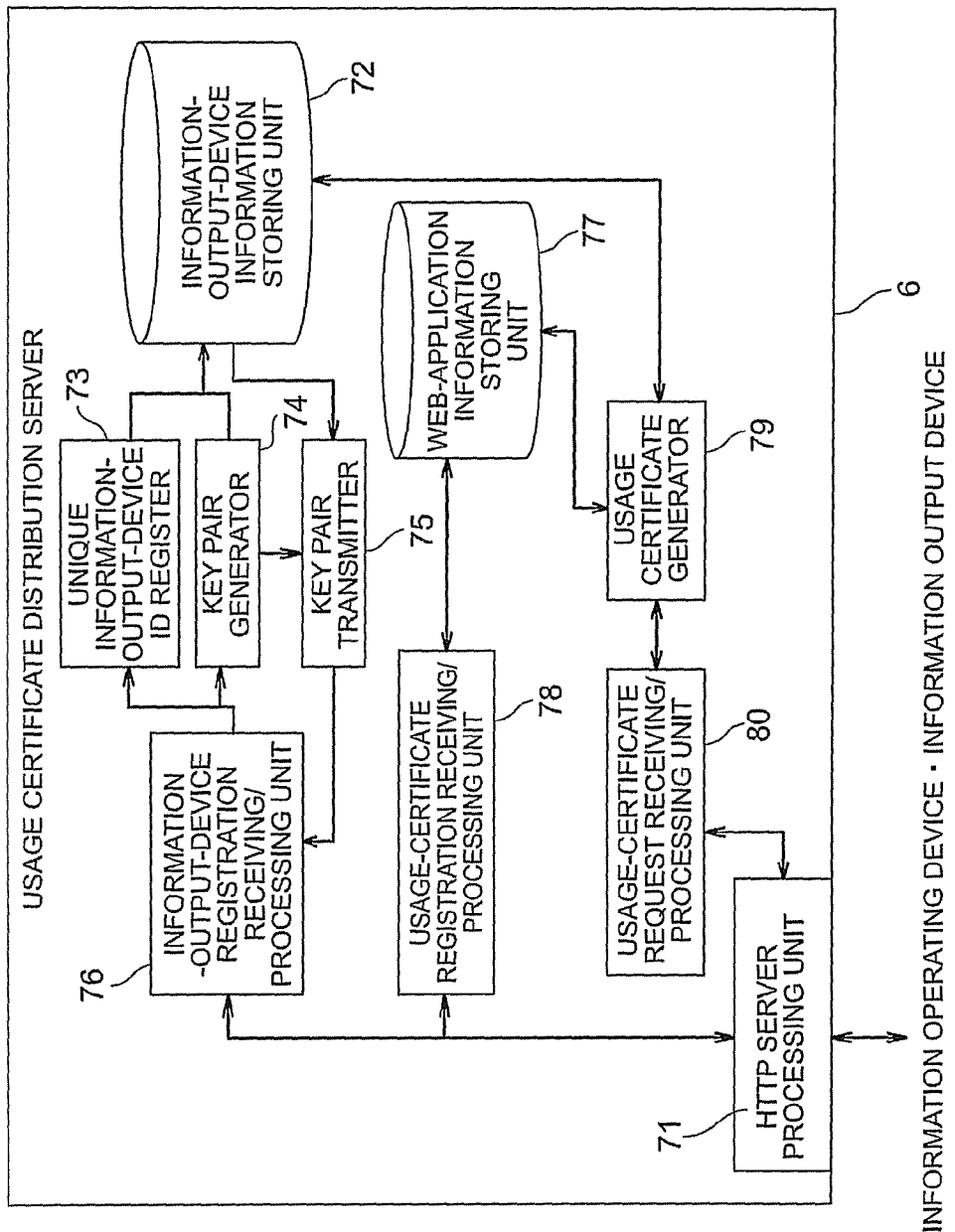
FIG. 7A is an internal block diagram of a usage certificate distribution server 6 according to the first embodiment.

FIG. 7A is a block diagram showing the internal configuration of the usage certificate distribution server 6 according to the first embodiment. The usage certificate distribution server 6 communicates with the information operating device 1 and information output device 2 via the HTTP or HTTPS protocol to distribute a usage certificate to the information operating device 1 and to distribute a public key to the information output device 2. The usage certificate distribution server 6 of FIG. 7A has an HTTP server processing unit 71, an information-output-device information storing unit 72, a unique information-output-device ID register 73, a key pair generator 74, a key pair transmitter 75, an information-output-device registration receiving/processing unit 76, a Web-application information storing unit 77, a usage-certificate registration receiving/processing unit 78, a usage certificate generator 79, and a usage-certificate request receiving/processing unit 80.

The HTTP server processing unit 71 communicates with the information operating device 1 via the HTTP or HTTPS protocol, and performs HTTP server processing, TCP/IP processing, link layer processing, and physical layer processing required to handle a usage certificate acquisition request and to distribute the usage certificate. Further, the HTTP server processing unit 71 communicates with the information output device 2 via the HTTP or HTTPS protocol, and performs HTTP server processing, TCP/IP processing, link layer processing, and physical layer processing required to receive a registration request message transmitted from the information output device 2 and to distribute a public key as a response to the message. The HTTP server processing unit 71 receives a registration request message from the information output device 2 to pass it to the information-output-device registration receiving/processing unit 76, receives a usage certificate generation request from the information operating device 1 to pass it to the usage-certificate request receiving/processing unit 80, and receives a usage certificate registration request message to pass it to the usage-certificate registration receiving/processing unit 78.

The information-output-device information storing unit 72 stores and manages the unique ID of each information output device 2 and a public key pair corresponding thereto.

The unique information-output-device ID register 73 stores, in the information-output-device information storing unit 72, an ID which is unique to the information output device 2 and included in a registration request message transmitted from a screen generator.

When the unique information-output-device ID register 73 registers the ID unique to the information output device 2 in the information-output-device information storing unit 72, the key pair generator 74 generates a public key pair and registers the public key pair and the unique ID of the information output device 2 in the information-output-device information storing unit 72 as a set. Here, a well-known public key algorithm such as RSA encryption algorithm and elliptic curve cryptography should be used.

Of the generated public key pair, a public key is transmitted to the information output device 2, and a secret key is managed by the usage certificate distribution server 6 and used when generating a signature for a usage certificate.

The key pair transmitter 75 acquires a public key generated by the key pair generator 74 or registered in the information-output-device information storing unit 72 as a response to a registration request message. When a public key corresponding to the unique ID included in the registration request message is not registered in the information-output-device information storing unit 72 yet, the public key is acquired from the key pair generator 74. When the public key is already registered in the information-output-device information storing unit 72, it is acquired from the information-output-device information storing unit 72.

Note that the key pair generator 74 may register every key pair in the information-output-device information storing unit 72 so that the key pair transmitter 75 can acquire a public key from the information-output-device information storing unit 72.

Further, when transmitting a public key to the information output device 2, the usage certificate distribution server 6 may generate a message authentication code secret key (hereinafter referred to simply as MAC key) to attach a message authentication code created using the MAC key to the public key, to prevent the value of the public key from being falsified on the communication path between the information output device 2 and usage certificate distribution server 6. Here, a well-known algorithm such as HMAC-MD5 and HMAC-SHA1 should be used to generate a message authentication code. This MAC key has the same value as a key stored in the MAC key management unit 56 of the information output device 2. Note that the usage certificate distribution server 6 may manage a MAC key with respect to each information output device 2, or may manage the same MAC key with respect to a plurality of information output devices 2.

The information-output-device registration receiving/processing unit 76 receives a registration request message transmitted from the information output device 2, and transmits, to the information output device 2, a public key corresponding to the unique ID included in the registration request message as a response.

When the registration request message is transmitted from the information output device 2 already registered in the information-output-device information storing unit 72, a new key pair generated by the key pair generator 74 may be registered in the information-output-device information storing unit 72, or the public key corresponding to a unique ID accumulated in the information-output-device information storing unit 72 may be transmitted instead of generating a new key pair.

The Web-application information storing unit 77 stores a usage certificate corresponding to each Web application, that is, each Web application ID. The Web-application information storing unit 77 receives the domain name corresponding to a Web application ID from the usage-certificate registration receiving/processing unit 78, and stores the domain name and Web application ID as a pair. That is, the unique ID of a Web application and the domain name of the Web application are stored in the Web-application information storing unit 77 as a pair. The usage certificate and domain name will be mentioned later.

The usage-certificate registration receiving/processing unit 78 registers a usage certificate. FIG. 7A shows an example of registering a usage certificate through the network using the HTTP server processing unit 71, but the usage certificate should not necessarily be registered through the network, and may be registered through an external memory such as a USB memory. Note that the usage-certificate registration receiving/processing unit is not an essential component. In this state of registration, no signature is attached to the usage certificate.

The usage certificate generator 79 acquires, from the Web-application information storing unit 77, a usage certificate corresponding to the unique Web-application ID included in a usage certificate request message, and generates a usage certificate attached with a signature generated for the usage certificate, Web application ID, and PIN included in the usage certificate request message, using the secret key stored in the secret key management unit. As an option a signature method may be attached in addition to the signature.

The usage-certificate request receiving/processing unit 80 receives a usage certificate request message transmitted from the information operating device 1, and transmits a usage certificate attached with a signature to the information operating device 1 as a response to the message.

In the example of FIG. 1, the Web application distribution server 4, PF application distribution server 5, and usage certificate distribution server 6 are shown as separate devices, but these three servers may be integrated into one device. That is, at least arbitrary two of these three servers may be integrated into one device.

Figure 7B:
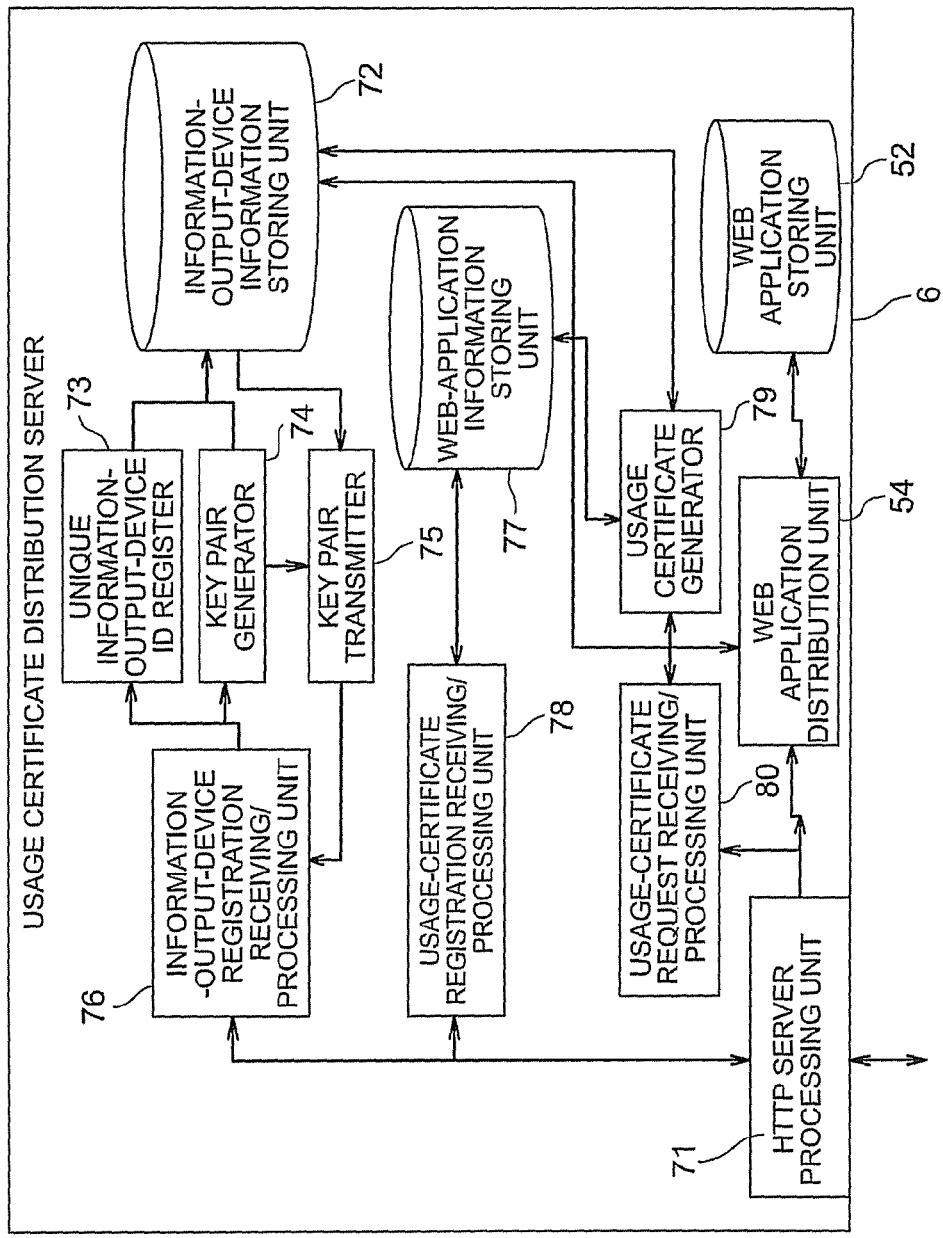
FIG. 7B is an internal block diagram of the usage certificate distribution server 6 according to a modification example.

FIG. 7B is a block diagram showing the internal configuration of the usage certificate distribution server 6 having functions of the Web application distribution server 4 shown in FIG. 5. FIG. 7B is different from FIG. 7A in newly having the Web application storing unit 52 and Web application distribution unit 54. The Web application storing unit 52 has the same functions as the Web application storing unit 52 in the Web application distribution server 4 shown in FIG. 5. When the unique ID of the information output device 2 is included in a Web application acquisition request message, the Web application distribution unit 54 checks whether information about the information output device 2 having the unique ID is registered in the information-output-device information storing unit 72, and if included, distributes the requested Web application, which is a function added to the functions of the Web application distribution unit 54 shown in FIG. 5. This makes it possible to prevent the Web application from being distributed from an illegitimate device transmitting a Web application acquisition request together with a unique ID of the information output device 2 which is not registered in the usage certificate distribution server 6.

Figure 8:
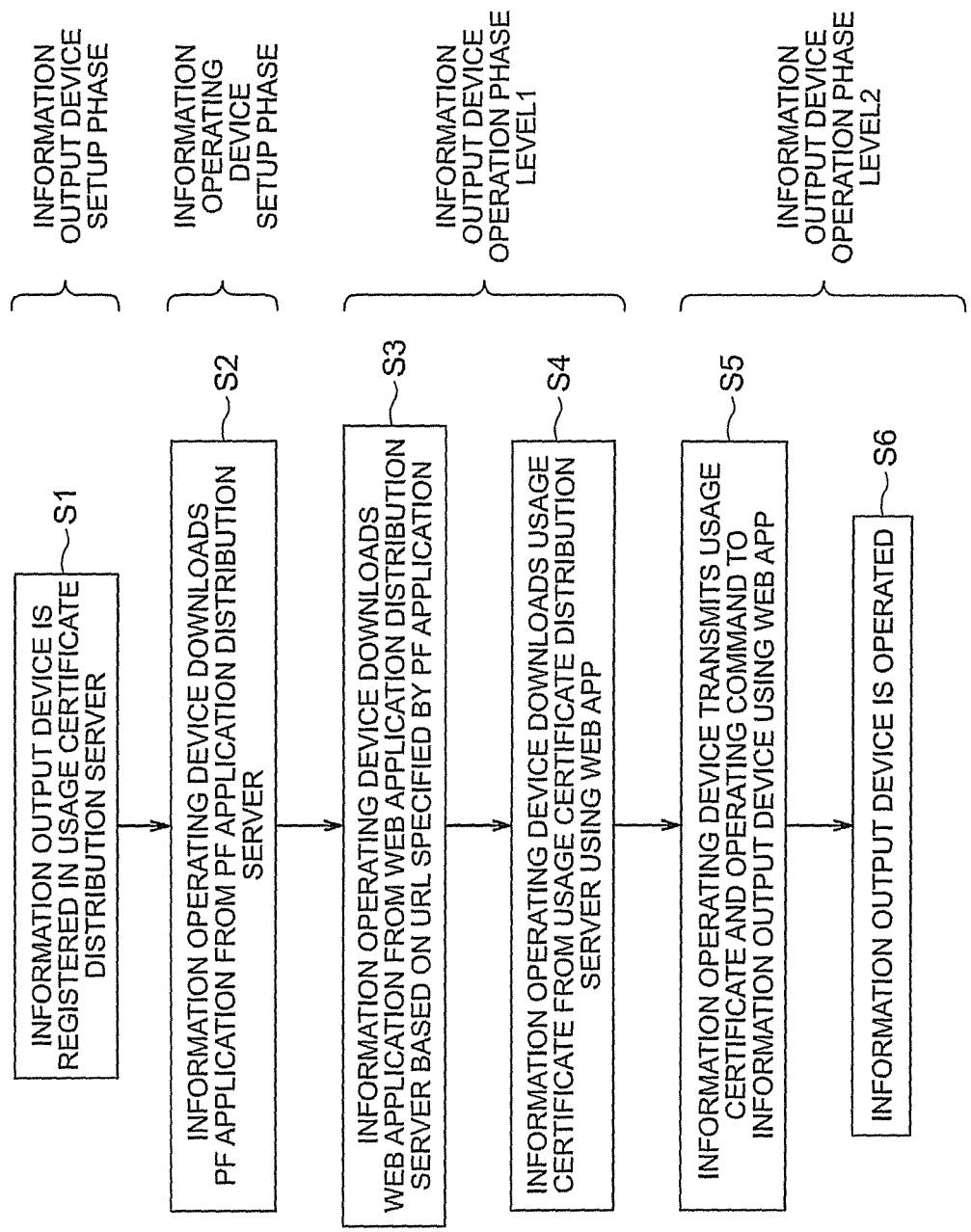
FIG. 8 is a flow chart showing the processing steps performed in the first embodiment.

FIG. 8 is a flow chart showing the processing steps performed by the information operating device 1, information output device 2, usage certificate distribution server 6, PF application distribution server 5, and Web application distribution server 4 according to the first embodiment. As shown in FIG. 8, the process sequence briefly consists of three phases, which are an information-output-device setup phase (Step S1), an information-operating-device setup phase (Step S2), and an information-output-device operation phase (Steps S3 to S6). Here, the whole process sequence will be shown first, and the process sequence in each phase will be mentioned in detail later.

In the information-output-device setup phase, the information output device 2 communicates with the usage certificate distribution server 6, and registers the information output device 2 in the usage certificate distribution server 6.

In the information-operating-device setup phase, the information operating device 1 communicates with the PF application distribution server 5, and downloads a PF application from the PF application distribution server 5 to install it in the information operating device 1.

The information-output-device operation phase is classified into two phases of Level 1 (Steps S3 and S4) and Level 2 (Steps S5 and S6). In Level 1, the information operating device 1 communicates with the Web application distribution server 4 to download a Web application from the Web application distribution server 4 (Step S3), and the information operating device 1 downloads a usage certificate from the usage certificate distribution server 6 (Step S4).

Note that the PF application installed in the information-operating-device setup phase has triggers the information operating device 1 to download and execute a Web application.

In Level 2, the information operating device 1 communicates with the information output device 2 (Step S5), and the information operating device 1 transmits a machine operating command to the information output device 2 to control the information output device 2 (Step S6).

Figure 9:
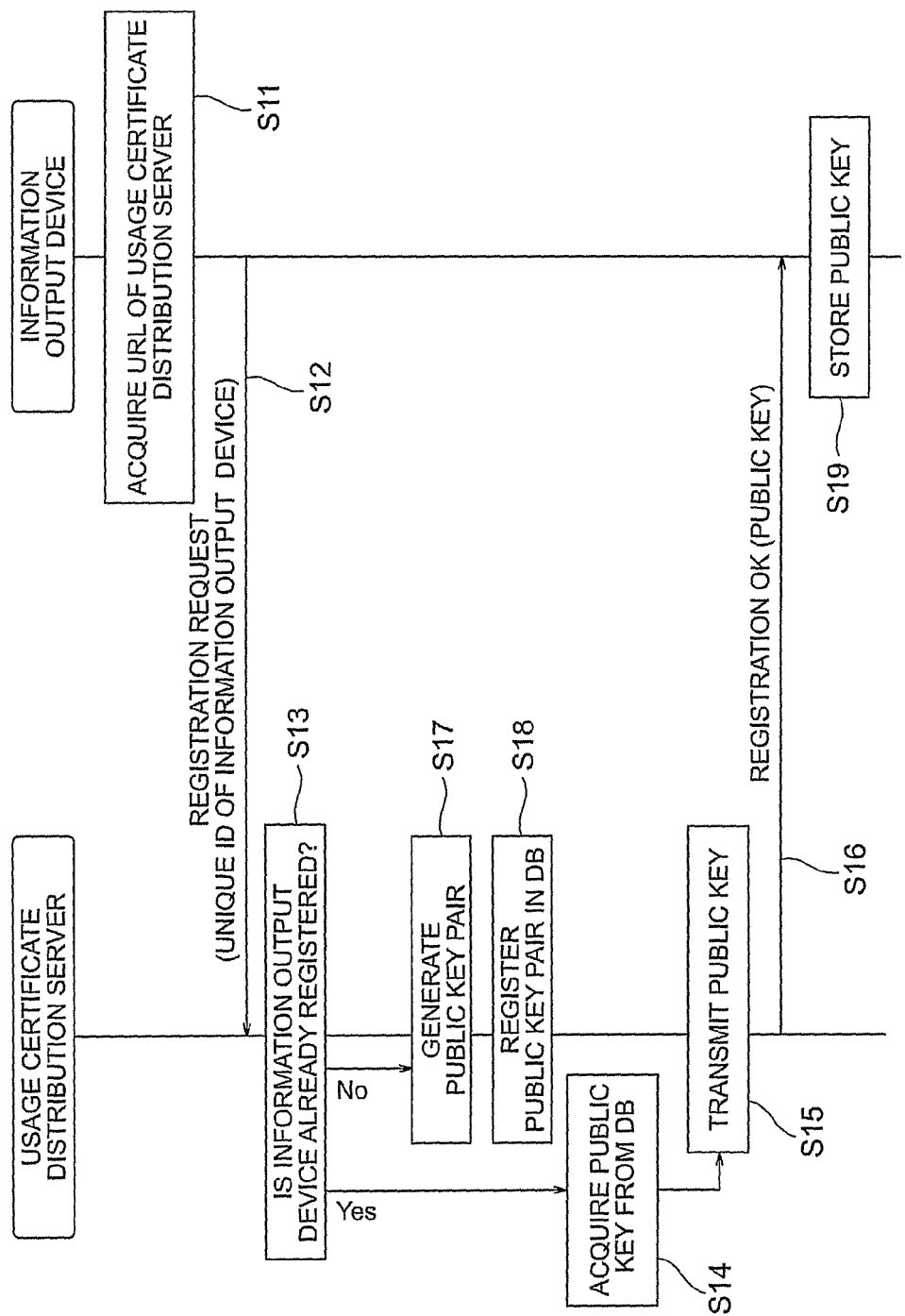
FIG. 9 is a sequence diagram of the processes performed in an information-output-device setup phase according to the first embodiment.

FIG. 9 is a sequence diagram showing the processing steps performed by the information output device 2 and usage certificate distribution server 6 in the information-output-device setup phase according to the first embodiment.

First, the information output device 2 acquires the URL of the usage certificate distribution server 6 (Step S11), accesses the acquired URL using the HTTP processing unit 31 via the HTTP (or HTTPS) protocol, and transmits, to the usage certificate distribution server 6, the unique ID of the information output device 2 managed by the unique ID management unit 36 together with a registration request for the unique ID of the information output device 2 (Step S12). This message should be transmitted as an HTTP GET request. The following is an example of this message.

http://example-CAserver.com/register.php?device_id=xxxx

This message is transmitted to the usage certificate distribution server 6, specifying that the server name of the usage certificate distribution server 6 is "example-CAserver.com", and the unique ID of the information output device 2 is a value of "xxxx" labeled with device_id. The URL of the usage certificate distribution server 6 may be registered in the information output device 2 before shipped from the factory, may be inputted by the user through infrared remote control, or may be described in the top Web page accessed by the information output device 2 as link information.

In order to prevent the unique ID in the registration request message from being falsified on the communication path between the information output device 2 and usage certificate distribution server 6, a message authentication code may be generated using a common key which is shared between the information output device 2 and the usage certificate distribution server 6 and managed by the MAC key management unit 56. The following is an example of how to calculate the message authentication code generated by the information output device 2.

signature=keyed_hash (key, device_id)

Here, "key" shows the common key shared with the usage certificate distribution server 6, "device_id" shows the unique ID of the information output device 2, and "signature" shows the value obtained by calculating "device_id" using key based on a keyed_hash algorithm. Here, a "keyed_hash" algorithm such as HMAC-SHA1, HMAC-MD5, HMAC-SHA256, etc. should be utilized.

The following is an example of the registration request message which is attached with a message authentication code by the information output device 2 and transmitted to the usage certificate distribution server 6.

http://example-CAserver.com/
register.php?device_id=xxxx
&signature=yyyy&signature_method=hmac-sha1

In this example, a value of "yyyy" labeled with signature is attached to the URL as a message authentication code, and the algorithm for generating the message authentication code is notified to the usage certificate distribution server 6. In this example, a value of "hmac-sha1" labeled with signature_method shows that the information output device 2 generates the message authentication code utilizing the HMAC-SHA1 algorithm.

Next, when the usage certificate distribution server 6 receives the registration request, the information-output-device registration receiving/processing unit 76 extracts the unique ID included in the registration request message, and inspects whether the public key pair corresponding to the unique ID is registered in the information-output-device information storing unit 72 (Step S13).

If already registered, this registration request is judged to be the second or subsequent request and the public key is acquired from the information-output-device information storing unit 72 (Step S14), and then a response message including the public key is transmitted to the information output device 2 (Steps S15 and S16).

If not registered yet, the usage certificate distribution server 6 judges the registration request to be the first request from the information output device 2 having that unique ID, and generates a public key pair (Step S17), registers the public key pair and unique ID in the information-output-device information storing unit 72 as a set (Step S18), and transmits a response message including only a public key of the generated public key pair (Steps S15 and S16).

The following is an example of the body of the response message to the HTTP GET request.

pubkey=xyxyxy

In the above example, a value of "xyxyxy" labeled with pubkey is transmitted as a public key.

In order to prevent the message from being falsified on the communication path, a message authentication code may be attached thereto, as in the case of the registration request message. The following is an example of the response message to the registration request message.

pubkey=xyxyxy&signature=zyzyzy&signature_method=hmac-sha1

In the above example, a value of "zyzyzy" labeled with signature is a message authentication code generated by the usage certificate distribution server 6 utilizing a common key shared with the information output device 2, based on the HMAC-SHA1 algorithm.

The information output device 2 receives the public key and stores it in the public key management unit 38 (Step S19). This public key is used in the information-output-device operation phase.

Figure 10:
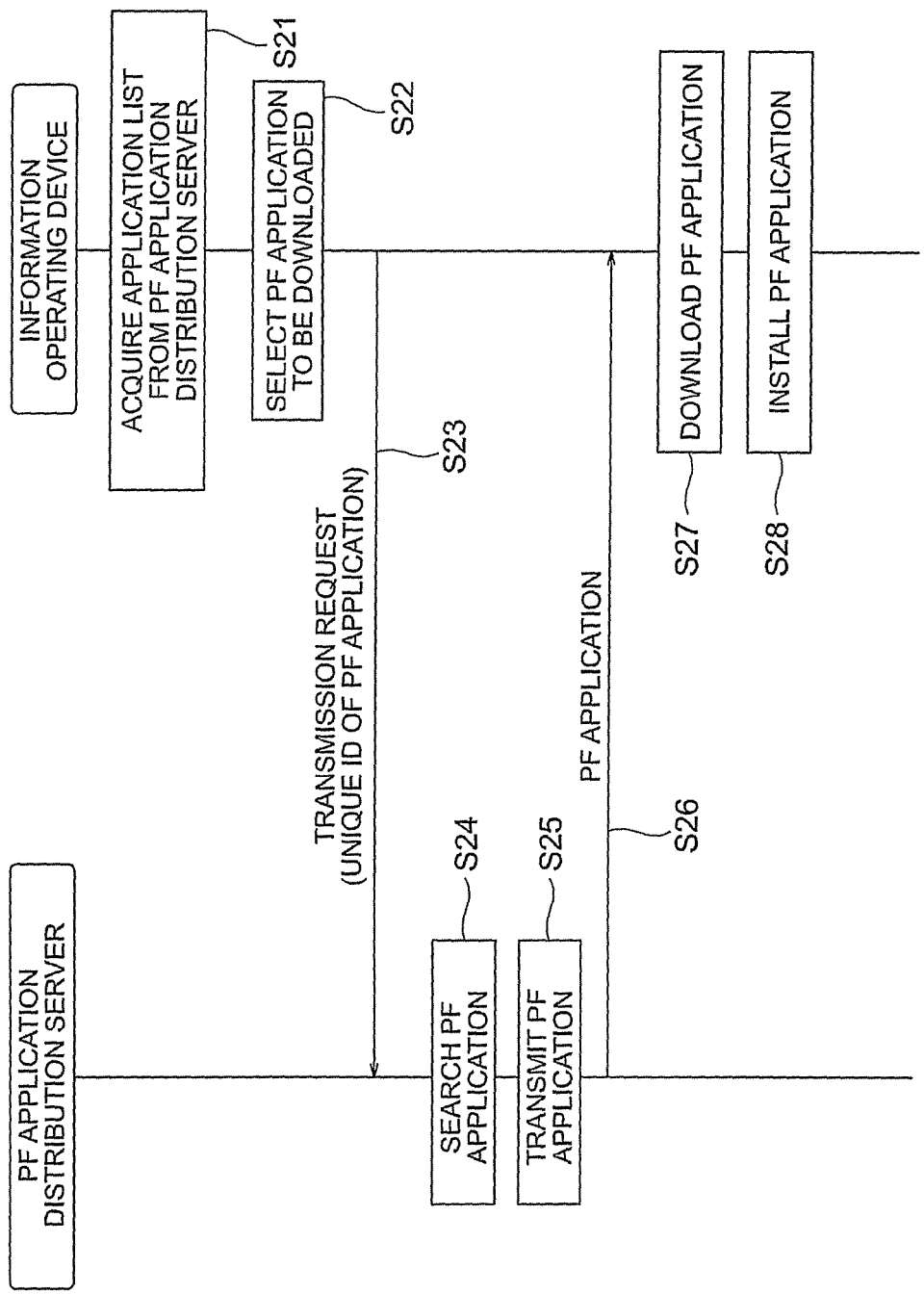
FIG. 10 is a sequence diagram of the processes performed in an information-operating-device setup phase according to the first embodiment.

FIG. 10 is a sequence diagram showing the processing steps performed by the information operating device 1 and PF application distribution server 5 in the information-operating-device setup phase according to the first embodiment.

When a PF application for operating the information output device 2 is previously installed in the information operating device 1, there is no need to carry out the sequence shown in FIG. 10.

Figure 11:
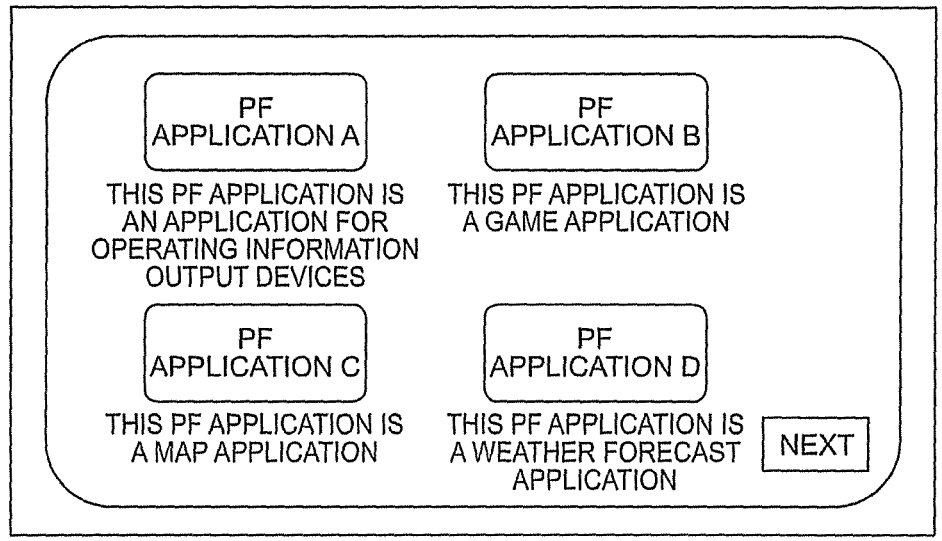
FIG. 11 is a diagram showing an example of how to display a PF app list.

First, the information operating device 1 acquires a PF application list from the PF application distribution server 5 (Step S21). FIG. 11 shows a display example of the PF application list outputted to the screen of the screen output unit 17 in the information operating device 1. The screen of this application list should be generated by the Web application executing unit 22 using Web content, for example. In this case, Web content for displaying the list should be acquired from the PF application distribution server 5 based on the URL previously set for the device before shipment.

In the example shown in FIG. 11, a list of PF applications are displayed using icons, and simple explanation is described under each icon. The user of the information operating device 1 selects a PF application utilizing mouse, touch pad, etc. for the input receiver 15 (Step S22). In the example of FIG. 11, assume that PF application A, which is a PF application for operating the information output device 2, is selected. Then, a PF application transmission request (URL) including the unique application ID related to PF application A is transmitted from the information operating device 1 to the PF application distribution server 5 (Step S23). The information operating device 1 transmits the PF application transmission request to the PF application distribution server 5 using the HTTP processing unit 31 via the HTTP (or HTTPS) protocol.

The PF application distribution server 5 searches and acquires a PF application having the unique application ID specified by the information operating device 1 from the PF applications stored in the PF application storing unit 62 (Step S24), and the PF application distribution unit 64 transmits the acquired PF application to the information operating device 1 as a response to the application transmission request (Step S25).

The information operating device 1 downloads PF application A from the PF application distribution server 5 utilizing the PF application acquisition unit 26 (Step S26), and installs PF application A (Step S27). The installed PF application A is stored in the application storing unit 30.

Figure 12:
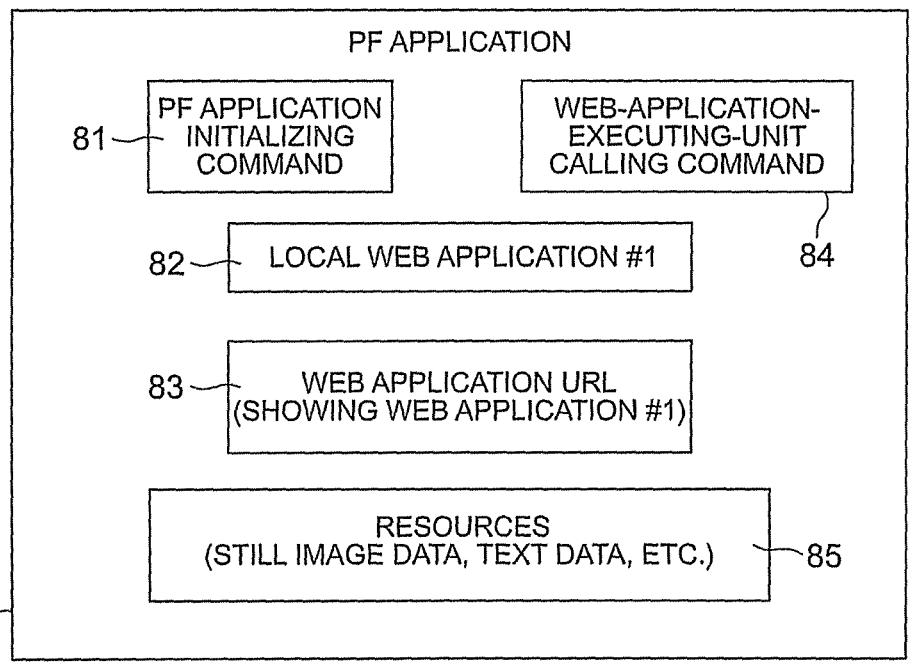
FIG. 12 is a diagram showing the structure of a PF app according to the first embodiment.

FIG. 12 is a diagram showing the configuration of a PF application according to the first embodiment. The PF application has a PF application initializing command 81, a local Web application #1 82, a Web application URL 83, a Web-application-executing-unit calling command 84, and resources 85.

The PF application initializing command 81 is a program to perform a general process such as an initializing process executed first when executing a PF application by the PF application executing unit 21, and to call the Web-application-executing-unit calling command 84.

The local Web application #1 82 inspects whether its usage certificate is stored in the usage certificate storing unit 24 of the information operating device 1. This local Web application #1 82 is described in HTML4/5 or JavaScript, and executed by the Web application executing unit (browser) 22 of the information operating device 1. The local Web application may be included in the package of a PF application, or may be stored in the Web application distribution server 4 to be acquired by the application acquisition unit 12 through the network. In the latter case, the local Web application is not included in the PF application.

The Web application URL 83 is a URL showing the location of Web application #0. When the Web application is distributed while being included in the package of a PF application, the URL shows the location in the information operating device 1 where the local Web application is stored. When the Web application is stored in the Web application distribution server 4, the URL shows the location in the Web application distribution server 4 where the local Web application is stored. First, explanation will be given on the case of distributing a Web application included in the package of a PF application.

The Web-application-executing-unit calling command 84 is a program to start the Web application executing unit 22 using the Web application URL 83 as an argument. That is, the Web application shown by the Web application URL 83 is executed by the Web application executing unit 22.

The resources 85 are the icon (still image data), explanation, version number, etc. of the PF application used when displaying a list of PF applications installed in the information operating device 1.

Figure 13:
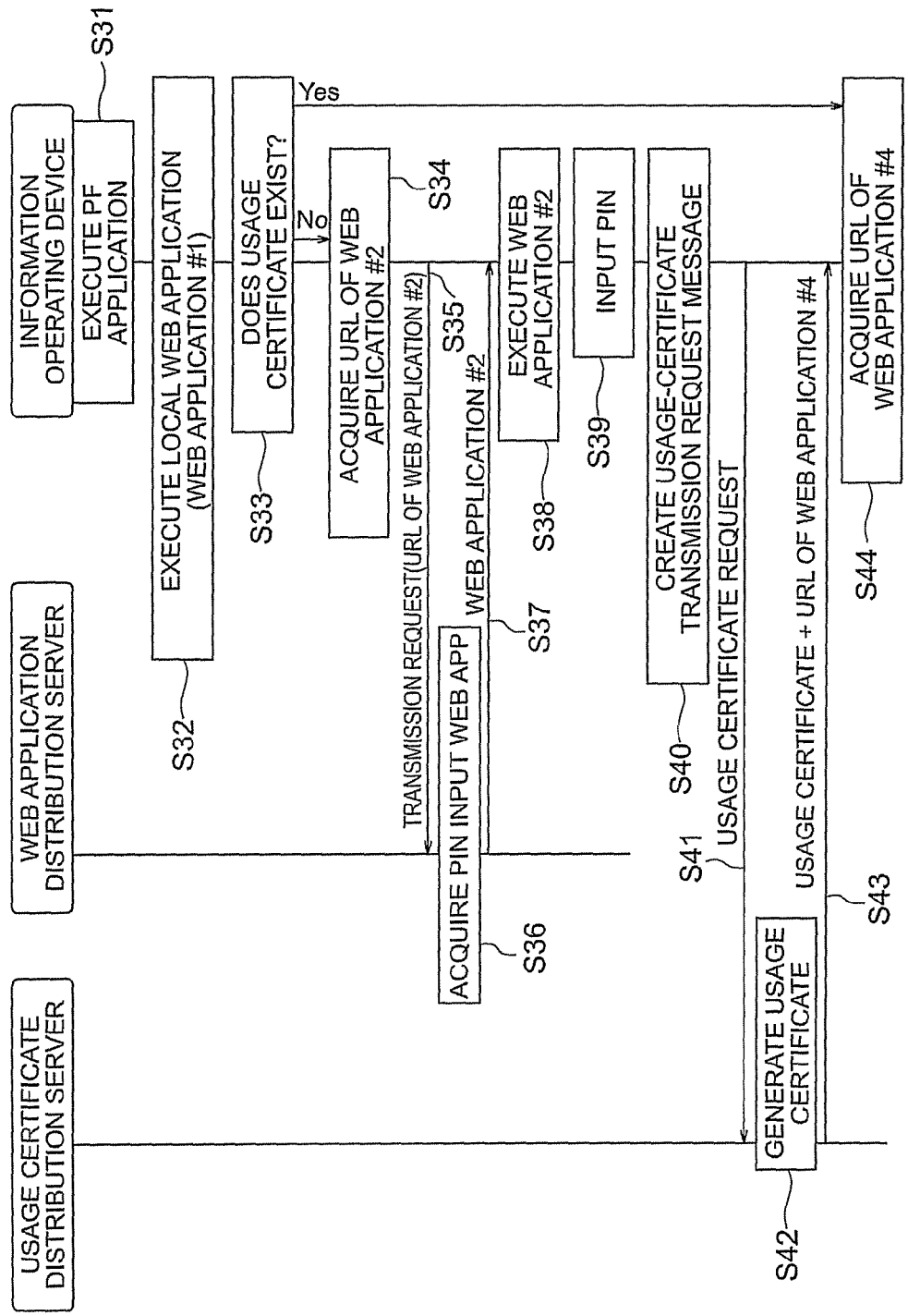
FIG. 13 is a sequence diagram of the processes performed in an information-output-device operation phase according to the first embodiment.

FIG. 13 is a sequence diagram showing the processing steps performed by the information operating device 1, Web application distribution server 4, and usage certificate distribution server 6 in the information-output-device operation phase (level 1) according to the first embodiment.

First, the information operating device 1 executes a PF application by the PF application executing unit 21 (Step S31).

The PF application is triggered to be executed when the PF application is selected through the input receiver 15. The PF application performs an initializing process etc. by the PF application initializing command 81, and executes the Web-application-executing-unit calling command 84. The Web-application-executing-unit calling command 84 executes a local Web application (Web application #1) included in the PF application and specified by the Web application URL 83, by using the Web application executing unit 22 (Step S32). Subsequent steps are performed by the Web application executing unit 22.

Next, the information operating device 1 executes the local Web application (Web application #1). As stated above, Web application #1 inspects whether its usage certificate is stored in the usage certificate storing unit 24 of the information operating device 1 (Step S33). When judging that the usage certificate is not stored in the usage certificate storing unit 24, Web application #1 refers to the URL of Web application #2 described in the local Web application #1 82 (Step S34), and acquires the Web application (Web application #2) shown by the URL from the Web application distribution server 4 to execute it (Steps S35 and S36). Concretely, the information operating device 1 transmits a Web application transmission request to the Web application distribution server 4 using the HTTP processing unit 31 via the HTTP (or HTTPS) protocol, and acquires a Web application (Web application #2) from the Web application distribution server 4 to execute it.

In this example, Web application #2 is stored in the Web application distribution server 4, and thus the information operating device 1 acquires Web application #2 from the Web application distribution server 4 (Step S37), and executes it by the Web application executing unit 22 (Step S38).

When judging that the usage certificate is stored in the usage certificate storing unit 24, Web application #1 refers to the URL of Web application #4 described in the local Web application #1 82, and executes the Web application (Web application #4) shown by the URL.

Before Web application #1 inspects whether its usage certificate is stored in the usage certificate storing unit 24, the information output device 2 to be operated may be searched utilizing the device discovery processing unit 20 of the information operating device 1, to acquire the ID unique to the searched information output device 2.

Figure 14:
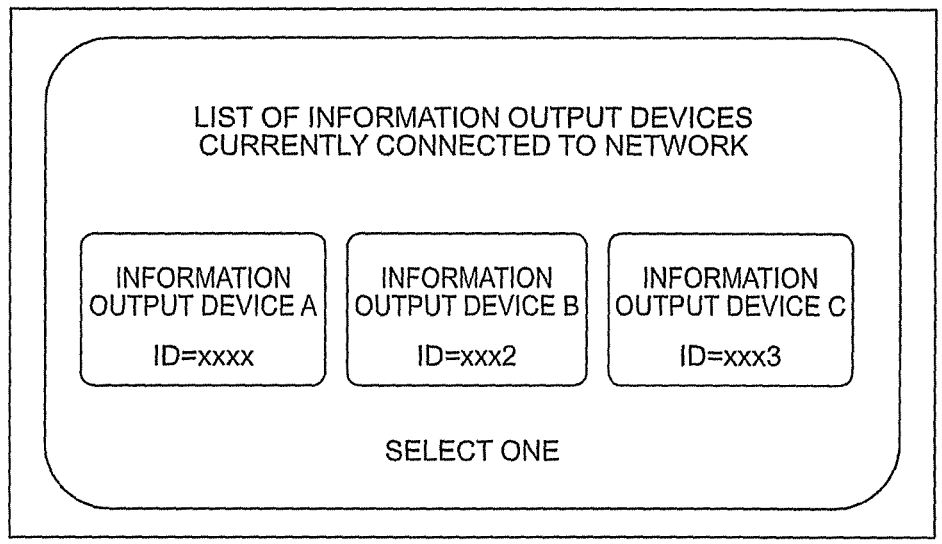
FIG. 14 is a diagram showing an example of a list of acquired information output devices 2 displayed as icons.

FIG. 14 shows an example of a list of information output devices 2 which are acquired through the search by the device discovery processing unit 20 and displayed as icons on the screen of the screen output unit 17 in the information operating device 1. The user of the information operating device 1 selects one information output device 2 through the input receiver 15 utilizing mouse, touch pad, etc. Here, assume that an information output device 2A is selected.

Next, Web application #2 will be explained. Web application #2 is a Web application (PIN input Web application) which provides an interface for inducing the user to input a PIN through the input receiver 15 of the information operating device 1 to transmit it to the usage certificate distribution server 6. The following is an example of the URL transmitted by the information operating device 1 to the Web application distribution server 4 to acquire Web application #2 at Step S35.

http://example-Webserver.com/input_pin. php?appid=X

In this example, a Web application acquisition request is transmitted to the Web application distribution server 4 of "example-Webserver.com" specifying "X" as the unique Web-application ID.

The following is another example of the URL.

http://example-Webserver.com/appidX/

In these examples, each Web application has a different PIN input user interface, but a plurality of Web applications may use the same PIN input user interface.

Further, when transmitting a request for acquiring Web application #2, the ID unique to the information output device 2 may be attached thereto. As mentioned later, the ID unique to the information output device 2 is required in a usage certificate request message transmitted from the information operating device 1 to the usage certificate distribution server 6. When requesting to acquire Web application #2, if the ID unique to the information output device 2 is transmitted to the Web application distribution server 4 so that the Web application distribution server 4 returns Web application #2 together with the unique ID, the unique ID can be utilized again in a usage certificate request message, which leads to an advantage that the information operating device 1 is not required to store the ID unique to the information output device 2.

The following is an example of the URL attached with the unique ID of the information output device 2 to be transmitted to the Web application distribution server 4 in order to acquire Web application #2.

http://example-Webserver.com/
input_pin.php?device_id=xxxx&appid=X

When the Web application distribution server 4 has the functions of the usage certificate distribution server 6 as shown in FIG. 7B, it is possible that the Web application distribution server 4 receives the ID unique to the information output device 2, judges whether the unique ID is registered in the information-output-device information storing unit 72, and if registered, distributes Web application #2. This makes it possible to reject an acquisition request for Web application #2 (PIN input Web application) from an illegitimate Web application.

Figure 15:
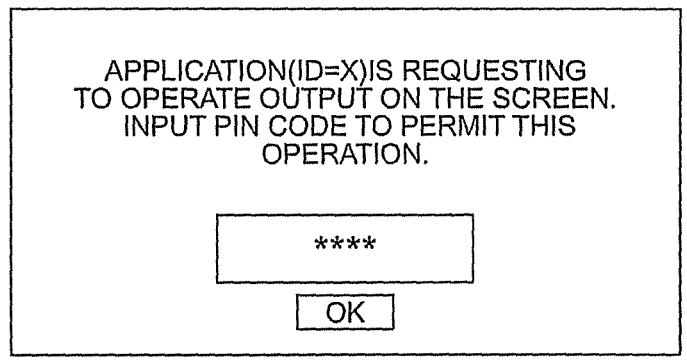
FIG. 15 is a diagram showing a message inducing a user to input the PIN of the information output device 2.

Next, as shown in FIG. 15, Web application #2 displays a message inducing the user to input the PIN of the information output device 2 on the screen of the screen output unit 17 in the information operating device 1 (Step S39). When the PIN of the information output device 2 is inputted through the input receiver 15, Web application #2 generates a usage certificate request message (Step S40), and transmits it to the usage certificate distribution server 6 (Step S41). The information operating device 1 transmits the usage certificate request message to the usage certificate distribution server 6 using the HTTP processing unit 31 via the HTTP (or HTTPS) protocol. The following is an example of the usage certificate request message transmitted from the information operating device 1 to the usage certificate distribution server 6.

https://example-CAserver.com/
req_token.php?deviceid=xxxx&appid=X &pin=ZZZZ

In this example message to the usage certificate distribution server 6 of "example-CAserver.com," a value of "xxxx" labeled with device_id is specified as the ID unique to the information output device 2, a value of "X" labeled with appid is specified as the unique Web-application ID, and a value of "ZZZZ" labeled with pin is specified as the value inputted through the input receiver 15.

Upon receiving the usage certificate request message from the information operating device 1, the usage certificate distribution server 6 generates a usage certificate by the usage certificate generator 79 using the data stored in the information-output-device information storing unit 72 and Web-application information storing unit 77 (Step S42).

Figure 16:
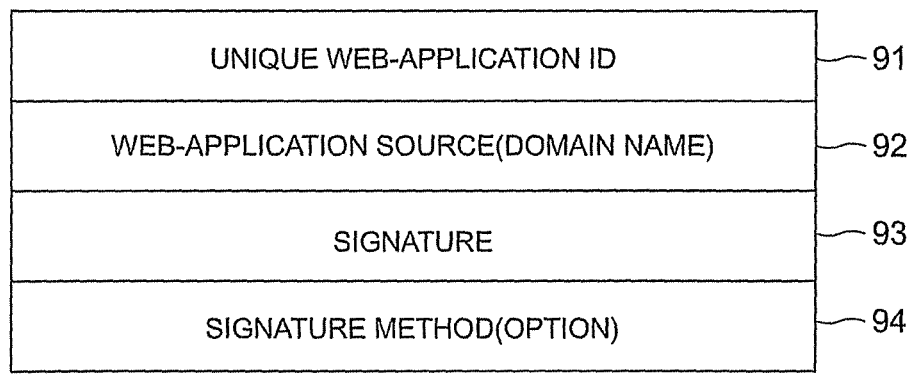
FIG. 16 is a diagram showing a format example of a usage certificate.

FIG. 16 is a diagram showing a format example of the usage certificate. The usage certificate has a unique Web-application ID 91, a Web-application source (domain name) 92, and a signature 93, as essential fields. The unique Web-application ID 91 is a value included in the usage certificate request message transmitted from the information operating device 1. The Web-application source 92 is the domain name of a Web server serving as a transmitter of a Web application (Web application #4) for transmitting a machine operating command to the information output device 2, as mentioned later.

The usage certificate distribution server 6 uses the usage certificate generator 79 to acquire, from the information-output-device information storing unit 72, the secret key corresponding to the unique ID of the information output device 2 included in the usage certificate request message transmitted from the information operating device 1. Further, the usage certificate generator 79 acquires, from the Web-application information storing unit 77, the domain name of a Web application corresponding to the unique Web-application ID included in the usage certificate request message transmitted from the information operating device 1. Then, the usage certificate generator 79 calculates a hash value for the unique Web-application ID, domain name of the Web application, and PIN value included in the usage certificate request message transmitted from the information operating device 1, to generate the signature 93 in accordance with a public key encryption method utilizing the secret key acquired from the information-output-device information storing unit 72. In this case, a well-known algorithm such as MD5 and SHA1 should be used to generate the hash value, and a well-known algorithm such as RSA and elliptic curve cryptography should be used to generate the signature 93. The following is an example of how to calculate the signature.

Signature=rsa(secret key, sha1(unique Web-application ID||Web-application domain name||PIN))

"Secret key" is the secret key which is unique to the information output device 2 and acquired from the information-output-device information storing unit 72, and this value is as a secret key to calculate "signature." A target data to make the signature is obtained by combining the unique Web-application ID, Web-application domain name, and PIN using the SHA1 algorithm. Based on the result of the calculation, the signature is obtained using the RSA algorithm. In the example shown here, the RSA algorithm is used to calculate the signature, but another well-known public key algorithm such as elliptic curve cryptography may be used.

Note that information about a signature method 94 may be attached as optional information to show which hash/signature algorithm is used to generate the signature 93. The usage certificate distribution server 6 transmits the usage certificate and the URL of Web application #4 to the information operating device 1 as a response to the usage certificate request message (Step S43). HTTP redirect may be used to transmit the URL of Web application #4 from the usage certificate distribution server 6 to the information operating device 1. In the case of HTTP redirect, the URL is included in the Location header of an HTTP response. This URL is related to the unique Web-application ID and stored in the Web-application information storing unit 77 of the usage certificate distribution server 6. Since the unique Web-application ID is included in the usage certificate request message from the information operating device 1, the usage-certificate request receiving/processing unit 80 acquires a URL from the Web-application information storing unit 77 based on this unique Web-application ID, and includes the acquired URL in the Location header. Upon receiving the HTTP redirect, the information operating device 1 acquires the URL included in the Location header by the redirection processing unit 55, and instructs the application acquisition unit 12 to acquire the Web application specified by the URL. Since the URL includes information about the usage certificate, the Web application specified by the URL can acquire the usage certificate as an argument of the URL.

As shown at Step S41, the usage certificate is transmitted together with the URL of Web application #4. That is, it is important that the usage certificate can be acquired only by Web application #4 by using the HTTP redirect.

As explained above, the Web application distribution server 4 may store a plurality of Web applications in the same domain. In this case, Web application X and Web application Y are distributed from the same domain name of the Web application distribution server 4, and the Web-application source included in usage certificates has the same value.

When Web application X and Web application Y have the same source, if Web application Y acquires a usage certificate for Web application X and uses it to transmit a machine operating command to the information output device 2 in the information-output-device operation phase (level 2), the information output device 2 distinguishes the Web application from the usage certificate and interprets that the usage certificate is transmitted from Web application X based on the application ID included in the usage certificate, which means that the information output device 2 does not operate properly. Since Web application X and Web application Y have different application IDs, it is required to prevent Web application Y from acquiring and utilizing the usage certificate for Web application X. If the usage certificate distribution server 6 specifies the Web application acquiring the usage certificate by its URL utilizing the HTTP redirect, the usage certificate distribution server 6 can restrict the Web application capable of acquiring a usage certificate. In other words, if the URL of Web application X is specified by the HTTP redirect when transmitting a usage certificate for Web application X to the information operating device 1, the usage certificate for Web application X can be acquired only by Web application X. This makes it possible to prevent a usage certificate from being acquired by a Web application different from the Web application specified by the usage certificate distribution server 6 using the HTTP redirect. In this way, Web application Y is prohibited from acquiring the usage certificate for Web application X, and the information output device 2 does not mistake the Web application as mentioned above.

The information operating device 1 stores the usage certificate in the usage certificate storing unit 24, and executes Web application #4 by the Web application executing unit 22 (Step S44).

Figure 17:
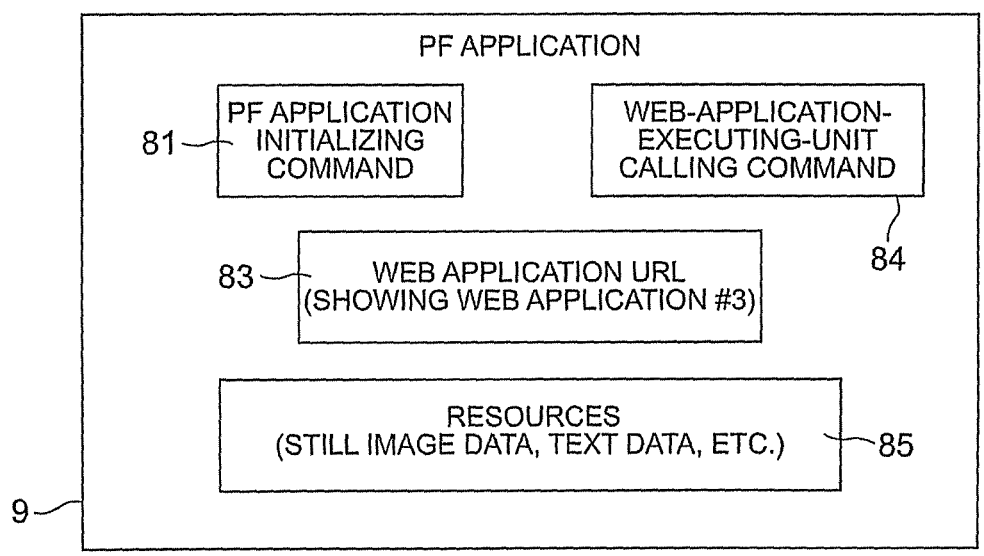
FIG. 17 is a block diagram of a PF app including no local Web application.

In the above explanation, the PF application distributed by the PF application distribution server 5 includes a local Web application, but the local Web may be omitted. FIG. 17 is a block diagram showing a configuration of a PF application including no local Web application. FIG. 17 is different from FIG. 12 in that the local Web application #1 82 is omitted and the Web application URL 83 has a different value.

Figure 18:
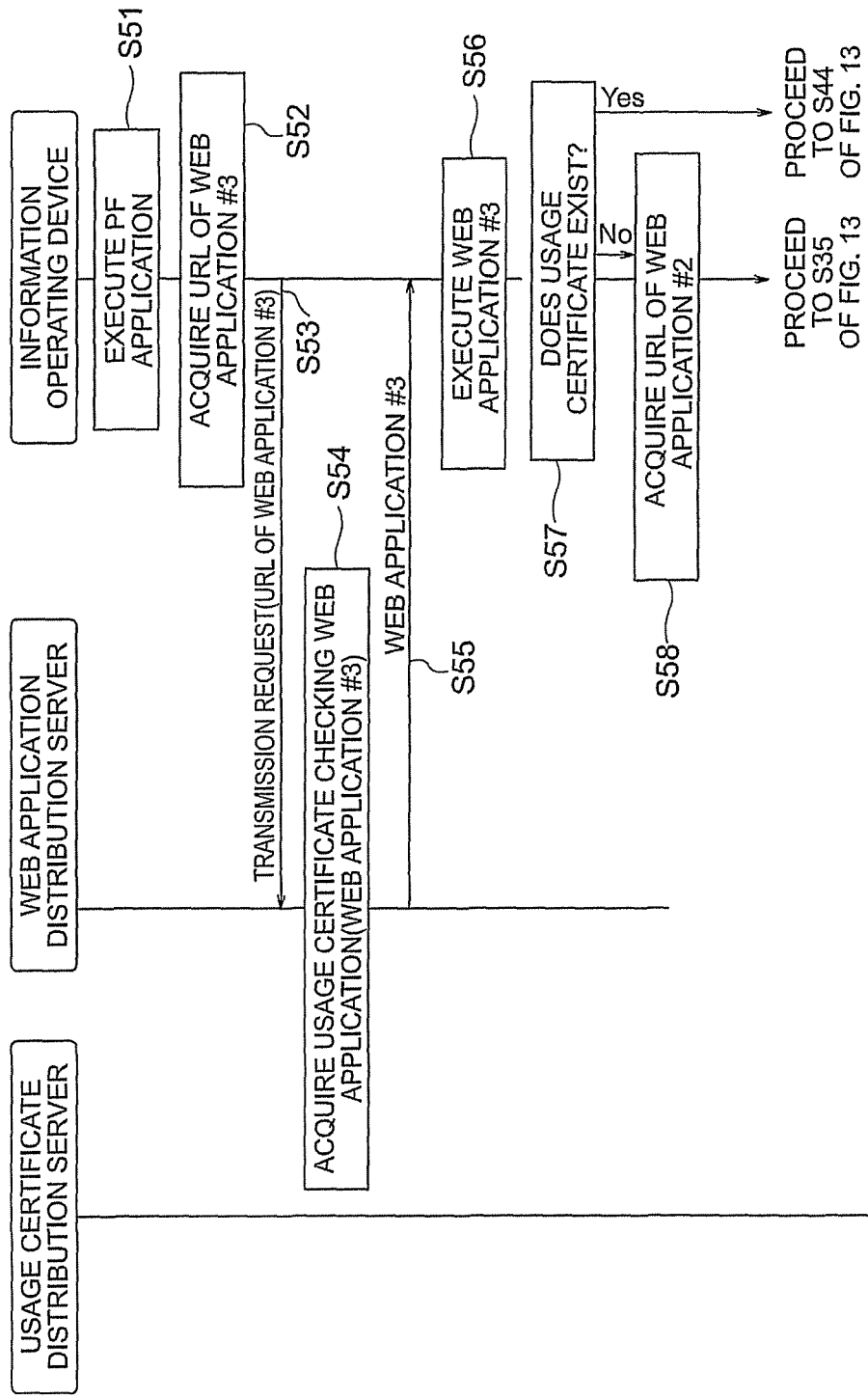
FIG. 18 is a sequence diagram of the processes performed in the information-output-device operation phase.

FIG. 18 is a sequence diagram showing the processing steps performed by the information operating device 1, Web application distribution server 4, and usage certificate distribution server 6 in the information-output-device operation phase when the PF application includes no local Web application. The process of selecting and executing the PF application (Step S51) is similar to FIG. 13. The PF application performs an initializing process etc. by the PF application initializing command 81, and executes the Web-application-executing-unit calling command 84. The Web-application-executing-unit calling command 84 tries to execute a local Web application (Web application #3) specified by the Web application URL 83, by using the Web application executing unit 22. At this time, Web application #3 shows a URL on the Web server (Step S52). Therefore, the Web application acquisition unit 27 of the information operating device 1 requests the Web application distribution server 4 to acquire Web application #3 based on the URL information, through the network (Step S53). Concretely, the Web application acquisition unit 27 of the information operating device 1 transmits a Web application (Web application #3) acquisition request to the Web application distribution server 4 using the HTTP processing unit 31 via the HTTP (or HTTPS) protocol. This request should be achieved as a normal HTTP GET request.

http://example-Webserver.com/input_pin.php?appid=XX

The following is another example of the URL for the HTTP GET request.

http://example-Webserver.com/appidXX/

The Web application distribution server 4 returns Web application #3 as a response (Steps S54 and S55).

The information operating device 1 executes the acquired Web application #3 by the Web application executing unit 22 (Step S56).

Subsequent steps are performed by the Web application executing unit 22. The process performed by Web application #3 should be the same as Web application #1. That is, Web application #3 inspects whether the usage certificate is stored in the usage certificate storing unit 24 of the information operating device 1 (Step S57). When judging that the usage certificate is not stored in the usage certificate storing unit 24, Web application #3 refers to the URL of Web application #2 described in the local Web application #3 (Step S58), and acquires the Web application (Web application #2) shown by the URL from the Web server to execute it. When judging that the usage certificate is stored in the usage certificate storing unit 24, Web application #3 refers to the URL of Web application #4 described in the local Web application #3, and executes the Web application (Web application #4) shown by the URL.

Omitting the Web application from the PF application leads to advantages that the entire file size of the PF application can be reduced and that behavior of the Web application to be executed after the PF application is executed can be changed even after the PF application is installed.

As shown in FIG. 18, Web application #3 is stored in the Web application distribution server 4. When including Web application #3 in a PF application, the developer of Web application #3 is required to complete implementation of Web application #3 before entering the information-operating-device setup phase. On the other hand, when not including Web application #3 in a PF application, there is no need to fix the process and screen design of Web application #3 until the Web application is downloaded in the information-output-device operation phase (level 1). Since the timing to execute the information-output-device operation phase (level 1) differs depending on each user, character logo, guide text, etc. displayed by Web application #3 in a certain period may be changed in another period. Further, there is an advantage that the information displayed by Web application #3 can be switched depending on each user.

Figure 19:
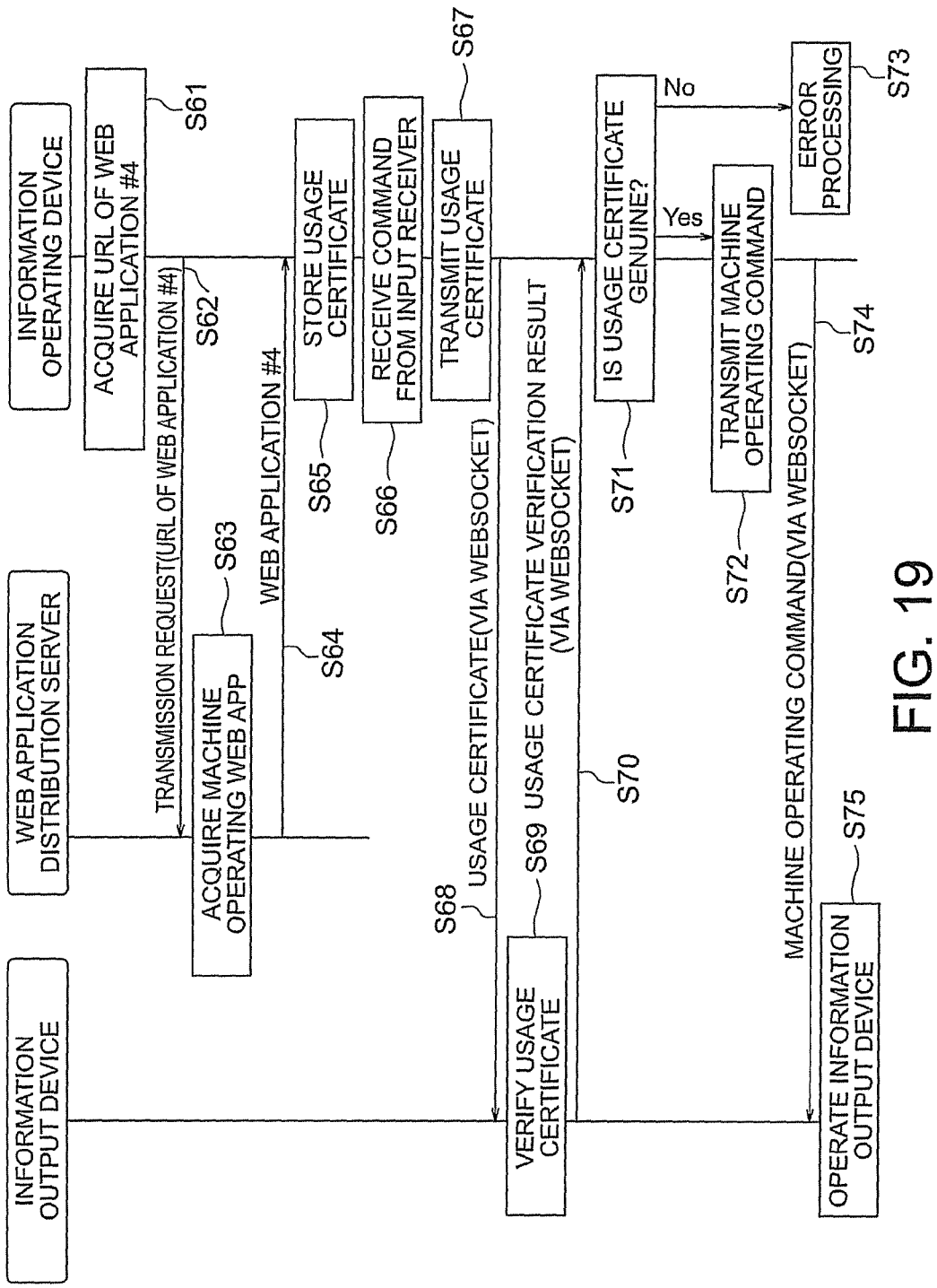
FIG. 19 is a sequence diagram of the processes performed in an information-output-device operation phase (level 2).

Next, the information-output-device operation phase (level 2) in the first embodiment will be explained. FIG. 19 is a sequence diagram showing the processing steps performed by the information operating device 1, Web application distribution server 4, and information output device 2 in this phase. FIG. 19 shows the steps following FIG. 13 and FIG. 18.

The information operating device 1 acquires the URL of Web application #4 (Step S61), and acquires Web application #4 from the Web application distribution server 4 (Steps S62 to S64). Concretely, the Web application acquisition unit 27 of the information operating device 1 transmits a Web application (Web application #4) acquisition request to the Web application distribution server 4 using the HTTP processing unit 31 via the HTTP (or HTTPS) protocol. Since the URL acquired at Step S61 includes a usage certificate together with the URL of Web application #4, Web application #4 stores the usage certificate included in this URL in the usage certificate storing unit 24 (Step S65).

After that, Web application #4 generates a screen for operating the information output device 2, and displays it by the screen output unit 17.

Figure 20:
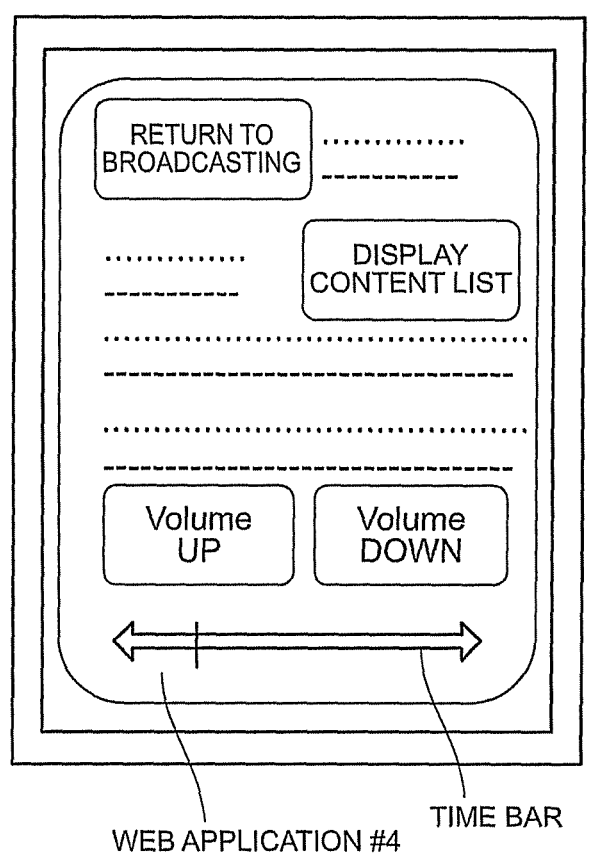
FIG. 20 is a diagram showing a display example of a remote control screen.

FIG. 20 is shows a display example of a remote control screen generated by Web application #4 and outputted to the screen output unit 17 of the information operating device 1. The user of the information operating device 1 operates the information output device 2 through the input receiver 15 by operating buttons and scroll bar utilizing mouse, touch pad, etc.

Here, assume that a Volume UP button (volume (up) button) is pushed as a machine operating command to the information output device 2. Web application #4 being executed by the Web application executing unit 22 receives the volume (up) command through the input receiver 15 (Step S66), and acquires a usage certificate stored in the usage certificate storing unit 24. Here, the important point is the existence of the usage certificate access controller 23 of the information operating device 1. When a Web application stores its usage certificate in the usage certificate storing unit 24, the usage certificate access controller 23 specifies the range of available Web applications. When a Web application requests to acquire its usage certificate stored in the usage certificate storing unit 24, whether the Web application is included in the range is inspected, and if included, only the Web application is permitted to utilize the usage certificate, and then the usage certificate is transmitted (Step S67).

As the information for specifying available Web applications, a URL range for the Web applications is utilized. In other words, Web application #4 specifies a range of URL domains when storing its usage certificate in the usage certificate storing unit 24 (Step S65). Here, assume that Web application #4 specifies its URL domain. When Web application #4 requests to utilize its usage certificate from the usage certificate storing unit 24, the usage certificate access controller 23 inspects whether the Web application corresponds to the domain range specified by Web application #4. In this case, since Web application #4 is legitimate, Web application #4 can acquire its usage certificate.

In this way, when a Web application 4 requests to utilize its usage certificate from the usage certificate storing unit 24, the usage certificate access controller 23 inspects whether the domain of the Web application distribution server 4 distributing the Web application corresponds to the range specified by Web application #4.

If a Web application transmitted from a Web server having a domain name different from the Web application distribution server 4 requests to utilize a usage certificate, the usage certificate access controller 23 transmits no usage certificate to the Web application since the domain name of the Web application is different from that of Web application #4. As stated above, only the Web application which stored its usage certificate is permitted to utilize the usage certificate, or only the Web application distributed from a specific Web server (Web application distribution server 4) is permitted to utilize its usage certificate, which makes it possible to prevent an illegitimate Web application from acquiring a usage certificate.

Next, Web application #4 uses the usage certificate transmitter 25 to transmit the usage certificate to the information output device 2 through the WebSocket client processing unit 18 via the WebSocket protocol (Step S68). At this time, the domain attacher 70 in the WebSocket client processing unit 18 of the information operating device 1 attaches the domain name (origin information) of the Web application being executed by the Web application executing unit 22 to the WebSocket header. As a method for transmitting a usage certificate via the WebSocket, JSON (JavaScript Object Notation) should be used, for example.

Upon receiving the usage certificate from the information operating device 1, the information output device 2 inspects, by the usage certificate verification unit 42, (1) whether the signature 93 included in the usage certificate is legitimate and (2) whether a PIN value stored in the PIN management unit corresponds to the PIN value included in the usage certificate. Further, the application source inspection unit 43 inspects (3) whether the Web-application domain name included in the usage certificate corresponds to the domain name included in the WebSocket header (Step S69), and returns inspection results to the information operating device 1 via the WebSocket (Step S70).

When inspecting (1) and (2), the usage certificate verification unit 42 acquires the PIN value previously managed by the PIN management unit 39. Then, the usage certificate verification unit 42 obtains a hash value for the unique Web-application ID 91, Web-application domain name and PIN value included in the usage certificate, and verifies whether the signature 93 corresponding to the hash value is valid, utilizing the value of a public key stored in the public key management unit 38. If the verification is successful, the inspection is judged to be successful.

When inspecting (3), the usage certificate includes a Web-application domain name. Further, the header of the WebSocket connection which received the usage certificate includes a Web-application domain name. The inspection is judged to be successful when these domain names correspond to each other or when the Web-application domain name included in the header of the WebSocket connection is included in the Web-application origin information (domain name) included in the usage certificate.

After transmitting the usage certificate, the information operating device 1 transmits a machine operating command through the WebSocket connection (Step S74). When all of the inspections (1) to (3) are successful, the usage certificate verification unit 42 and application source inspection unit 43 of the information output device 2 instruct the machine operating command processing unit 34 to accept the machine operating command (Steps S71 and S72). When at least one of the inspections (1) to (3) is failed, the machine operating command processing unit 34 is instructed to disconnect the WebSocket connection, or to reject every machine operating command transmitted through the same WebSocket connection from which the usage certificate is received (Step S73).

The machine operating command processing unit 34 accepts the machine operating command transmitted from the information operating device 1 via the WebSocket only when permitted by the usage certificate verification unit 42 and application source inspection unit 43, and performs processing in accordance with the machine operating command (Steps S74 and S75). For example, when the machine operating command corresponds to a volume (up) button, the machine operating command processing unit 34 instructs the screen output unit 17 to increase the volume to be outputted.

In the sequence explained above, Web application #2, Web application #3, and Web application #4 are acquired from the Web application distribution server 4 for the first time. These Web application once acquired by the information operating device 1 may be stored in the Web application storing unit 52 by the Web application cache unit 29 so that these Web application can be acquired again from the Web application storing unit 52 without accessing the Web server on each occasion. This makes it possible to read the Web application at high speed and increase the reaction speed of the machine. Further, if these Web application are stored in the Web application storing unit 52 and the information operating device 1 can be connected to the information output device 2, the information operating device 1 disconnected from the Internet can transmit a machine operating command to the information output device 2.

In the above explanation, Web application #3 for checking the existence of a usage certificate and Web application #4 for operating a machine Web application are different Web applications, but Web application #3 and Web application #4 may be the same. In this case, the URL of Web application #4 is the same as the URL of Web application #3. The process for acquiring Web application #4 (Steps S62 to S64) is omitted, and Web application #3 performs the steps from storing a usage certificate to transmitting a machine operating command (Steps S65 to S74).

Figure 21:
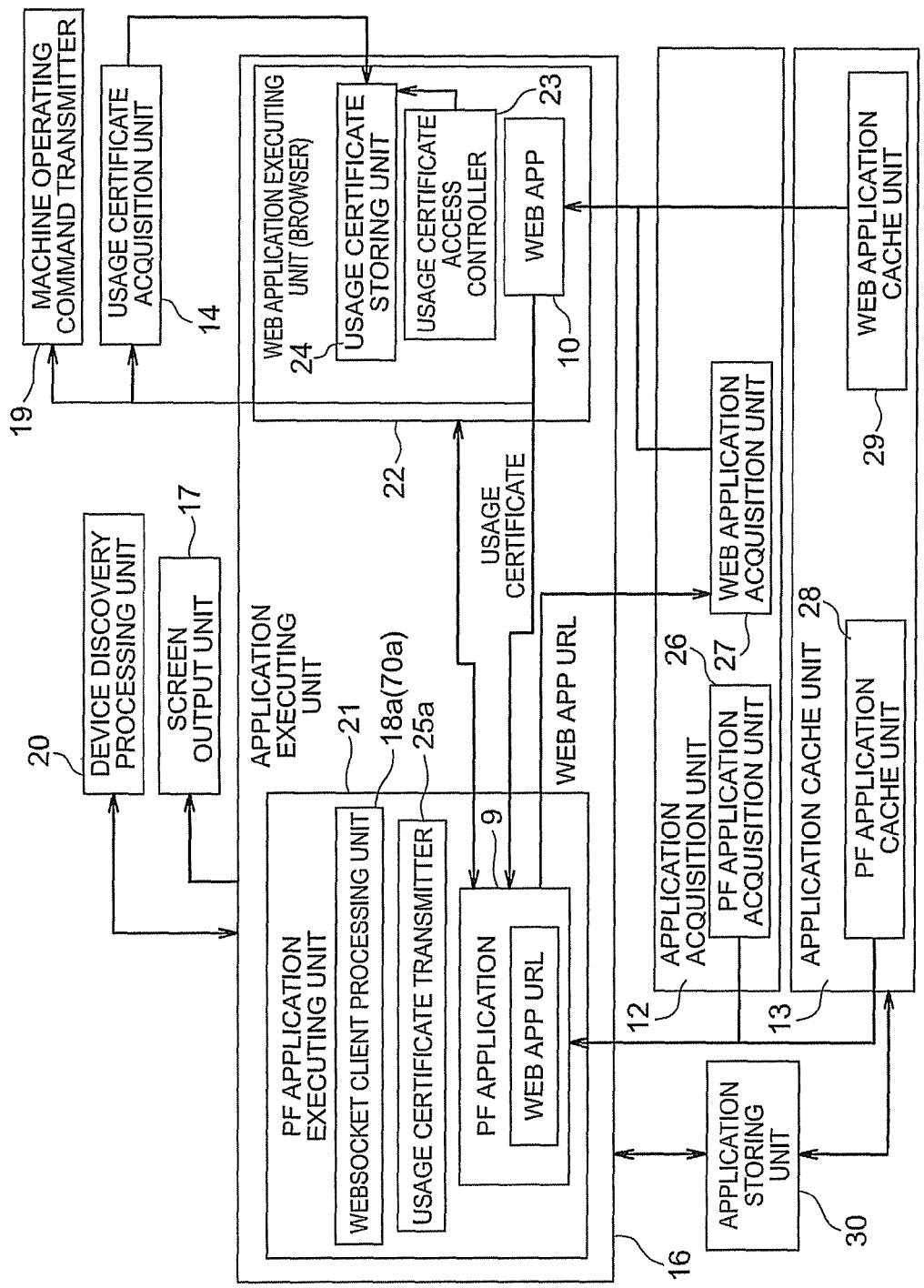
FIG. 21 is a sequence diagram of the processes performed in when a PF application executing unit 21 transmits the usage certificate.

In the example shown in FIG. 3, a Web application executed by the Web application executing unit 22 transmits its usage certificate to the information output device 2, but the usage certificate can be transmitted by the PF application executing unit 21. This case will be explained using FIG. 21, which is a block diagram showing an example of the internal configuration of the application executing unit 16, application acquisition unit 12, and application cache unit 13 in the information operating device 1. FIG. 21 is different from FIG. 3 in that the WebSocket client processing unit 18 is not connected to the Web application executing unit 22 and that the PF application executing unit 21 has a usage certificate transmitter 25a and a WebSocket client processing unit 18a.

The usage certificate transmitter 25a receives a usage certificate transmitted from a Web application of the Web application executing unit 22, specifies the Web application from which the usage certificate is transmitted, and acquires the domain name of a Web server from which the Web application is distributed.

The WebSocket client processing unit 18a performs client processing for communicating with the information output device 2 via the WebSocket protocol. That is, the WebSocket client processing unit 18a functions similarly to the WebSocket client processing unit 18 shown in FIG. 2. FIG. 21 is characterized in that the WebSocket client processing unit 18a is executed in the PF application executing unit 21. The information operating device 1 may have both of the WebSocket client processing unit 18 and WebSocket client processing unit 18a to perform client processing for the communication via the WebSocket protocol, which leads to redundant device configuration though.

First, the Web application passes its usage certificate to the PF application executing unit 21 before it is transmitted to the information output device 2. At this time, the IP address and TCP port number of the WebSocket server of the information output device 2 may be passed together. The usage certificate transmitter 25a of the PF application executing unit 21 receives a usage certificate transmitted from a Web application of the Web application executing unit 22, specifies the Web application from which the usage certificate is transmitted, and acquires, from the Web application executing unit 22, the domain name of a Web server from which the Web application is distributed. Then, the PF application executing unit 21 establishes a WebSocket connection with the information output device 2 using the WebSocket client processing unit 18a, and transmits a usage certificate to the information output device 2. At this time, the domain attacher 70a in the WebSocket client processing unit 18a of the PF application executing unit 21 may transmit, to the information output device 2, a WebSocket header attached with the domain name of the Web application being executed by the Web application executing unit 22.

The machine operating command transmitter 19 transmits a machine operating command through the WebSocket client processing unit 18a. Similarly to FIG. 19, the domain attacher 70a in the WebSocket client processing unit 18a attaches, to the WebSocket header, the domain name of the Web application being executed by the Web application executing unit 22.

Figure 22:
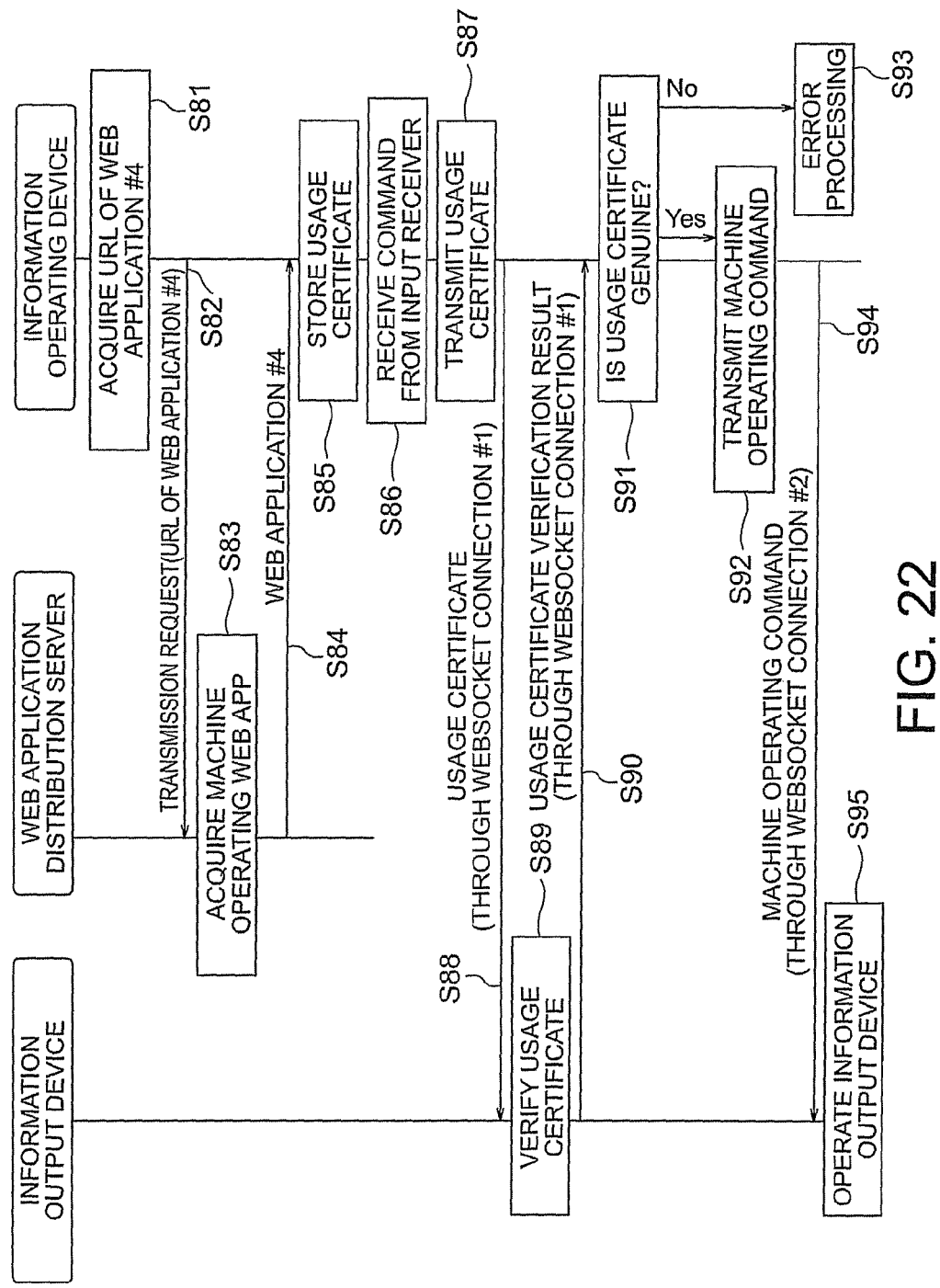
FIG. 22 is a sequence diagram of the processes performed in the information-output-device operation phase (level 2) according to a modification example.

This case will be explained using FIG. 22, which is a sequence diagram showing the processing steps performed by the information operating device 1, Web application distribution server 4, and information output device 2 in the information-output-device operation phase (level 2). FIG. 22 is different from FIG. 19 in that the WebSocket connection used to transmit and receive a usage certificate (Steps S88 and S90) is different from the WebSocket connection used to transmit and receive a machine operating command (Step S94). The WebSocket connection used to transmit and receive a usage certificate (Steps S88 and S90) is established and managed by the WebSocket client processing unit 18a, and the WebSocket connection used to transmit and receive a machine operating command (Step S94) is established and managed by the WebSocket client processing unit 18. The other steps are similar to FIG. 19.

The application source inspection unit (verification unit) 43 of the information output device 2 inspects whether the domain name included in the WebSocket header of the WebSocket connection used to transmit and receive a machine operating command (WebSocket connection #2) correspond to the Web-application domain name included in a usage certificate. The inspection, if performed, is judged to be successful when these domain names correspond to each other or when the Web-application domain name included in the header of the WebSocket connection is included in the Web-application origin information (domain name) included in the usage certificate. When the WebSocket header of the WebSocket connection (WebSocket connection #1) used to transmit and receive a usage certificate includes a header showing a domain name, it is optional to inspect whether the domain name corresponds to the Web-application domain name included in the usage certificate. The inspection is judged to be successful when these domain names correspond to each other or when the Web-application domain name included in the header of the WebSocket connection is included in the Web-application origin information (domain name) included in the usage certificate.

Further, the usage certificate transmitter 25a inspect whether the Web-application domain name corresponds to the domain name included in the usage certificate, or inspects whether the Web-application domain name included in the header of the WebSocket connection is included in the Web-application origin information (domain name) included in the usage certificate. If the inspection is failed, the connection for transmitting a machine operating command to the information output device 2 may be disconnected.

Figure 23:
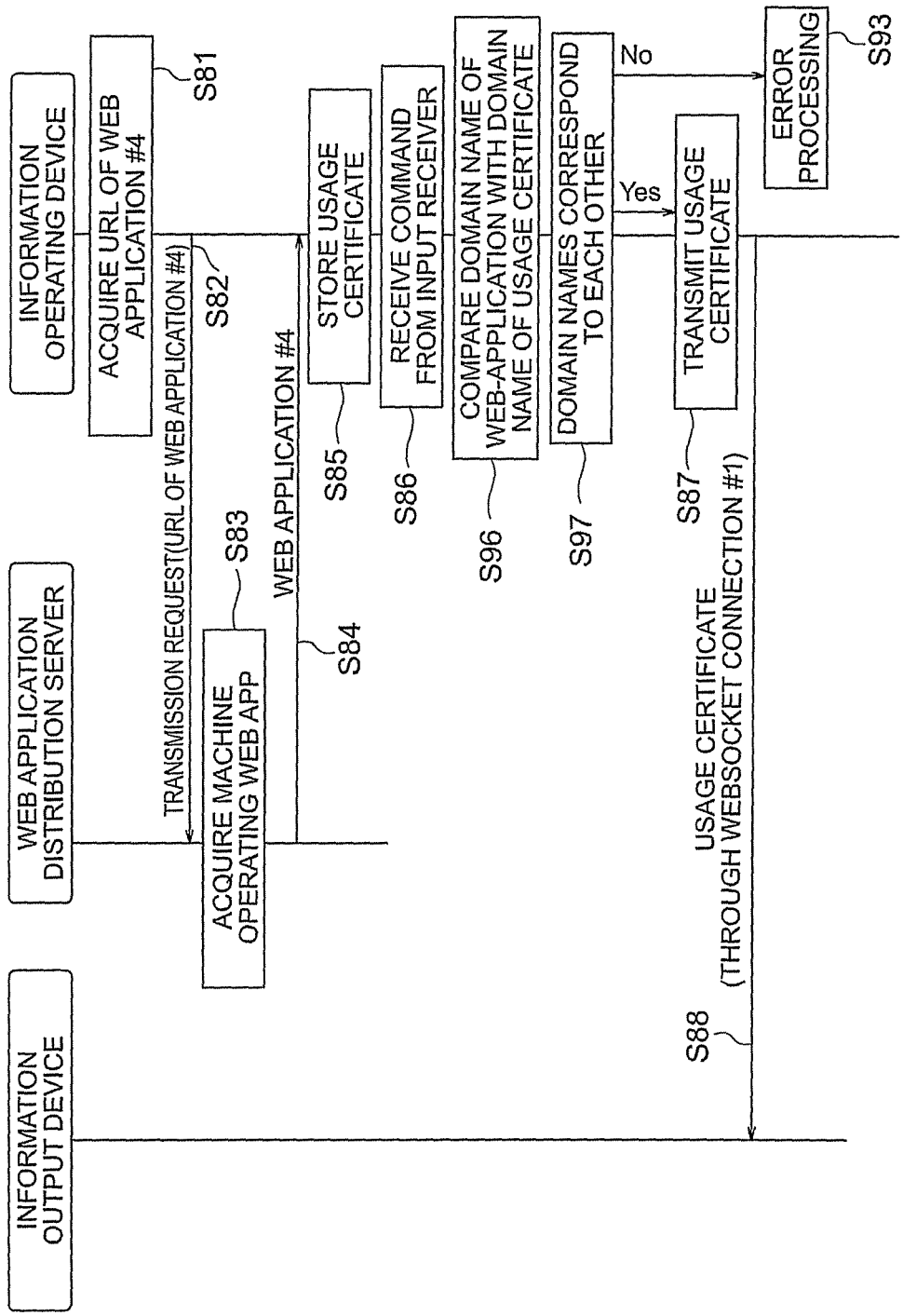
FIG. 23 is a sequence diagram of the processes performed in the information-output-device operation phase (level 2) according to a modification example.

This case will be explained using FIG. 23, which is a sequence diagram showing the processing steps performed by the information operating device 1, Web application distribution server 4, and information output device 2 in the information-output-device operation phase (level 2). FIG. 23 is different from FIG. 22 in that the information operating device 1 compares the domain name of the Web application with the domain name of the usage certificate (Step S96), verifies whether these domain names correspond to each other (Step S97), and if correspond, transmits the usage certificate to the information output device 2 through WebSocket connection #1 (Steps S87 and S88). The WebSocket connection used to transmit and receive the usage certificate (Steps S88 and S90) is established and managed by the WebSocket client processing unit 18a. If the domain names do not correspond to each other, error processing is performed to disconnect the connection, for example (Step S93). The verification of Step S97 is performed by, e.g., a PF application executed in the PF application executing unit 21.

Further, the information operating device 1 retains a list of domain names to inspect whether the domain name of the Web-application is included in the list, and if not included, the connection for transmitting a machine operating command to the information output device 2 may be disconnected.

Figure 24:
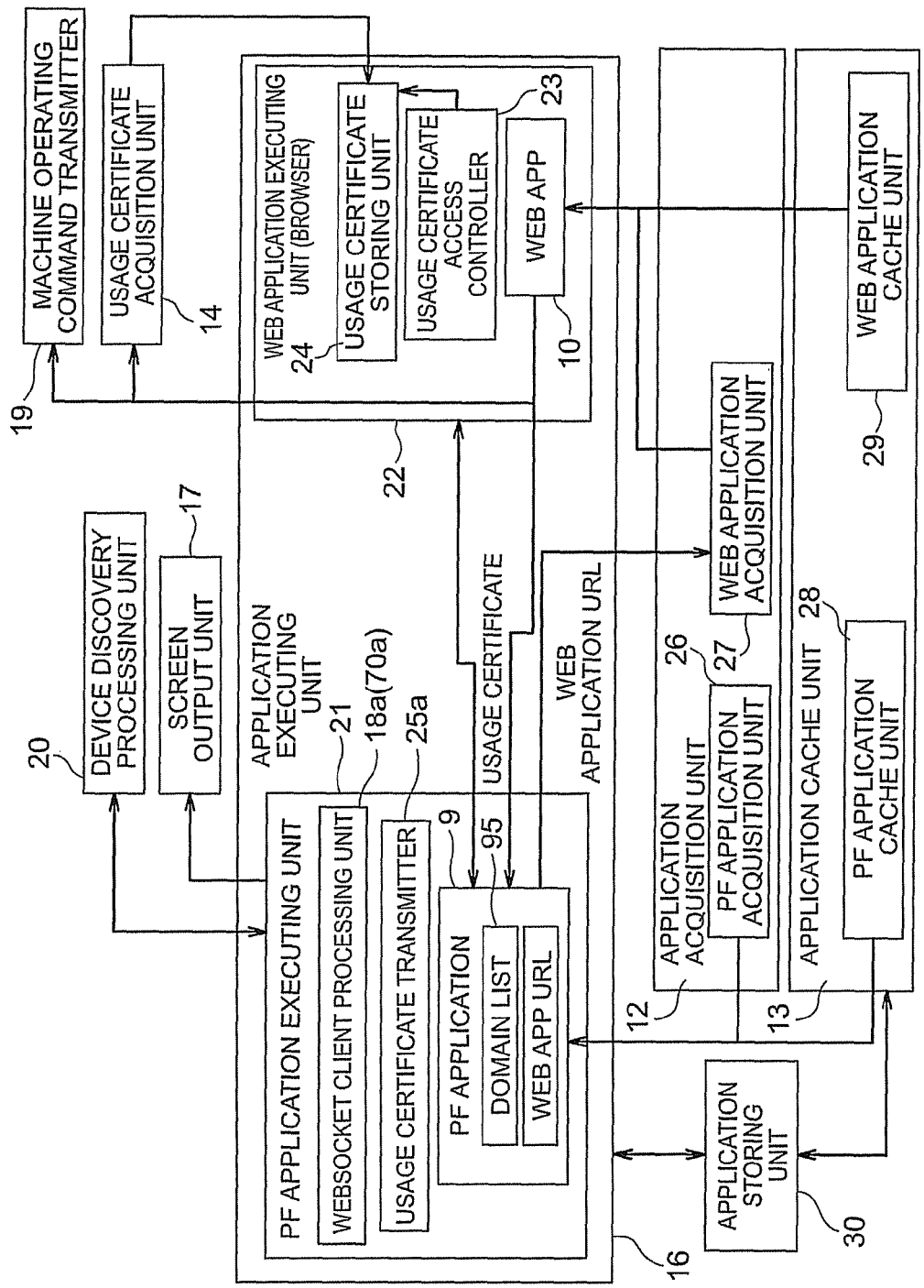
FIG. 24 is an internal block diagram of the information operating device 1 according to a modification example.

This case will be explained using FIG. 24, which is a block diagram showing an example of the internal configuration of the application executing unit 16, application acquisition unit 12, and application cache unit 13 in the information operating device 1. FIG. 24 is different from FIG. 21 in that the PF application further has a domain list 95. The domain list 95 may be embedded in the PF application to be distributed from the PF application distribution server 5 together with the PF application, or may be downloaded from a domain list distribution server (not shown) when executing the PF application without the domain list 95 and distributed from the PF application distribution server 5.

In FIGS. 22 and 23, similarly to FIG. 19, Web application #3 and Web application #4 are different Web applications, but Web application #3 and Web application #4 may be the same. In this case, the URL of Web application #4 is the same as the URL of Web application #3. The process for acquiring Web application #4 (Steps S82 to S84) is omitted, and Web application #3 performs the steps from storing a usage certificate to transmitting a machine operating command (Steps S85 to S94).

Figure 25:
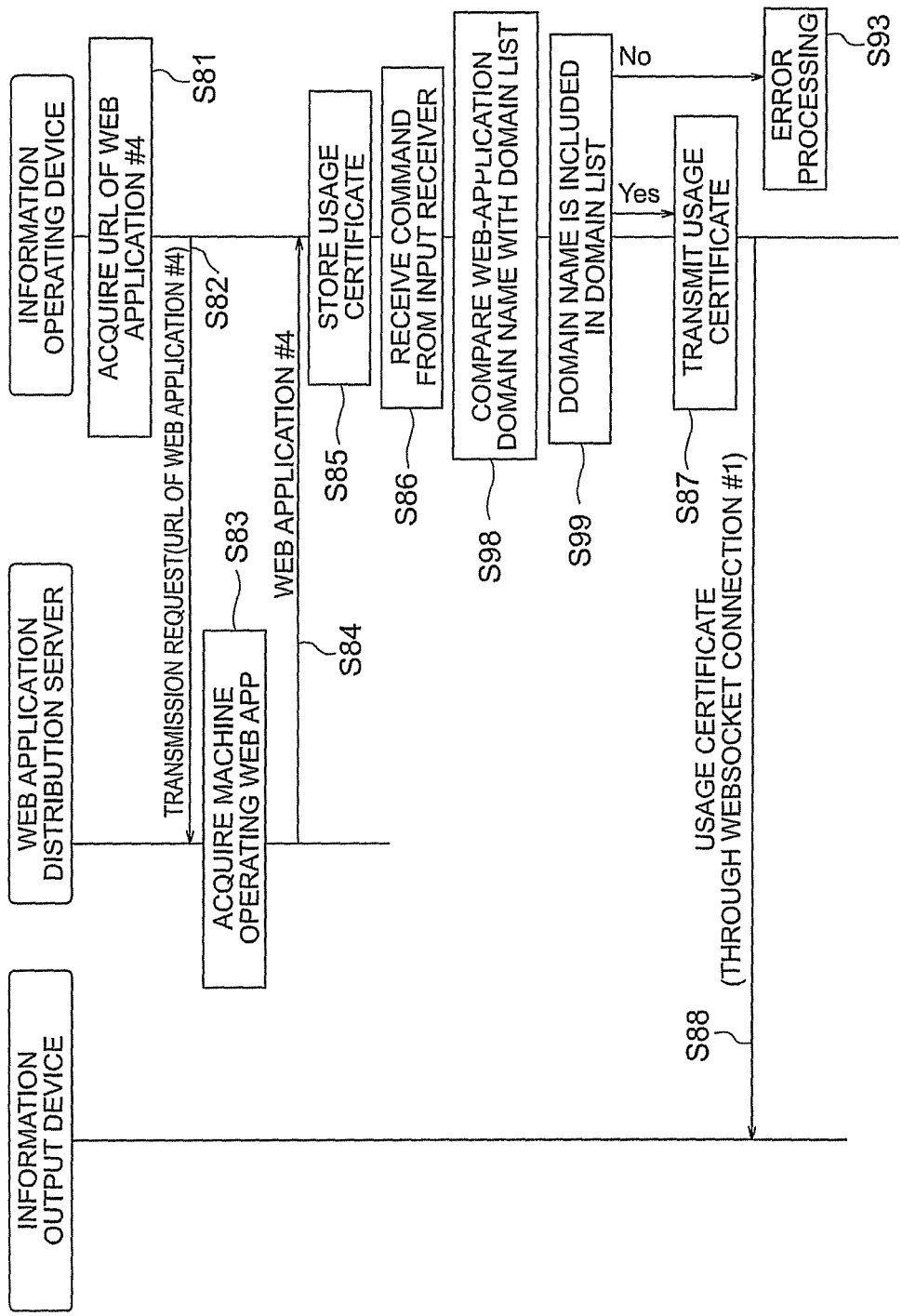
FIG. 25 is a sequence diagram of the processes performed in the information-output-device operation phase (level 2) according to a modification example.

This case will be explained using FIG. 25, which is a sequence diagram showing the processing steps performed by the information operating device, Web application distribution server 4, and information output device 2 in the information-output-device operation phase (level 2). FIG. 25 is different from FIG. 19 in that the information operating device inspects whether the domain name of the Web application is included in the domain list 95 in the PF application (Steps S98 and S99), and if included, transmits the usage certificate to the information output device 2 (Steps S87 and S88). If the domain name is not included in the domain list 95, error processing is performed to disconnect the connection, for example (Step S93).

In the above explanation, the WebSocket protocol is utilized to transmit a usage certificate and a machine operating command from the information operating device 1 to the information output device 2, but the HTTP or HTTPS protocol may also be utilized.

Figure 26:
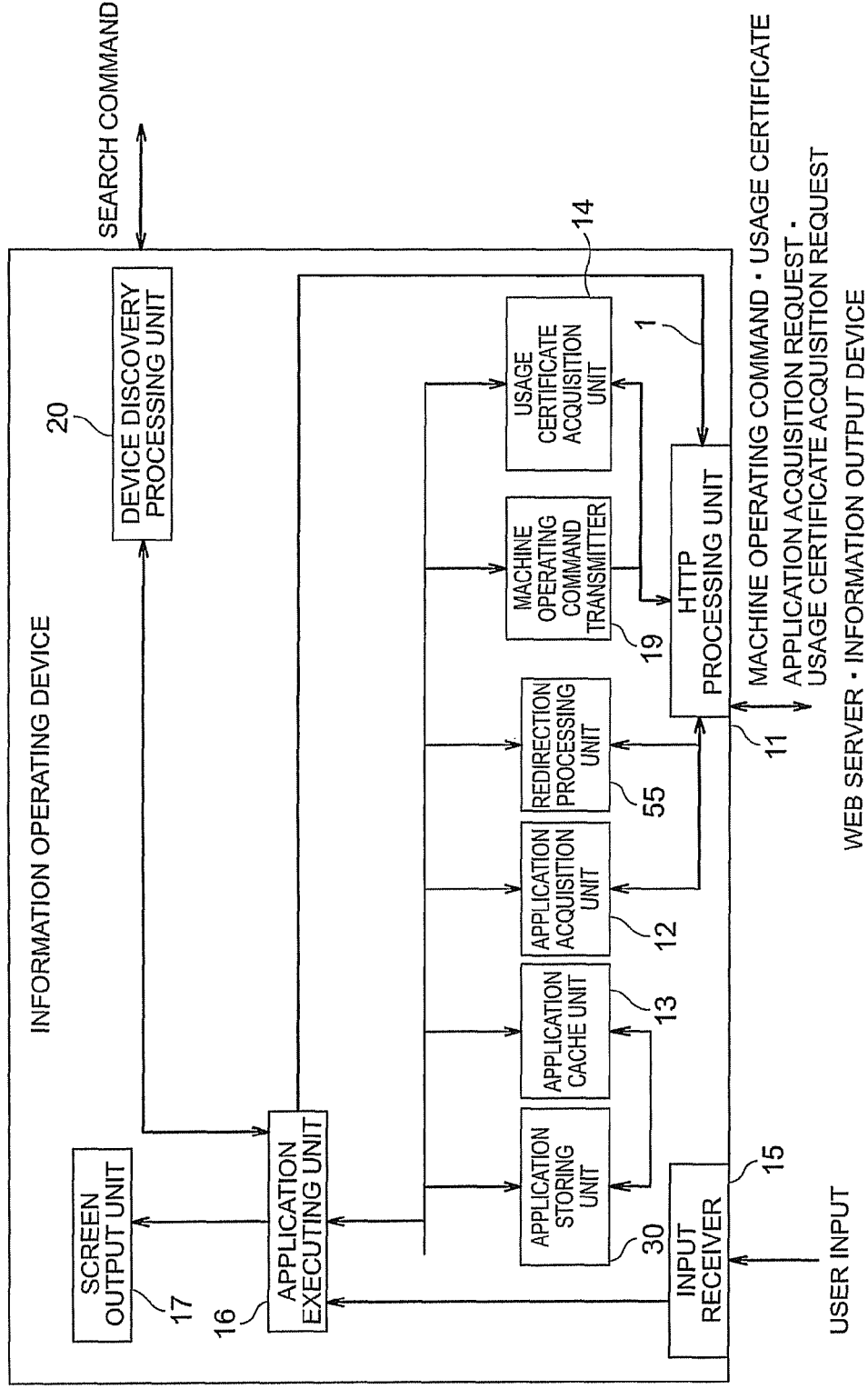
FIG. 26 is an internal block diagram of the information operating device 1 according to a modification example.

FIG. 26 is a block diagram showing the internal configuration of the information operating device 1 when utilizing the HTTP or HTTPS protocol to transmit a usage certificate and a machine operating command. FIG. 26 is different from FIG. 2 in that the WebSocket client processing unit 18 is omitted, and that the machine operating command transmitter 19 is connected to the HTTP processing unit 11.

In FIG. 2, the machine operating command transmitter 19 uses the WebSocket protocol to transmit a usage certificate and a machine operating command based on the command from the application executing unit 16, while in FIG. 26, the HTTP processing unit 11 is used to transmit those. In FIG. 2, the domain attacher 70 in the WebSocket client processing unit 18 attaches the domain name of the Web application being executed by the Web application executing unit 22 to the WebSocket header, while in FIG. 26, the HTTP processing unit 11 attaches the domain name of the Web application being executed by the Web application executing unit 22 to the HTTP header.

Figure 27:
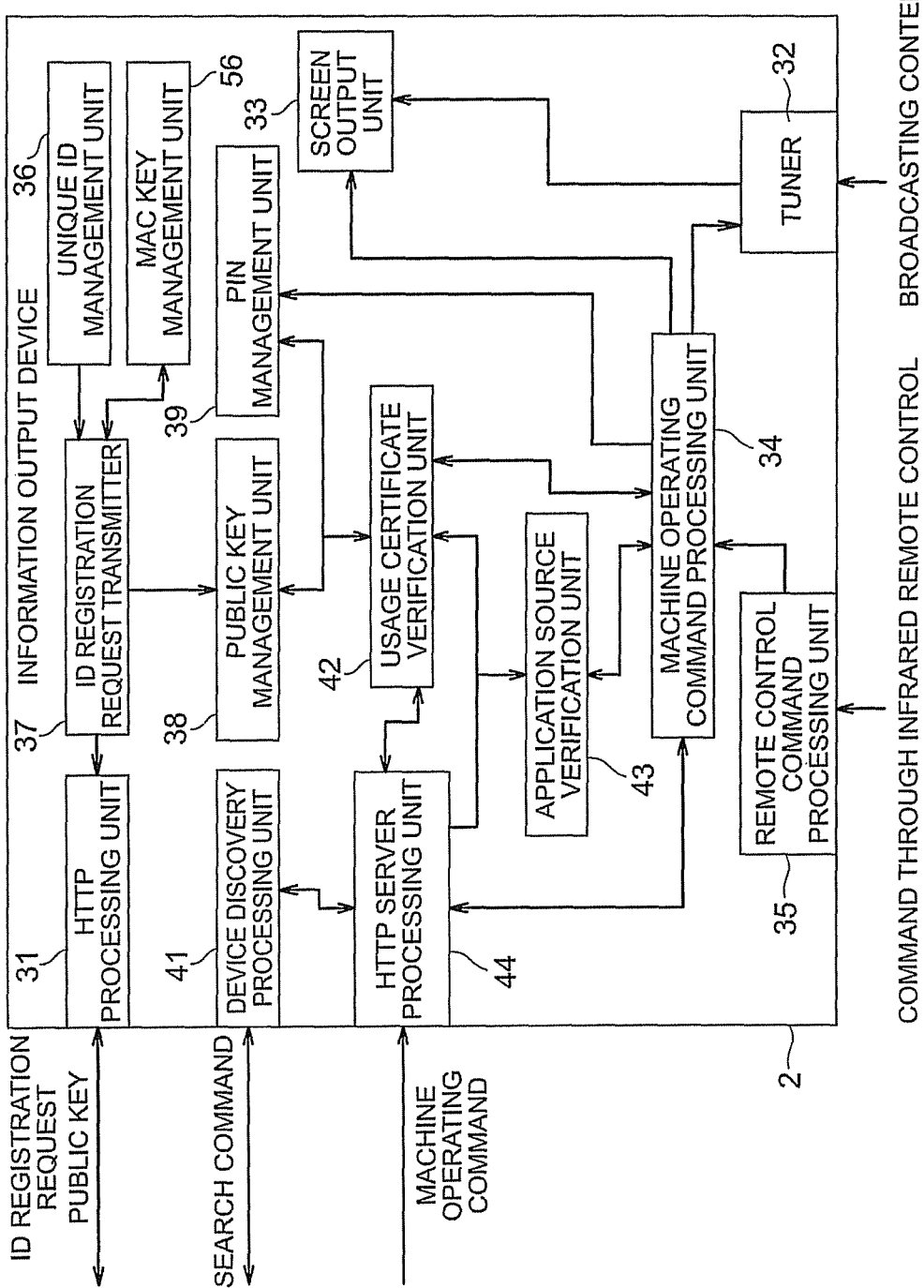
FIG. 27 is an internal block diagram of the information output device 2 according to a modification example.

FIG. 27 is a block diagram showing the internal configuration of the information output device 2 when receiving a usage certificate and a machine operating command utilizing the HTTP or HTTPS protocol. FIG. 27 is different from FIG. 4 in that an HTTP server processing unit 44 is provided instead of the WebSocket server processing unit 40. In FIG. 4, the application source inspection unit 43 inspects whether the WebSocket header information included in the machine operating command received by the WebSocket server processing unit 40 is legitimate. While in FIG. 27, the domain name of the Web application is included in the HTTP header, and thus the application source inspection unit 43 inspects whether the header information included in the machine operating command received by the HTTP server processing unit 44 is legitimate. Concretely, the application source inspection unit 43 inspects whether the header information included in the machine operating command corresponds to the Web-application domain name included in the usage certificate, and if corresponds, the inspection is judged to be successful.

Figure 28:
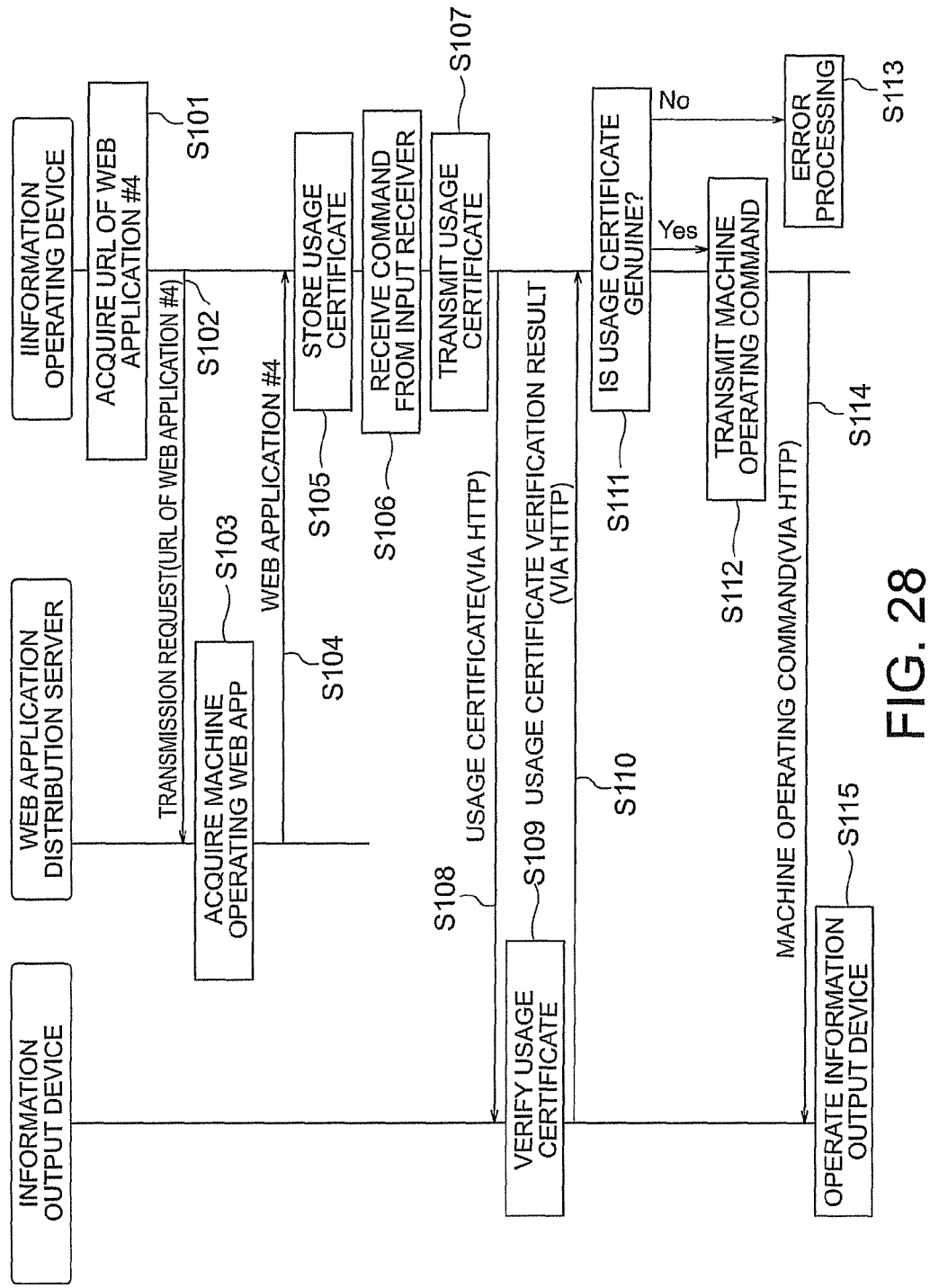
FIG. 28 is a sequence diagram of the processes performed in the information-output-device operation phase (level 2) according to a modification example.

Next, explanation will be given on the information-output-device operation phase (level 2) when the HTTP or HTTPS protocol is utilized to transmit a usage certificate and a machine operating command. FIG. 28 is a sequence diagram showing the processing steps performed by the information operating device 1, Web application distribution server 4, and information output device 2.

FIG. 28 is different from FIG. 19 in that the usage certificate, usage certificate inspection result, and machine operating command are transmitted via the HTTP or HTTPS protocol (Steps S108 and S110, S114). The other steps are similar to FIG. 19.

The following is an example of a message when the information operating device 1 transmits a usage certificate to the information output device 2.

http://homeTV/req_token.php?appid=X&origin=xxxx&signature=yyyy&signature_method=rsa-sha1

In this example, the usage certificate is transmitted to an information output device specified as "homeTV". Concretely, a value of "X" labeled with appid is transmitted as a unique Web-application ID, a value of "xxxx" labeled with origin is transmitted as origin information (domain name) corresponding to this Web application, a value of "yyyy" labeled with signature is transmitted as a signature for the usage certificate, and a value of "rsa-sha1" labeled with signature_method is transmitted to show that the signature method is RSA-SHA1.

In FIG. 28, Web application #4 transmits the usage certificate to the information output device 2 using the HTTP processing unit 31 via the HTTP or HTTPS protocol. In this case, POST request should be used. Naturally, PUT request or GET request may be used.

As stated above, in the present embodiment, when operating the information output device 2 from a Web application executed on the information operating device 1 through the network, the information output device 2 checks the domain name of the Web server from which the Web application is distributed (Web application distribution server 4), before receiving a machine operating command transmitted from the information operating device 1. Further, the information output device 2 checks the signature 93 and the information included in the usage certificate transmitted from the information operating device 1. Only when these two inspections are successful, the information output device 2 receives machine operating commands transmitted thereafter from the information operating device 1.

This configuration generates the following effects.

As a first effect, the machine operating command can be received only when a permitted Web application distribution server 4 is involved. Assume that an attacker copies the description about a command for transmitting a machine operating command to the information output device 2 (e.g., a command included in Web application #4), and uploads it to Web server X as Web content X. As stated above, a Web application described in HTML JavaScript is equivalent to Web content such as Web pages displayed by a Web browser on a PC. Therefore, Web content X is executed when the user of the information operating device 1 browses various Web pages utilizing the Web browser (Web application executing unit 22) on the information operating device 1, a machine operating command is transmitted to the information output device 2 without the user's awareness. Therefore, when no restriction is imposed, if the machine operating command is a command to delete every broadcasting content recorded in the information output device 2, only a browse of Web content X on the information operating device 1 deletes the recorded content on the information output device 2 without the user's awareness. Even when an illegitimate Web application such as Web content X is stored in a Web server which is not managed like the Web application distribution server 4, operating commands from such an illegitimate Web application can be rejected by letting the information output device 2 check the domain name of the Web server from which the Web application is distributed.

As a second effect, only a Web application permitted by the user can operate the information output device 2. The information output device 2 according to the present embodiment is assumed to be a digital TV etc. held by each home or each individual. There is no problem in operating the information output device 2 of user A from a legitimate Web application (e.g., Web application #4) executed on the information operating device 1 of user A. However, it is required to prevent a legitimate Web application executed on the information operating device 1 of user A from operating the information output device 2 of user B without user B's permission. It is possible to force the user to check every machine operating command transmitted from the information operating device 1 by using the infrared remote control of the information output device 2, which is troublesome though. Thus, a PIN is set for the information output device 2 to install a usage certificate including the password (PIN) of the information output device 2 in the information operating device 1. The information output device 2 checks whether the PIN included in the usage certificate is legitimate before executing a machine operating command transmitted from the information operating device 1. Further, the signature 93 is attached to the usage certificate to prevent the PIN value from being falsified on the communication path, and the information output device 2 verifies the signature 93. This makes it possible to prevent the information output device 2 from being freely operated by a Web application which does not know the PIN value of the information output device 2.

As stated above, it is possible to operate an information output device such as TV from an information operating device such as smartphone, tablet, etc. while surely preventing the information output device from being freely operated without the user's permission, which leads to effective utilization of the information operating device and improvement in usability of the information output device.

(Second Embodiment)

In the first embodiment, the usage certificate distribution server 6 for issuing a usage certificate and the information output device 2 for inspecting the usage certificate and receiving a machine operating command are different devices. On the other hand, in a second embodiment, the usage certificate distribution server 6 and the information output device 2 are integrated into one.

Figure 29:
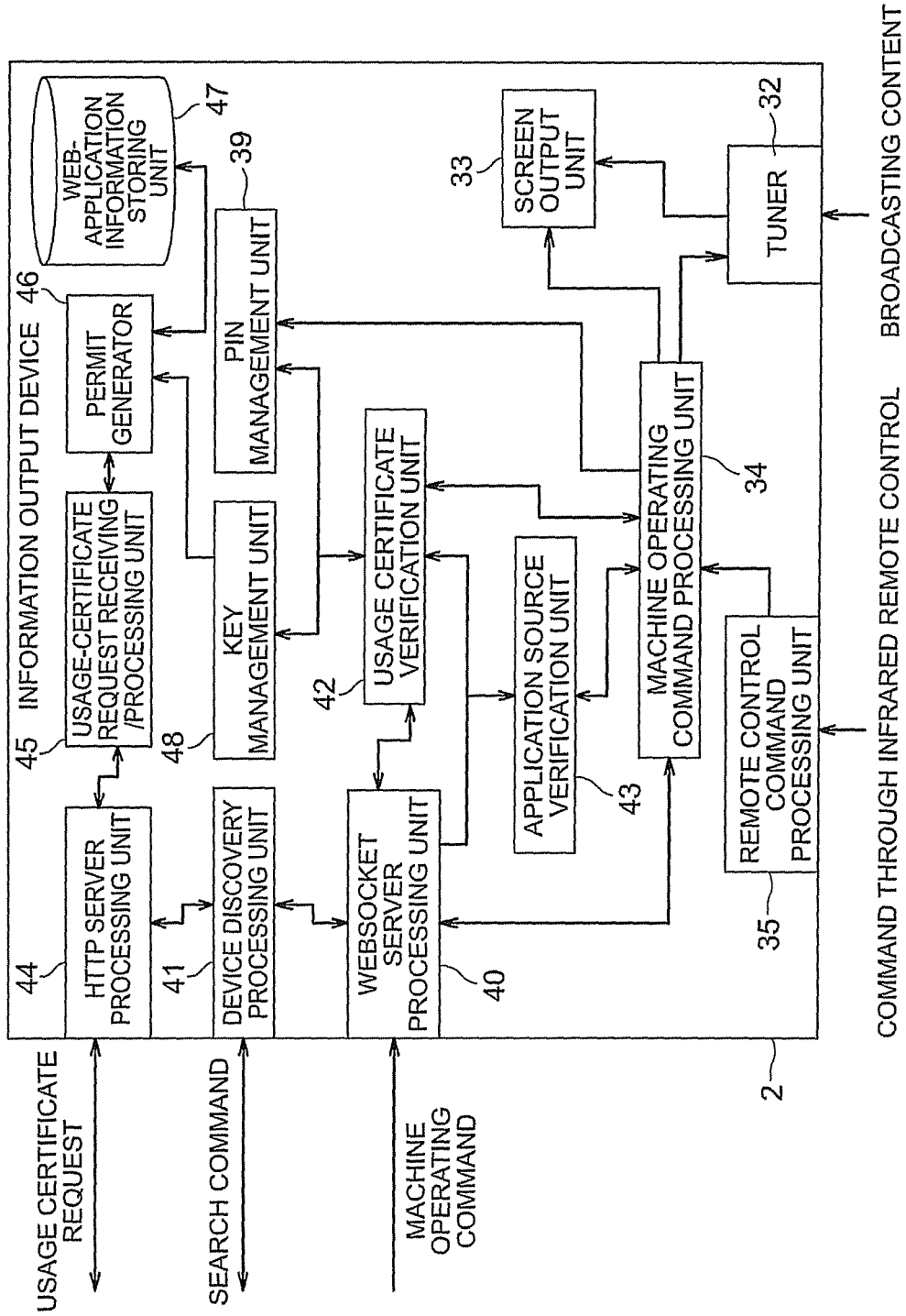
FIG. 29 is an internal block diagram of the information output device 2 according to a second embodiment.

FIG. 29 is a block diagram showing the internal configuration of the information output device 2 according to the second embodiment. The information output device 2 shown in FIG. 29 is different from FIG. 4 in that the ID registration request transmitter 37 and unique ID management unit 36 are omitted, the HTTP server processing unit 44, a usage-certificate request receiving/processing unit 45, a permit generator 46, and a Web-application information storing unit 47 are newly provided, and that a key management unit 48 is provided instead of the public key management unit 38.

The HTTP server processing unit 44, usage-certificate request receiving/processing unit 45, and Web-application information storing unit 47 functions equivalently to the usage certificate distribution server 6 of FIG. 7A.

As a response to a device search request from the information operating device 1, the device discovery processing unit 41 may return the TCP port number of the HTTP server processing unit in addition to the name and IP address of the information output device 2 and the TCP port number of the WebSocket server processing unit 40.

The key management unit 48 manages a public key pair consisting of a secret key used to generate the signature 93 for a usage certificate, and a public key used to verify the signature 93 of the usage certificate. In this case, a well-known public key algorithm such as RSA encryption algorithm and elliptic curve cryptography can be used. The public key pair may be written in the key management unit 48 of the information output device 2 before shipped from the factory, or may be generated by the key management unit 48 in the information output device 2.

The usage certificate generator 46 acquires, from the Web-application information storing unit 47, a usage certificate corresponding to the unique Web-application ID included in a usage certificate request message, and generates a usage certificate attached with the signature 93 generated for the usage certificate, Web application ID, and PIN included in the usage certificate request message, using the secret key stored in the key management unit 48.

The Web-application information storing unit 47 is a memory device storing an unsigned usage certificate corresponding to the Web application ID. The usage certificate is previously written in the Web-application information storing unit 47 in the information output device 2 before shipped from the factory, or written by the usage, certificate distribution server 6 through the Internet 8 via the HTTP protocol. The following explanation is based on an example where the usage certificate is written in the Web-application information storing unit 47 in the information output device 2 before shipped from the factory.

Figure 30:
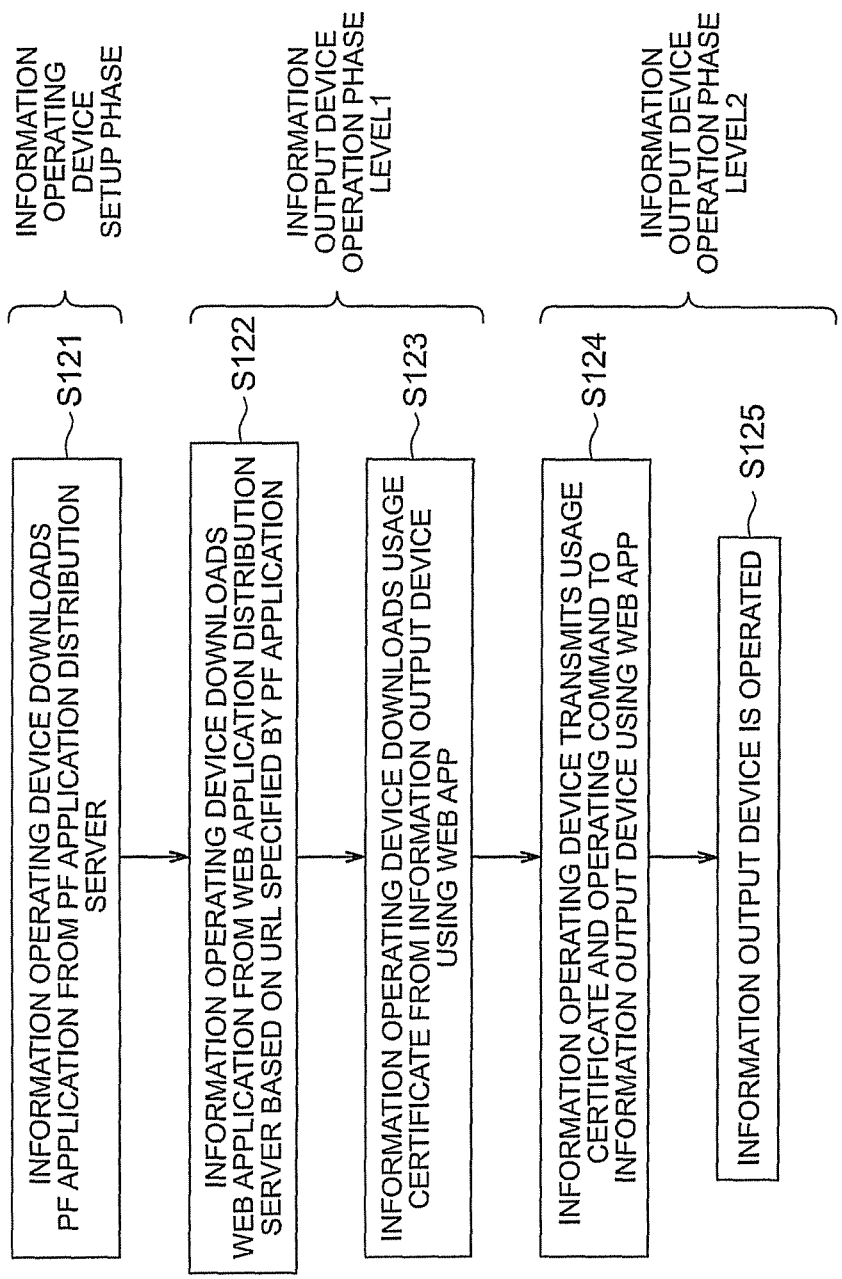
FIG. 30 is a sequence diagram of the processes performed in according to the second embodiment.

FIG. 30 is a sequence diagram showing the processing steps performed by the information operating device 1, information output device 2, PF application distribution server 5, and Web application distribution server 4 according to the second embodiment. The sequence diagram of FIG. 30 is different from FIG. 8 shown in the first embodiment in that the information-output-device setup phase shown in Step S1 of FIG. 8 is omitted, and that the information operating device 1 downloads a usage certificate from the information output device 2 in the information-output-device operation phase (level 1) (Step S123).

In the first embodiment, the usage certificate distribution server 6 generates a public key pair to distribute a public key to the information output device 2, and to generate the signature 93 for a usage certificate by a secret key corresponding to the public key. On the other hand, in the second embodiment, the public key pair is embedded in the information output device 2, and thus the information-output-device setup phase is unnecessary. Further, in the second embodiment, the usage certificate is generated by the information output device 2, and thus the information operating device 1 downloads the usage certificate not from the usage certificate distribution server 6 but from the information output device 2.

The information-operating-device setup phase and the information-output-device operation phase (level 2) are the same as the first embodiment.

Figure 31:
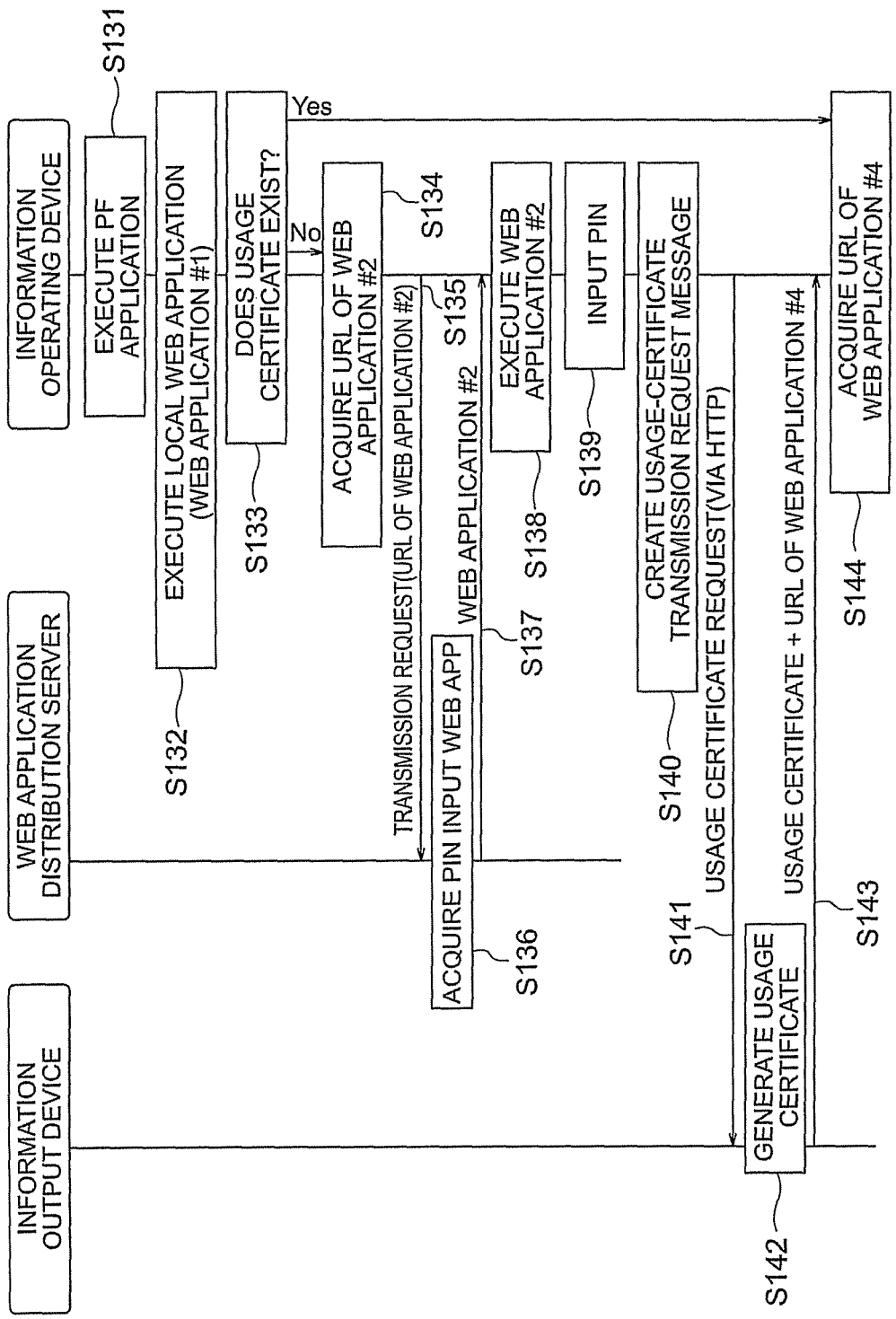
FIG. 31 is a sequence diagram of the processes performed in an information-output-device operation phase (level 1).

FIG. 31 is a sequence diagram showing the processing steps performed by the information operating device 1 and Web application distribution server 4 in the information-output-device operation phase (level 1) according to the second embodiment.

The steps from executing Web application #2 to displaying a message inducing the user to input a PIN on the screen of the screen output unit 17 in the information operating device 1 (Steps S131 to S139) are similar to FIG. 13. When the PIN is inputted through the input receiver 15, Web application #2 generates a usage certificate request message (Step S140). Concretely, based on the command from Web application #2, the information operating device 1 transmits a usage certificate request message to the information output device 2 using the HTTP processing unit 31 via the HTTPS (or HTTP) protocol. The following is an example of a usage certificate request message transmitted from the information operating device 1 to the information output device 2.

https://homeTV/req_token.php?appid=X&pin=ZZZZ

In this example, the usage certificate request message is transmitted to the information output device 2 specified as "homeTV." A value of "X" labeled with "appid" is specified as a unique Web-application ID, and a value of "ZZZZ" labeled with "pin" is specified as a PIN value inputted through the input receiver 15. As shown in this example, the information operating device 1 transmits the usage certificate request message to the information output device 2 via the HTTPS (or HTTP) protocol (Step S141).

Upon receiving the usage certificate request message, the information output device 2 generates a usage certificate by the usage certificate generator 46 using the data stored in the Web-application information storing unit 47 (Step S142). Concretely, the usage certificate generator 79 acquires, from the Web-application information storing unit 77, the domain name of a Web application corresponding to the unique Web-application ID included in the usage certificate request message transmitted from the information operating device 1. Then, the usage certificate generator 79 calculates a hash value for the unique Web-application ID, domain name of the Web application, and PIN value included in the usage certificate request message transmitted from the information operating device 1, to generate the signature 93 in accordance with a public key encryption method utilizing the secret key stored in the key management unit 48. Then, the usage certificate and the URL of Web application #4 is transmitted to the information operating device 1 as a response to the usage certificate request message (Step S143).

Similarly to the first embodiment, HTTP redirect (HTTP redirect) may be used to transmit the usage certificate to the information operating device 1 together with the URL of Web application #4. In this case, the information output device 2 includes the URL of Web application #4 and the usage certificate in the Location header of an HTTP response. The information output device 2 may acquire the URL of Web application #4 which is previously stored therein, or which is included in a usage certificate transmission request message by Web application #2 when the information operating device 1 generates the message and transmits it to the information output device 2.

The following is an example of the URL of Web application #4 included in the usage certificate transmission request message by Web application #2 and transmitted to the information output device 2.

https://homeTV/
req_token.php?appid=X&pin=ZZZZ&url=example-Web-server.com/appid4

Here, a value of "example-Webserver.com/appid4" labeled with "url" shows the URL of Web application #4. The information output device acquires this URL, and includes this URL and a usage certificate in the Location header of an HTTP response, and transmits the response to the information operating device 1.

Subsequent steps (Step S144 and subsequent steps) are similar to the first embodiment.

In the above example, the usage certificate distribution server 6 and the information output device 2 are integrated into one, and a usage certificate request message and a usage certificate are transmitted and received using the HTTP (or HTTPS) protocol similarly to the first embodiment. However, the protocol should not be necessarily limited, and the WebSocket protocol may be used instead.

Figure 32:
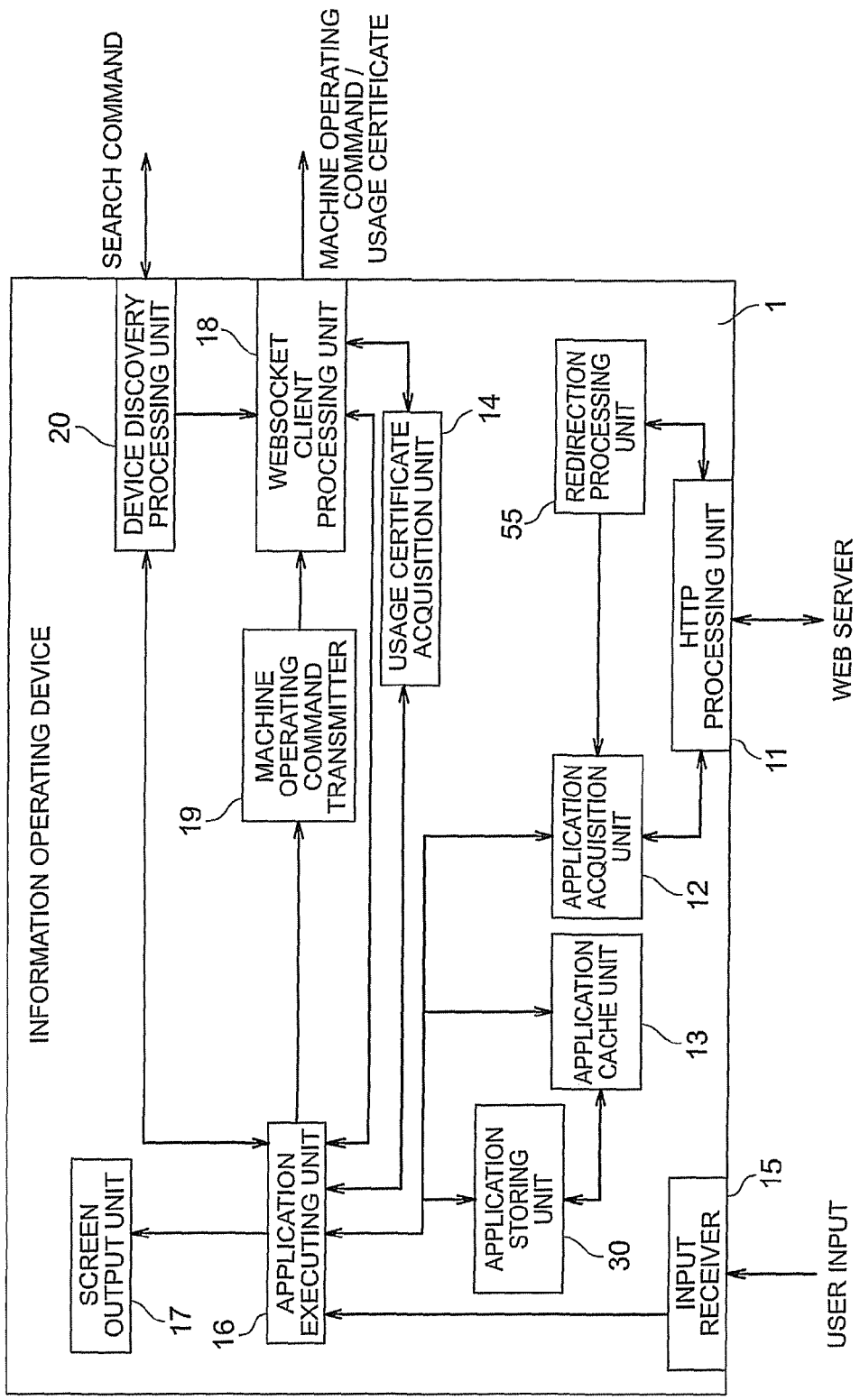
FIG. 32 is an internal block diagram of the information operating device 1 according to a modification example.

FIG. 32 is a block diagram showing a configuration of the information operating device 1 when transmitting a usage certificate request message to the information output device 2 using the WebSocket protocol. FIG. 32 is different from FIG. 2 in that the usage certificate acquisition unit 14 is not connected to the HTTP processing unit 11 and connected the WebSocket client processing unit 18.

Figure 33:
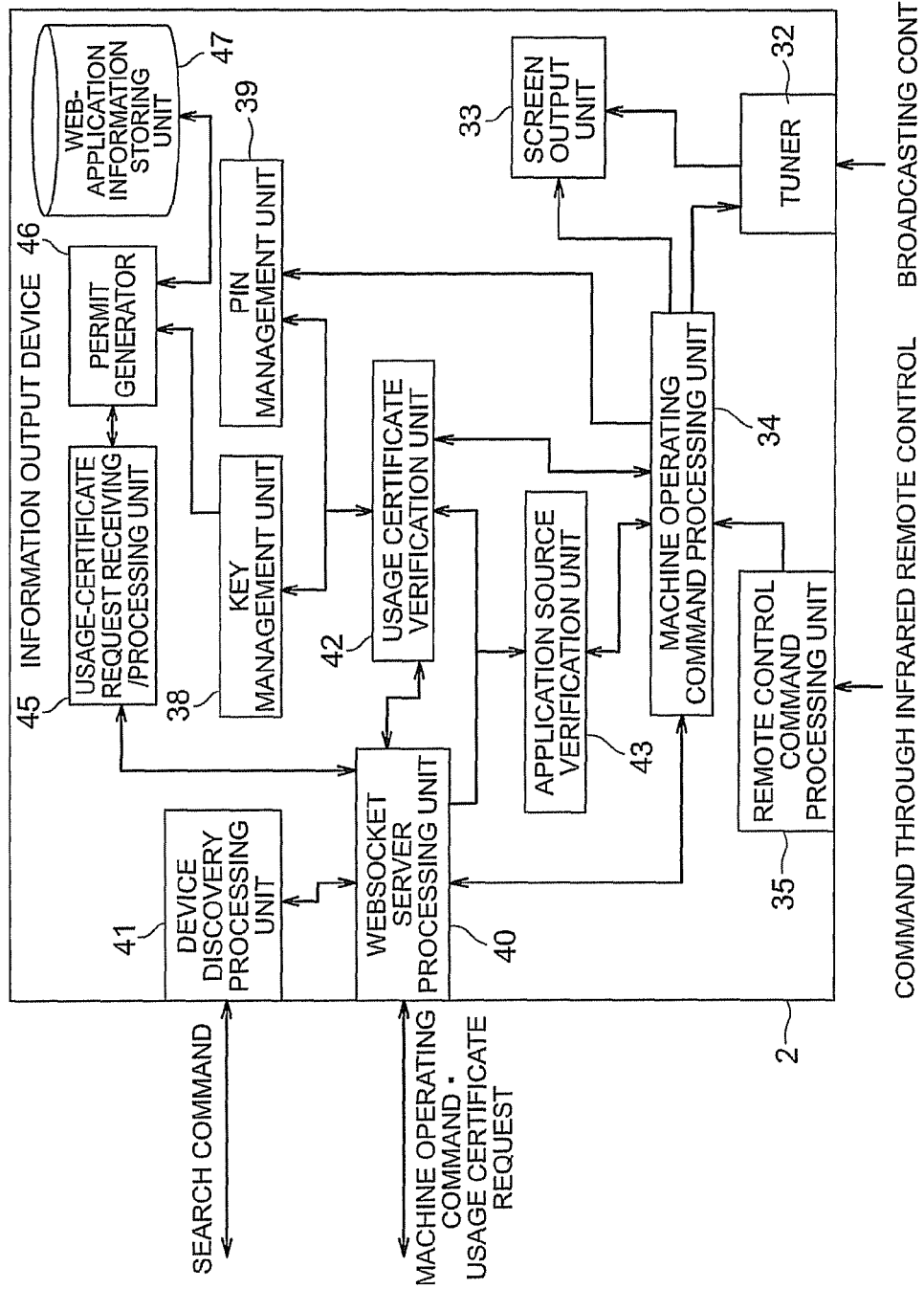
FIG. 33 is an internal block diagram of the information output device 2 according to a modification example.

FIG. 33 is a block diagram showing a configuration of the information output device 2 when receiving a usage certificate request message from the information operating device 1 and transmitting a usage certificate using the WebSocket protocol. FIG. 33 is different from FIG. 29 in that the HTTP server processing unit is omitted and that the usage-certificate request receiving/processing unit 45 is connected not to the HTTP server processing unit but to the WebSocket server processing unit 40.

Further, FIGS. 32 and 33 are different from FIG. 29 in that the information operating device 1 transmits a usage certificate request message to the information output device 2 using Web application #2 via the WebSocket protocol instead of the HTTP or HTTPS protocol. The other steps are similar to FIG. 31.

Note that the PIN value inputted by the user is required to be the same as the PIN stored in the information output device 2 to be communicated with in the subsequent steps. Considering the possibility that the user forgets the PIN of the information output device 2, the information operating device 1 may instruct the information output device 2 to display the PIN by the screen output unit of the information output device 2.

Figure 34:
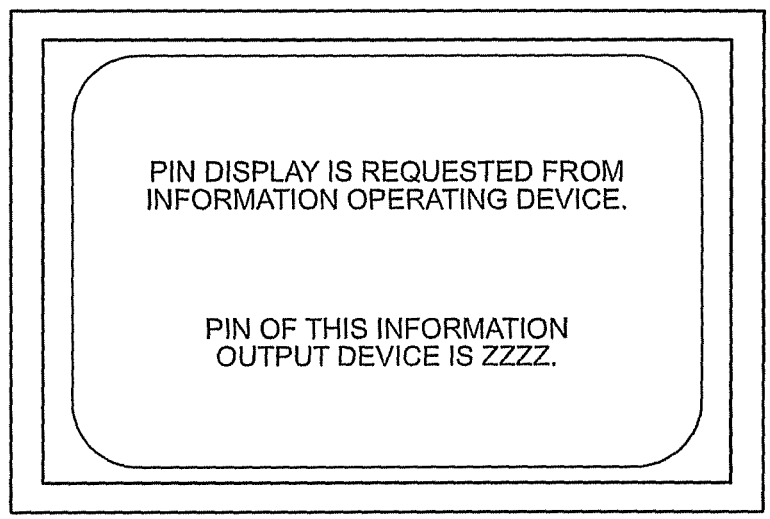
FIG. 34 is a diagram showing an example of a PIN screen displayed on the information output device 2.

FIG. 34 shows an example of the PIN screen displayed on the information output device 2.

This case will be explained using FIG. 35, which is a sequence diagram showing the processing steps performed by the information operating device 1 and Web application distribution server 4 in the information-output-device operation phase (level 1). The steps from executing Web application #2 to displaying a message inducing the user to input a PIN on the screen of the screen output unit 17 in the information operating device 1 (Steps S131 to S137) are similar to FIG. 31.

Figure 35:
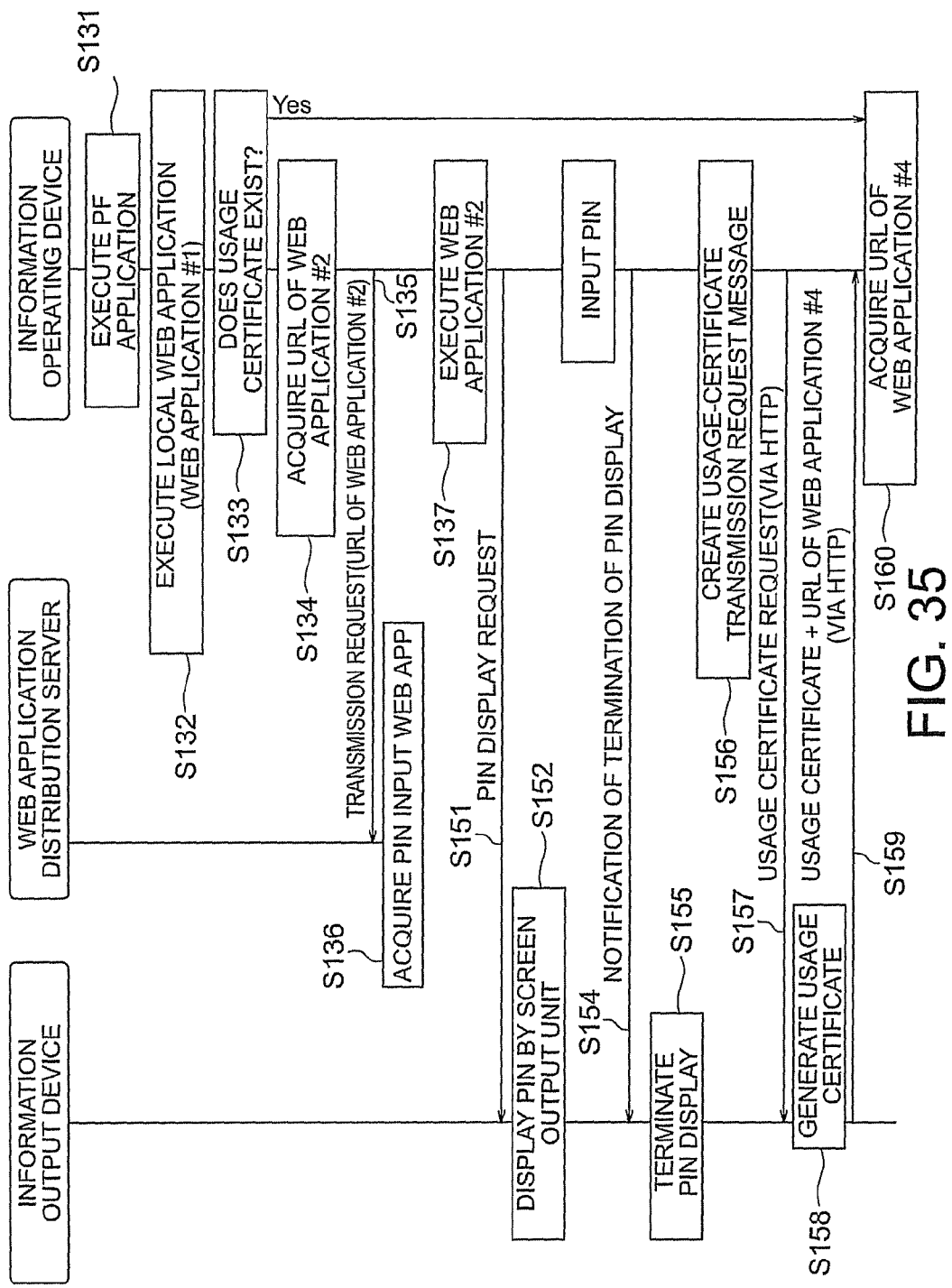
FIG. 35 is a sequence diagram of the processes performed in the information-output-device operation phase (level 1) according to a modification example.

In FIG. 35, a message inducing the user to input the PIN is displayed on the screen of the screen output unit 17 in the information operating device 1, and Web application #2 transmits a PIN display command to the machine operating command transmitter 19 (Step S151). The machine operating command transmitter 19 transmits the PIN display command to the information output device 2 using the WebSocket client processing unit 18 through the WebSocket connection.

Figure 36:
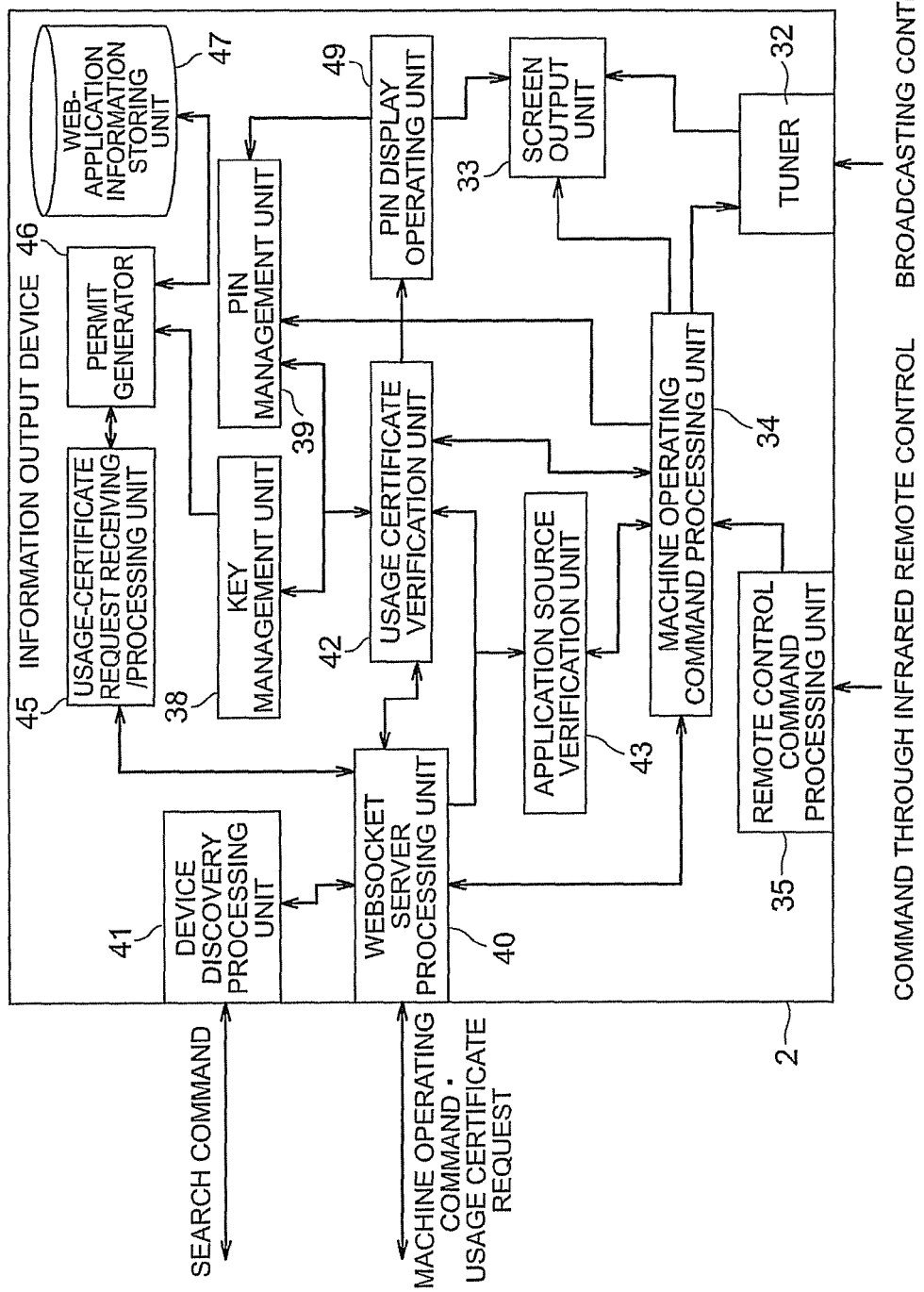
FIG. 36 is an internal block diagram of the information output device 2 according to a modification example.

FIG. 36 is a block diagram showing the internal configuration of the information output device 2 according to this configuration. FIG. 36 is different from FIG. 33 in further having a PIN display operating unit 49.

The PIN display operating unit 49 acquires the PIN display command received from the information operating device 1, and outputs the PIN acquired from the PIN management unit 39 to the screen output unit 33 of the information output device 2 (Step S152). Before outputting the PIN on the screen, the application source inspection unit 43 may inspect the header information.

The user of the information operating device 1 has no need to memorize the PIN value stored in the PIN management unit 39, and can input the PIN through the input receiver 15 of the information operating device 1 referring to the PIN displayed on the screen output unit 33 of the information output device 2 (Step S153), which improves convenience.

Next, the information operating device 1 establishes a WebSocket connection with the information output device 2 using the WebSocket client processing unit 18, and notifies the information output device 2 about termination of the PIN display through the WebSocket connection (Step S154). Upon receiving this notification, the information output device 2 terminates the PIN display performed by the screen output unit 33 (Step S155). After that, steps similar to Steps S140 to S144 of FIG. 31 are performed (Steps S156 to S160).

In the above example, the information output device 2 generates the signature 93 for a usage certificate using a public key pair unique to each information output device 2, but a common public key pair may be set in the key management unit 48 of the information output device 2 before shipment to include a usage certificate in a PF application. In this case, processing steps performed by the information-output-device operation phase (level 1) may be omitted.

As stated above, in the second embodiment, by integrating the usage certificate distribution server 6 and the information output device 2 into one, the information operating device 1 can acquire a usage certificate by communicating only with the information output device 2 and the information-output-device setup phase is made unnecessary, which can simplify the entire process.

(Third Embodiment)

As shown in FIG. 16, the usage certificate shown in the first and second embodiments includes the unique Web-application ID 91, Web-application source 92, and signature 93. On the other hand, in a third embodiment, permissible machine operating commands are made different depending on each Web application.

Figure 37:
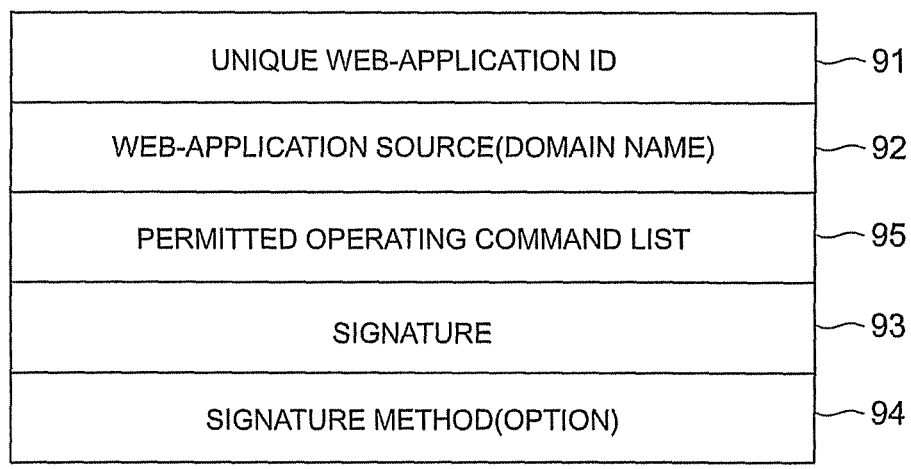
FIG. 37 is a diagram showing a format example of the usage certificate according to a third embodiment.

FIG. 37 shows a format example of the usage certificate according to the third embodiment. The usage certificate shown in FIG. 37 is different from FIG. 16 in further having a permitted operating command list 95. This permitted operating command list is also stored in the Web-application information storing unit 77 together with the domain name etc. corresponding to the Web application ID.

In the first and second embodiments, the signature is generated for the data including the unique Web-application ID, Web-application domain name, and PIN. On the other hand, in the third embodiment, the permitted operating command list is added to these data items. The following is an example of how to calculate the signature.

Signature=rsa(secret key, sha1(unique Web-application ID||Web-application domain name||PIN||operating command list))

"Secret key" is the secret key which is unique to the information output device 2 and acquired from the information-output-device information storing unit 72, and this value is used as a secret key to calculate "signature." The signature is a value calculated for the data obtained by combining the unique Web-application ID, Web-application domain name, PIN, and operating command list using the SHA1 algorithm. Based on the result of the calculation, the signature is obtained using the RSA algorithm. In the example shown here, the RSA algorithm is used to calculate the signature, but another well-known public key algorithm such as elliptic curve cryptography may be used.

Figure 38:
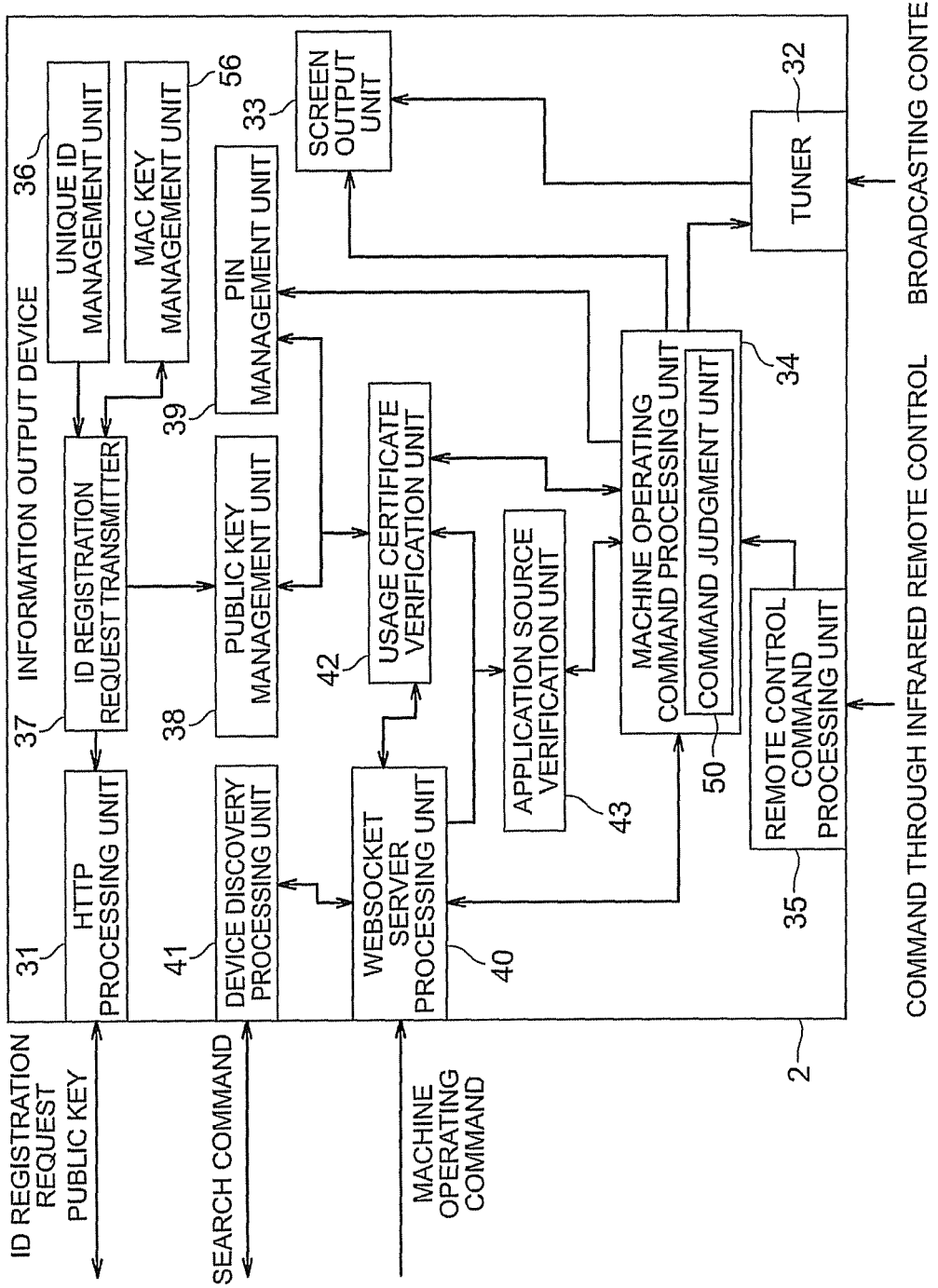
FIG. 38 is a block diagram showing the internal configuration of the information output device 2 according to the third embodiment.

FIG. 38 is a block diagram showing the internal configuration of the information output device 2 according to the third embodiment. The second embodiment shows an example of integrating the usage certificate distribution server 6 and the information output device 2 into one. Here, explanation will be given on an example where the usage certificate distribution server 6 and the information output device 2 are separated as in the first embodiment. That is, the usage certificate is acquired from the usage certificate distribution server 6. FIG. 38 is different from FIG. 4 in that a command judgment unit 50 is provided in the machine operating command processing unit 34.

The command judgment unit 50 judges whether a machine operating command transmitted from the information operating device 1 is included in the operating command list notified by the usage certificate verification unit 42, and if included, accepts the machine operating command and if not included, rejects the machine operating command.

The process sequence to be performed is similar to the first and second embodiments.

Figure 39:
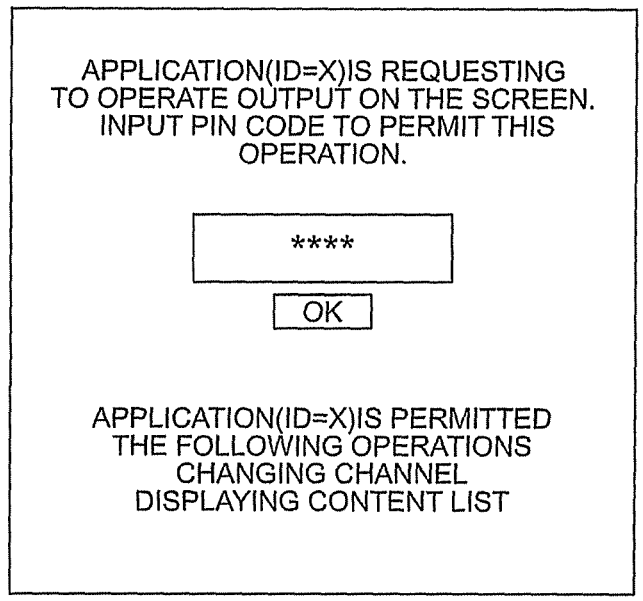
FIG. 39 is a diagram showing a screen requesting input of a PIN code.

The third embodiment is based on the assumption that permitted machine operating commands are made different depending on each Web application. It is possible to notify the user about the machine operating commands which will possibly be executed by the Web application, on the screen of the information operating device 1. Concretely, as shown in FIG. 39, when the PIN input Web application induces the user to input a PIN, the PIN input Web application may output a list of operating commands permitted for the Web application to the screen output unit 33 of the information output device 2. Naturally, the above category numbers may be displayed instead of the permitted command list.

The PIN input Web application shown in FIG. 39 is distributed from the Web application distribution server 4 to the information operating device 1. The Web application distribution server 4 is configured similarly to FIG. 7B, and the Web application storing unit 52 stores the domain name corresponding to the unique Web-application ID and the permitted operating command list as a set.

As shown in the first embodiment, the information operating device 1 transmits an acquisition request for the PIN input Web application to the Web application distribution server 4 using the following URL.

http://example-Webserver.com/input_pin.php?appid=X

The Web application distribution unit 54 of the Web application distribution server 4 acquires, from the Web application storing unit 52, an operating command list corresponding to the Web application having the unique Web-application ID, and outputs the permitted operating command list shown in FIG. 39. In this way, the user can understand the operating commands permitted for the Web application before inputting a PIN for the Web application. For example, if the user does not want to transmit a specific operating command to the information output device 2 by the Web application, no PIN should be inputted. This leads to an advantage the user can judge whether the Web application is dangerous by him/herself. The information output device 2 receives a usage certificate in the information-output-device operation phase (level 2), and if the inspections performed by the usage certificate verification unit 42 and application source inspection unit 43 are successful, interprets the machine operating command included in the operating command list 95 to notify the machine operating command processing unit 34 which machine operating commands should be permitted. The command judgment unit 50 of the machine operating command processing unit 34 judges whether a machine operating command transmitted from the information operating device 1 is included in the operating command list notified by the usage certificate verification unit 42, and if included, accepts the machine operating command and if not included, rejects the machine operating command.

When generating a usage certificate by the usage certificate generator 79 of the usage certificate distribution server 6 (first embodiment), or by the usage certificate generator 46 of the information output device 2 (second Embodiment), the operating command list 95 in the usage certificate showing that which machine operating command should be permitted for which Web application is made different depending on each Web application. For example, Web application #X is permitted to transmit, to the information output device 2, a channel change command, a content list display command, and a content elimination command, while Web application #Y is permitted to transmit, to the information output device 2, only the channel change command and content list display command.

Note that the operating command list 95 may list the machine operating commands one by one, or may categorize the machine operating commands. For example, when the channel change command and content list display command belong to Category 1 and the content elimination command belongs to Category 2, the operating command list 95 includes a category number permissible for the Web application. The command judgment unit 50 inspects whether the category to which a machine operating command transmitted from the information operating device 1 belongs is included in the operating command list 95, and if included, permits the machine operating command.

Further, categories may be regarded as priority levels and the largest number in the operating command list 95 shows permission for Web applications. When Category 2 is described in the operating command list 95, machine operating commands included in Category 1 and Category 2 may be permitted. The command judgment unit 50 compares the category to which the machine operating command transmitted from the information operating device 1 belongs with the categories included in the operating command list 95, and if the category to which the machine operating command belongs has a smaller number than the categories included in the operating command list 95, the machine operating command is permitted. For example, when the operating command list 95 includes Category 2, if the information operating device 1 transmits a machine operating command to change the channel command, this command is permitted since the channel change command belongs to Category 1. On the other hand, when the operating command list 95 includes Category 1, if the information operating device 1 transmits a machine operating command to delete content, this command is rejected since the content elimination command belongs to Category 2, which is larger than Category 1 included in the operating command list 95.

As stated above, in the third embodiment, permitted machine operating commands can be made different depending on each Web application. Assume that Web application X is permitted the channel change command and content list display command, and Web application Y is permitted only the channel change command. In other words, the permitted operating command list included in the usage certificate for Web application X is different from the permitted operating command list included in the usage certificate for Web application Y. Further, as explained above, the Web application distribution server 4 may store a plurality of Web applications in the same domain. In this case, Web application X and Web application Y are distributed from the same domain name of the Web application distribution server 4, and the Web-application source included in usage certificates has the same value.

When Web application X and Web application Y has the same source, if Web application Y acquires a usage certificate for Web application X and uses it to transmit a machine operating command to the information output device 2 in the information-output-device operation phase (level 2), the information output device 2 accepts the operations permitted for Web application X based on the usage certificate. In other words, Web application Y can execute the content list display command in the information output device 2 although Web application Y is not actually permitted to do so.

However, if the usage certificate distribution server 6 specifies the Web application acquiring the usage certificate by its URL utilizing the HTTP redirect, the usage certificate distribution server 6 can restrict the Web application capable of acquiring a usage certificate. In other words, if the URL of Web application X is specified by the HTTP redirect when transmitting a usage certificate for Web application X to the information operating device 1, the usage certificate for Web application X can be acquired only by Web application X. This makes it possible to prevent the usage certificate for Web application X from being acquired by a Web application different from Web application X.

Figure 40:
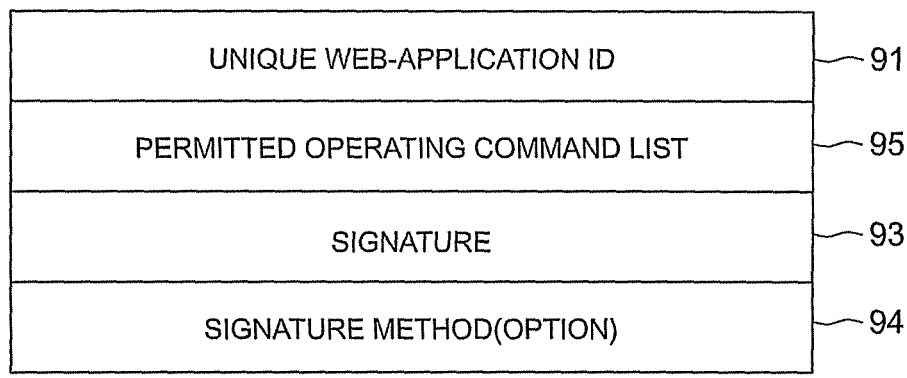
FIG. 40 is a diagram showing a format example of the usage certificate.

In the first embodiment, a domain list is provided in the PF application of the information operating device 1 to inspect whether the domain name of a downloaded Web application is included in the domain list. Note that the domain name of the Web application should not necessarily be included in a usage certificate. FIG. 40 shows a format example of the usage certificate in this case. The usage certificate shown in FIG. 40 is different from FIG. 37 in that the Web-application source 92 is omitted.

As stated above, in the third embodiment, by including a list of machine operating commands permitted for a Web application in a usage certificate, permissible machine operating commands can be made different depending on each Web application. For example, it is possible to permit a Web application developed by the manufacturer of the information output device 2 to execute every machine operating command while permitting a Web application developed by a partner company of the manufacturer of the information output device 2 to execute restricted machine operating commands. Further, the restrictions may be loosened if the partner company makes a special licensing agreement with the manufacturer of the information output device 2, to develop business.

(Fourth Embodiment)

The first, second, and third embodiments are based on the assumption that the Web application distribution server 4 stores a plurality of Web applications in the same domain. In a fourth embodiment to be explained below, the Web application distribution server 4 may similarly store a plurality of Web applications in the same domain, but the Web applications are required to utilize the same usage certificate to reduce the process of the usage certificate distribution server 6.

Figure 41:
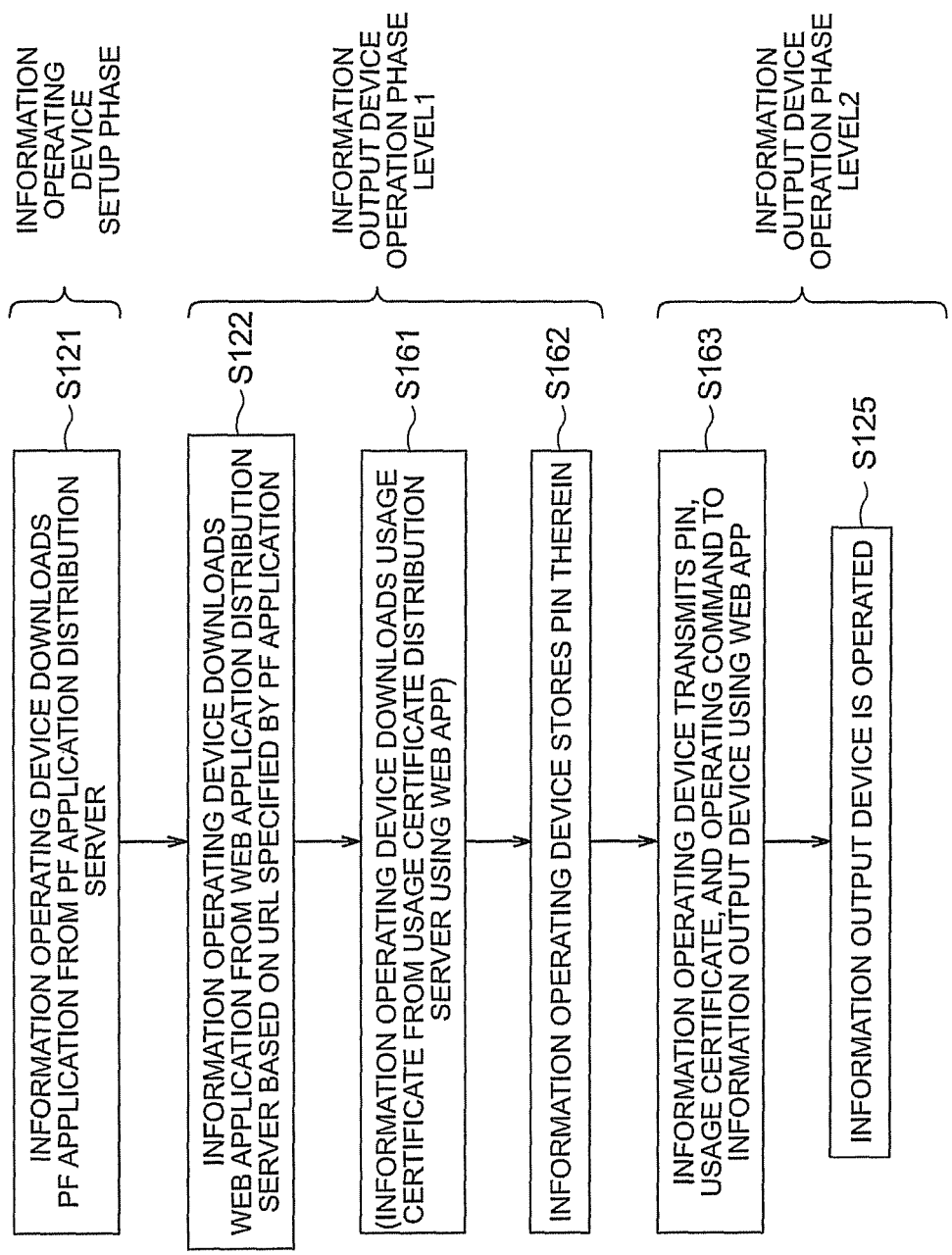
FIG. 41 is a sequence diagram showing the processing steps performed in a fourth embodiment.

FIG. 41 is a sequence diagram showing the processing steps performed by the information operating device 1, information output device 2, PF application distribution server 5, and Web application distribution server 4 according to the fourth embodiment. The sequence diagram of FIG. 41 is different from FIG. 30 shown in the second and third embodiments in that the information operating device 1 inputs a PIN without communicating with the usage certificate distribution server 6 in the information-output-device operation phase (level 1) (Step S162), a usage certificate is differently downloaded in the information-output-device operation phase (level 2) (Step S161), and that the information operating device 1 differently communicates with the information output device 2 (Step S163).

Hereinafter, explanation will be given on the differences from the third embodiment. This embodiment is characterized in changing the signature part in the format of the usage certificate to reduce the process of the usage certificate distribution server 6. The characteristics of the fourth embodiment can be applied to the first embodiment or to the second embodiment.

In the third embodiment, when the information operating device 1 receives a usage certificate from the information output device 2 in the information-output-device operation phase (level 1), the information operating device 1 transmits an inputted PIN to the information output device 2. On the other hand, in the fourth embodiment, the PIN is stored in the information operating device 1 (Step S162), and is not transmitted to the information output device 2 when requesting the usage certificate. Further, in the third embodiment, the usage certificate is received from the information output device 2. On the other hand, in the fourth embodiment, similarly to the first embodiment, the information operating device 1 receives the usage certificate from the usage certificate distribution server 6 (Step S161).

In this embodiment, the usage certificate is not a value unique to the information output device 2. Further, since the usage certificate can be previously calculated, there is no need to distribute the usage certificate from the usage certificate distribution server 6. The usage certificate can be generated when distributing a Web application or a PF application, and can be distributed as one of the resources of the PF application at that time. In such a case, there is no need to download the usage certificate from the usage certificate distribution server 6. That is, Step S161 can be omitted. First, explanation will be given on an example of distributing a usage certificate from the usage certificate distribution server 6. Note that the usage certificate has a different format (data structure). The format of the usage certificate will be mentioned later.

Further, in the third embodiment, the information operating device 1 transmits only a usage certificate to the information output device 2 in the information-output-device operation phase (level 2). On the other hand, in the fourth embodiment, the usage certificate is transmitted together with the PIN stored in the information-output-device operation phase (level 1) (Step S163).

Figure 42:
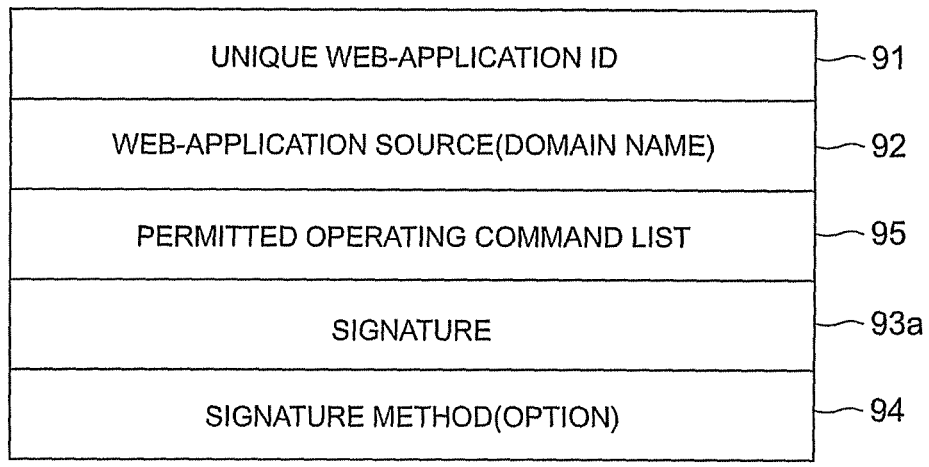
FIG. 42 is a diagram showing a format example of the usage certificate according to the fourth embodiment.

FIG. 42 shows a format example of the usage certificate according to the fourth embodiment. The usage certificate shown in FIG. 42 is difference from FIG. 37 in how to calculate a signature 93*a*. In the third embodiment, the signature is generated for the data including the unique Web-application ID, Web-application domain name, and PIN.

On the other hand, in the fourth embodiment, the signature is generated for the data including only the unique Web-application ID and Web-application domain name, omitting the PIN. Further, in the third embodiment, the secret key is a value unique to the information output device 2. On the other hand, in the fourth embodiment, the secret key is a value common to a plurality of information output devices 2. The following is an example of how to calculate the signature.

Signature=rsa(secret key, sha1(unique Web-application ID∥Web-application domain name∥operating command list))

The public key corresponding to the secret key is shared among a plurality of information output devices 2. The signature is calculated using this value as a secret key. The signature is a value calculated for the data obtained by combining the unique Web-application ID, Web-application domain name, PIN, and operating command list using the SHA1 algorithm. Based on the result of the calculation, the signature is obtained using the RSA algorithm. In the example shown here, the RSA algorithm is used to calculate the signature, but another well-known public key algorithm such as elliptic curve cryptography may be used.

Note that the operating command list is optional, and should not be necessarily included in the calculation of the signature.

The following is an example of how to calculate the signature in this case.

Signature=rsa(secret key, sha1(unique Web-application ID∥Web-application domain name))

In this case, the signature is a value calculated for the combination of the unique Web-application ID, Web-application domain name, and PIN using the SHA1 algorithm.

Figure 43:
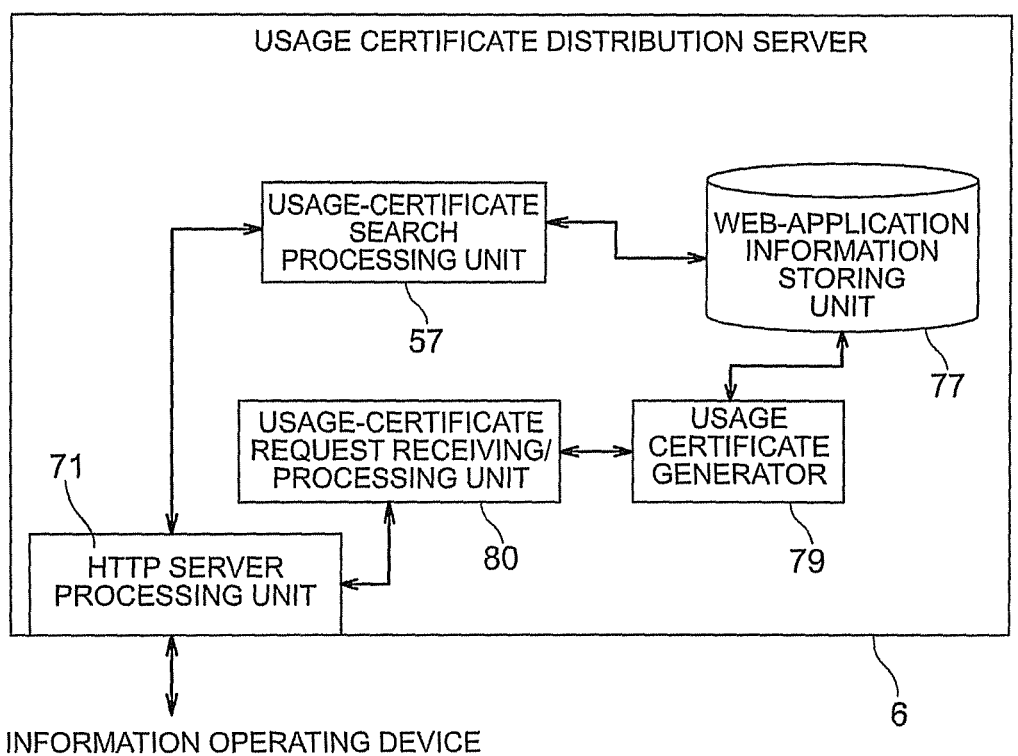
FIG. 43 is a block diagram showing the internal configuration of the usage certificate distribution server 6 according to the fourth embodiment.

FIG. 43 is a block diagram showing the internal configuration of the usage certificate distribution server 6 according to the fourth embodiment. FIG. 43 is different from FIG. 7A in that the internal configuration of the usage certificate distribution server 6 is more simplified than FIG. 7A, by providing only the HTTP server processing unit 71, usage-certificate registration receiving/processing unit 78, usage certificate generator 79, Web-application information storing unit 77, and a usage-certificate search processing unit 57.

The HTTP server processing unit 71 and usage-certificate registration receiving/processing unit 78 function similarly to those of FIG. 7A. Note that the usage-certificate registration receiving/processing unit 78 is not an essential component.

The Web-application information storing unit 77 stores a usage certificate attached with a signature.

The usage certificate generator 79 generates a usage certificate. Since the format of the usage certificate is different from the third embodiment, the process for generating the usage certificate is also different. In FIG. 7A, a secret key unique to the information output device 2 is generated and stored in the information-output-device information storing unit 72, to generate a signature for a usage certificate using the secret key. In the fourth embodiment, a signature for a usage certificate is generated using a secret key common to a plurality of information output devices 2. Note that the public key corresponding to this secret key is previously stored in the public key management unit 38 of the information output device 2. In the fourth embodiment, information about the information output device 2 is not required to generate a usage certificate, and thus a usage certificate can be generated without communicating with the information output device 2. The usage certificate should not be necessarily generated by the usage certificate distribution server 6 since it can be generated by a device having the secret key corresponding to the public key common to the information output devices 2. The usage certificate generated by a device (not shown) having the secret key corresponding to the public key common to the information output devices 2 may be registered in the Web-application information storing unit 77. When the usage certificate distribution server 6 does not calculate a signature for the usage certificate, the usage certificate generator 79 is not an essential component. In this case, the usage-certificate registration receiving/processing unit 78 receives a usage certificate attached with a signature, and stores it directly in the Web-application information storing unit 77.

Based on a request from the information operating device 1, the usage-certificate search processing unit 57 searches a usage certificate which is attached with a signature and stored in the Web-application information storing unit 77, and transmits it to the information output device 2 utilizing the HTTP server processing unit 71. As a concrete process example, the information operating device 1 specifies a unique Web-application ID, and the usage-certificate search processing unit 57 acquires a usage certificate stored in the Web-application information storing unit 77 using the specified unique Web-application ID as a key and transmits the usage certificate to the information operating device 1.

In the third embodiment, based on a usage certificate request from the information operating device 1, a usage certificate unique to the information output device 2 and Web application must be generated based on the ID unique to the information output device 2 included in the usage certificate request. However, in the fourth embodiment, by searching and acquiring a usage certificate stored in the Web-application information storing unit 77, the encryption process for generating a signature can be omitted, which makes it possible to considerably reduce the calculation process capability required for the usage certificate distribution server 6. Further, in the third embodiment, the number of usage certificates to be generated is a number obtained by multiplying the number of Web applications by the number of information output devices. However, in the fourth embodiment, since the usage certificate is not unique to the information output device 2, and is unique only to the Web application, the number of usage certificates to be generated is the same as the number of Web applications, which makes it possible to considerably reduce the process for generating a usage certificate. Further, the third embodiment is based on the assumption that a usage certificate is generated each time a usage certificate request is transmitted from the information operating device 1. On the other hand, in the fourth embodiment, usage certificates corresponding to the number of Web applications can be previously generated.

In this way, in the fourth embodiment, the process of the usage certificate distribution server 6 can be simplified.

Figure 44:
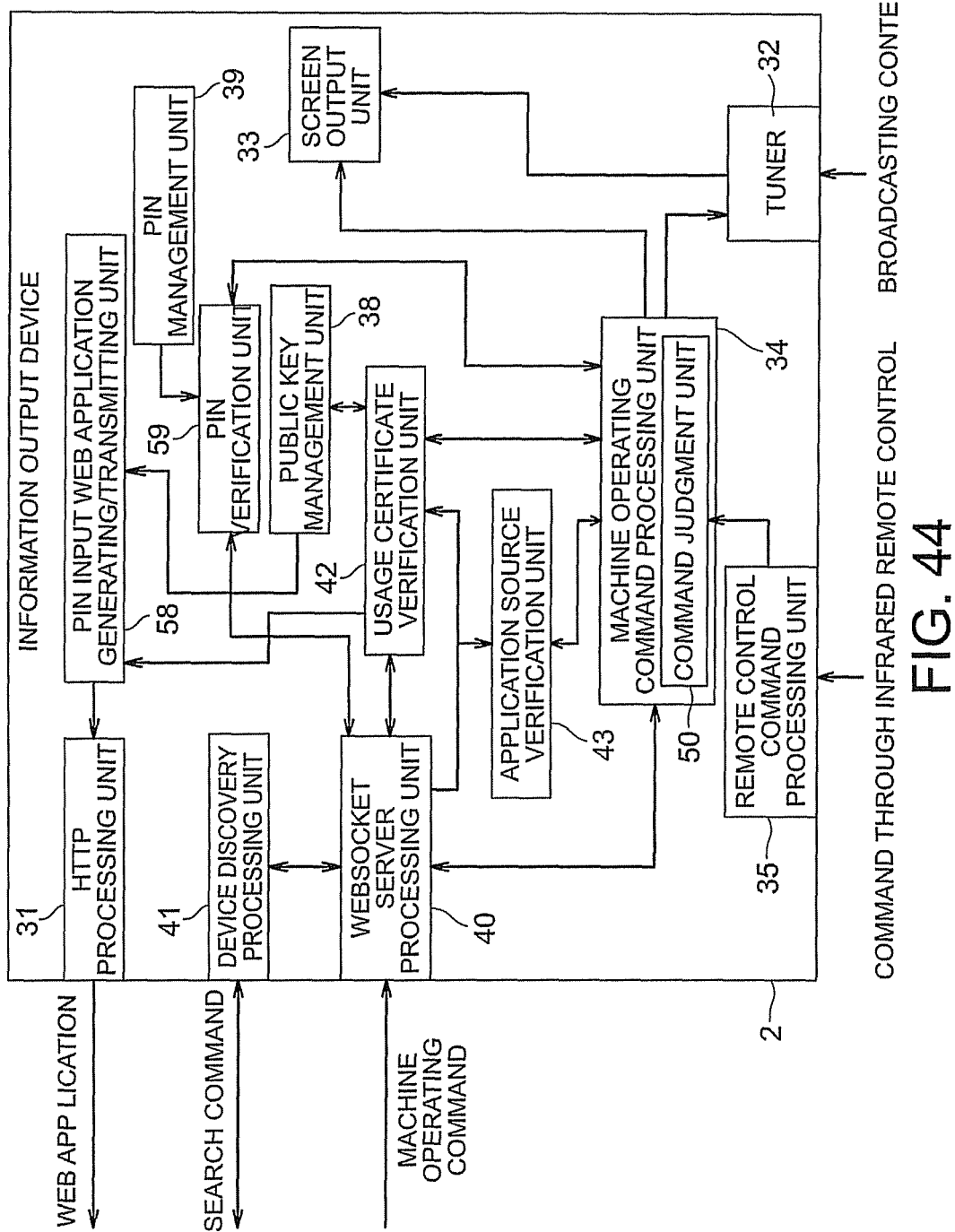
FIG. 44 is a block diagram showing the internal configuration of the information output device 2 according to the fourth embodiment.

FIG. 44 is a block diagram showing the internal configuration of the information output device 2 according to the fourth embodiment. FIG. 44 is different from FIG. 38 in that a PIN input Web application generating/transmitting unit 58 and a PIN inspection unit 59 are newly provided, and that the unique ID management unit 36, MAC key management unit 56, and ID registration request transmitter 37 of FIG. 38 are omitted.

As shown in FIG. 15, the PIN input Web application generating/transmitting unit 58 generates a Web application (PIN input Web application) for displaying a PIN input screen on the information operating device 1, and transmits it to the information operating device 1. When a PIN input Web application request message from the information operating device 1 includes a signature for a usage certificate, the PIN input Web application generating/transmitting unit 58 verifies the validity of the signature for the usage certificate by the public key stored in the public key management unit 38, and if the verification is successful, the PIN input Web application may be transmitted to the information operating device 1. This is effective when the information (e.g., permitted operating command list) included in a usage certificate transmitted from the information operating device 1 is falsified on the communication path. For example, assume that a certain Web application is permitted to execute a channel change command and a content list display command. However, if the permitted operating command list is falsified on the communication path to request the content list display command only, the information output device 2 receives it and displays, on the screen of FIG. 39, that the "content list display command" is permitted. The user watching this screen may possibly input a PIN wrongly judging that he/she is authorized to execute the content list display command only, although the Web application can actually execute the channel change command and content list display command. The information output device 2 has no Web-application information storing unit, and thus cannot grasp the permitted operating command list of the Web application. However, the information output device 2 can check whether the usage certificate is legitimate by verifying the signature for the usage certificate, and thus the permitted operating command list same as the usage certificate can be displayed by the PIN input Web application. In this way, the PIN input Web application can display correct information to the user.

The PIN inspection unit 59 inspects whether the PIN transmitted from the information operating device 1 through the WebSocket connection corresponds to a value registered in the PIN management unit 39, and notifies the machine operating command processing unit 34 about the inspection result.

Figure 45:
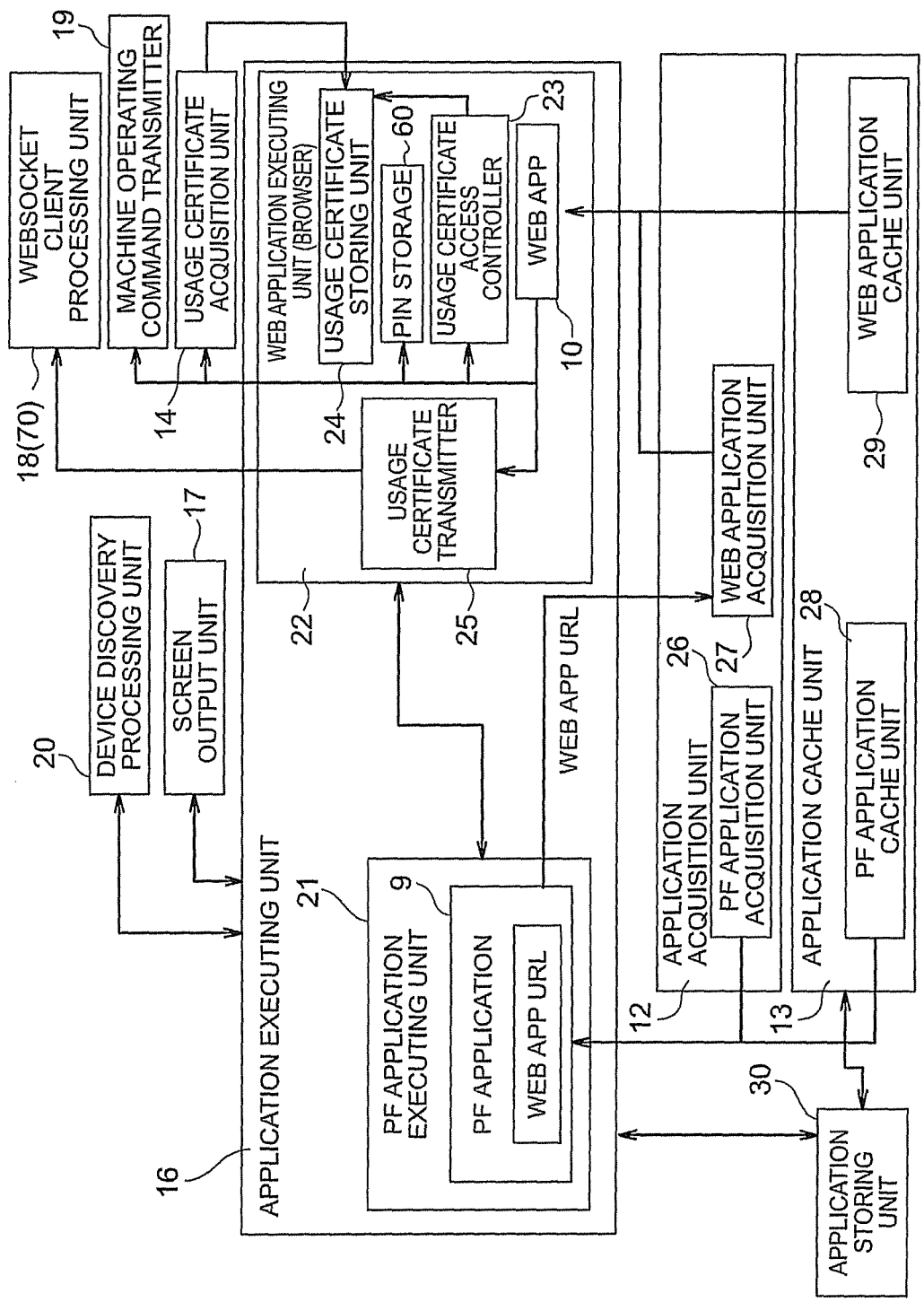
FIG. 45 is a block diagram showing the internal configuration of the information operating device according to the fourth embodiment.

FIG. 45 is a block diagram showing an example of the internal configuration of the application executing unit 16, application acquisition unit 12, and application cache unit 13 in the information operating device 1 according to the fourth embodiment. FIG. 45 is different from FIG. 3 in that a PIN storage 60 is newly provided.

The PIN storage 60 temporarily stores the PIN value received by the input receiver 15.

Figure 46:
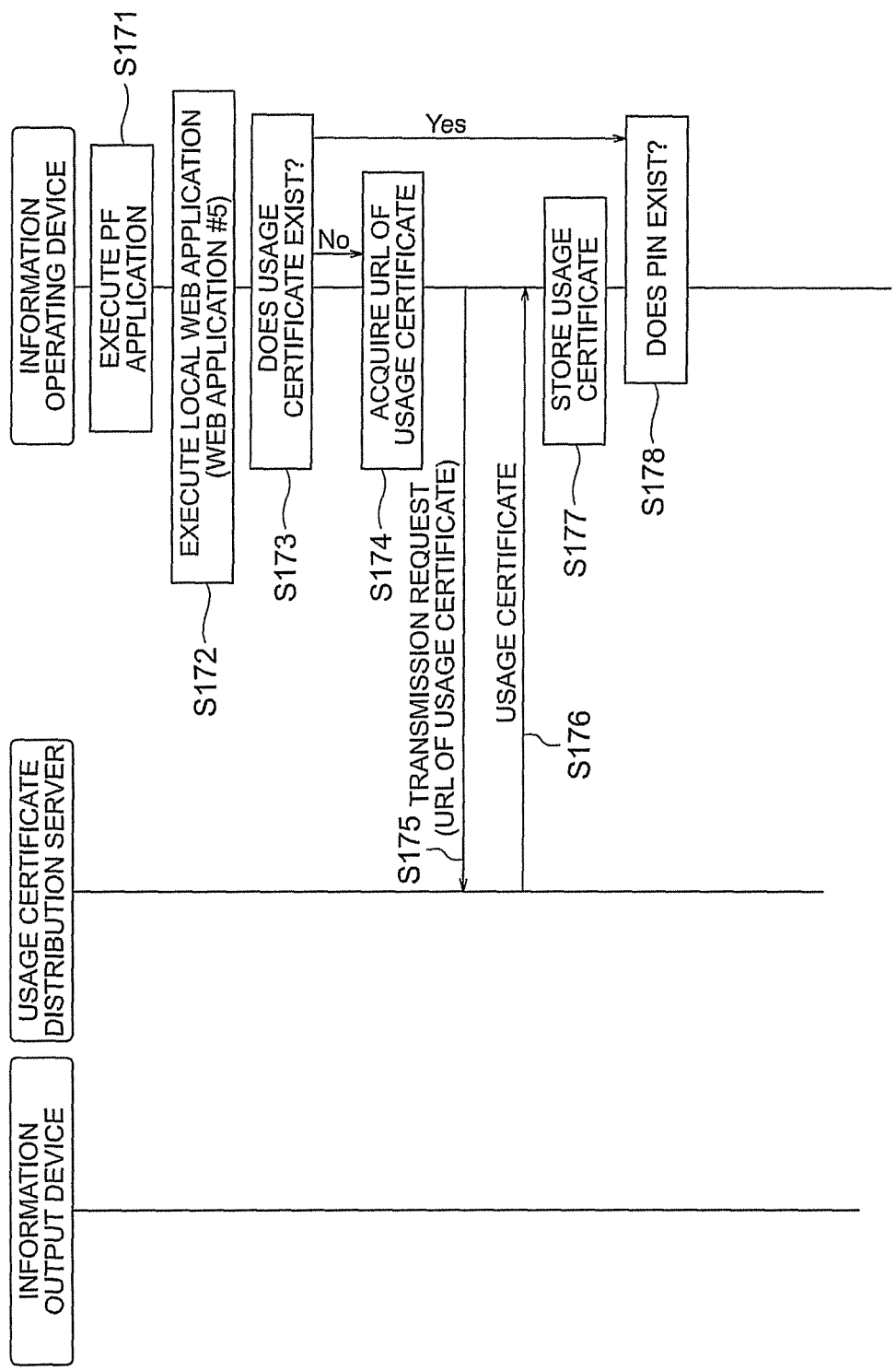
FIG. 46 is a sequence diagram in the information-output-device operation phase (level 1) according to the fourth embodiment.
Figure 47:
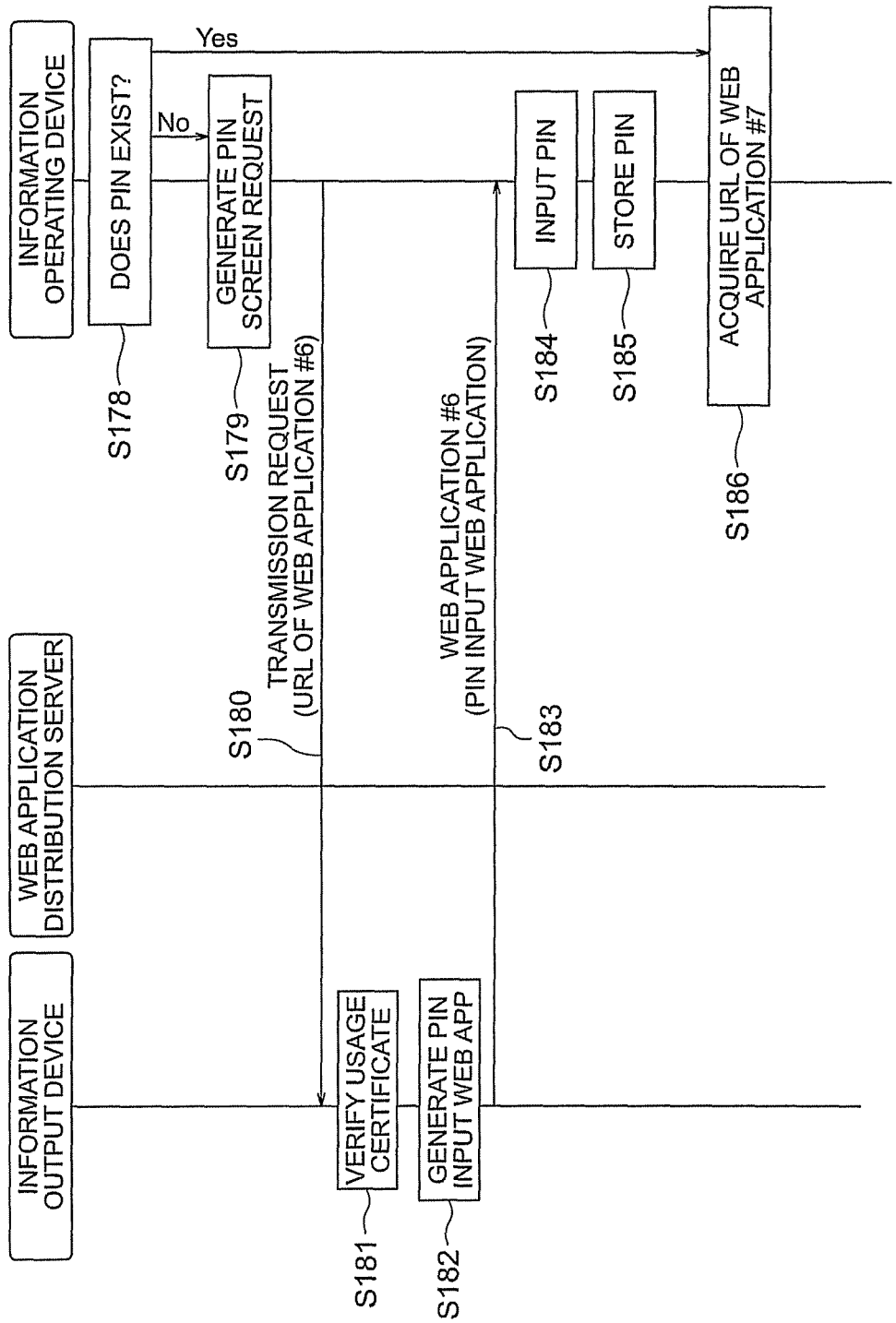
FIG. 47 is a sequence diagram following FIG. 46.
Figure 48:
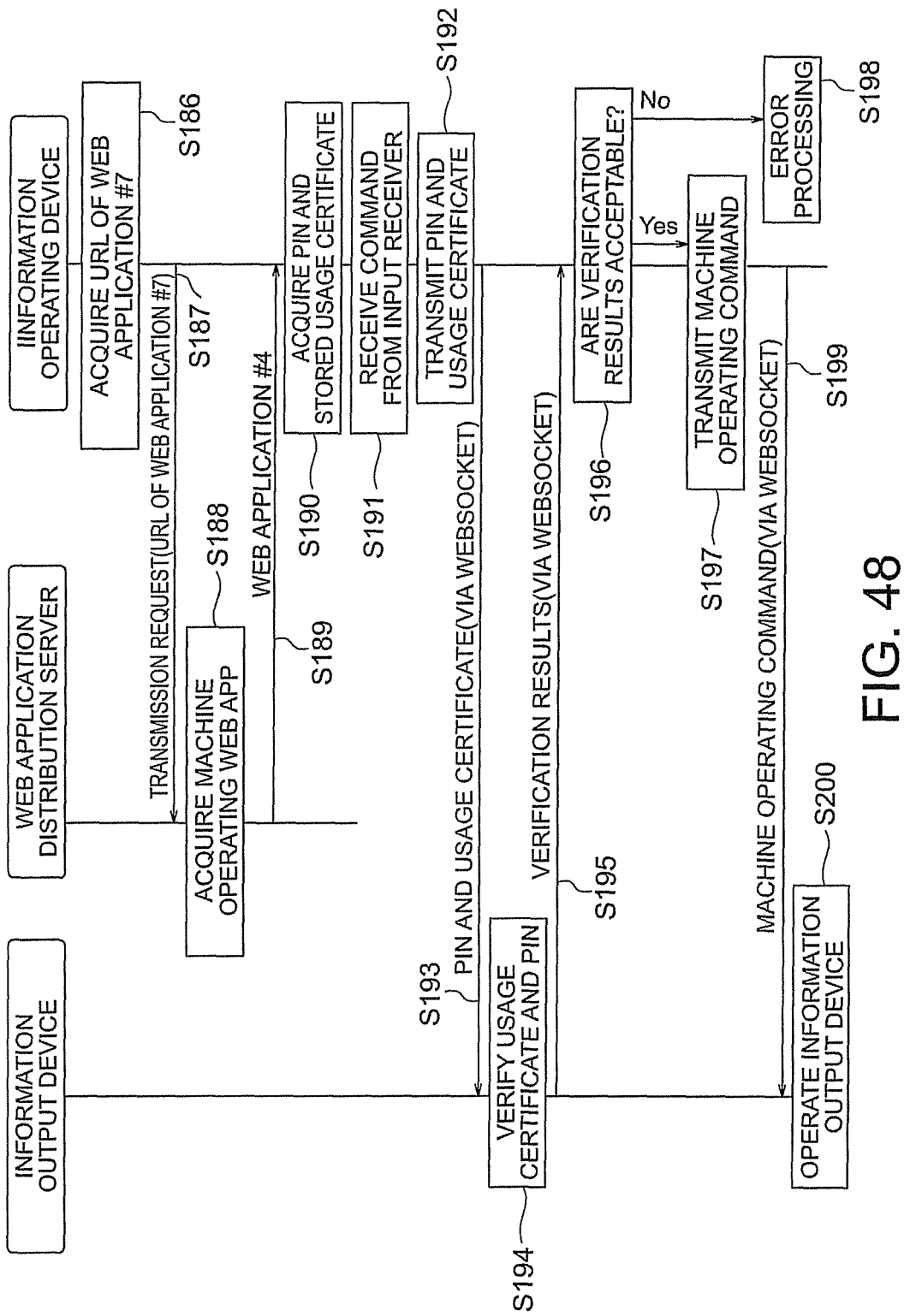
FIG. 48 is a sequence diagram following FIG. 47.

FIGS. 46 to 48 are sequence diagrams showing the processing steps performed by the information operating device 1, usage certificate distribution server 6, Web application distribution server 4, and information output device 2 in the information-output-device operation phase (Level 1, Level 2) according to the fourth embodiment. The information-output-device setup phase is unnecessary, similarly to the second embodiment. The information-operating-device setup phase is executed similarly to the first or second embodiment.

The steps of executing a PF application (Step S171) and executing a local Web application (Step S172) are the same as Steps S131 and S132 of FIG. 31. The local Web application used in this example may be replaced by a Web application downloaded from the Web application distribution server 4. In this case, as shown in FIG. 18, the PF application has only the URL of the Web application and the URL is passed from the PF application executing unit 21 to the Web application acquisition unit 27, and the Web application acquisition unit 27 transmits a Web application transmission request to the Web application distribution server 4 based on the URL to download the Web application from the Web application distribution server 4 and to execute the Web application by the Web application executing unit 22.

First, the local Web application (Web application #5) checks whether its usage certificate exists in the information operating device 1 (Step S173). If the usage certificate is already acquired, the flow proceeds to Step S178.

As stated above, in the present embodiment, the usage certificate does not depend on the unique ID of the information output device 2, and the same Web application uses the same usage certificate even when the information output device to be operated by the Web application is different. Therefore, the usage certificate may be included in the package of a PF application to be distributed. In this case, when the PF application is installed, the usage certificate is stored in the application storing unit 30 as partial data of the PF application. In this case, the Web application may acquire the usage certificate from the application storing unit 30 without inspecting whether the usage certificate exists.

When there is no usage certificate in the information operating device 1, the information operating device 1 acquires a URL which is determined with respect to each Web application and previously included in an application package (Step S174), and transmits a usage certificate acquisition request to the usage certificate distribution server 6 based on this URL (Step S175). This transmission is achieved using the HTTP processing unit 11 via the HTTP (or HTTPS) protocol. The following is an example of the usage certificate request message transmitted from the information operating device 1 to the usage certificate distribution server 6.

https://example-CAserver.com/req_token.php?appid=X

In this example, to a usage certificate distribution server specified as "example-CAserver.com," a value of "X" labeled with appid is specified as the unique Web-application ID.

The following message is also available.
https://example-CAserver.com/appidX/token.dat In this case, since the usage certificate is merely a file specified as "token.dat," the usage certificate distribution server 6 should be configured similarly to the Web application distribution server 4.

In the fourth embodiment, the usage certificate is a value which is unique to each Web application but is not unique to the information output device 2, and thus the ID unique to the information output device 2 is not included in the request message. Further, since there is no need to calculate a usage certificate including a PIN, the PIN value also is not included in the request message.

Upon receiving the usage certificate request message, the usage certificate distribution server 6 acquires, based on the unique Web-application ID, a usage certificate attached with a signature and stored in the Web-application information storing unit 77, and transmits the usage certificate to the information operating device 1 as a response to the usage certificate request message (Step S176).

Web application #5 stores the received usage certificate in the usage certificate storing unit 24 (Step S177). In the third embodiment, when the information operating device 1 stores a usage certificate, the usage certificate distribution server 6 specifies a range of Web applications capable of utilizing the usage certificate, and the access to the stored usage certificate is controlled by the usage certificate access controller 23 when a Web application utilizes the usage certificate. However, this process is not required in the fourth embodiment. In other words, in the fourth embodiment, the usage certificate access controller 23 is not an essential component.

Next, Web application #5 inspects whether a PIN is included in the information operating device 1 (Step S178). If the PIN is already included, a machine operating Web application is acquired based on the URL included in Web application #5. If no PIN is included, a PIN screen request message is generated based on the URL included in Web application #5 (Step S179) to request the information output device 2 to transmit a PIN input Web application (Step S180). Concretely, the Web application acquisition unit 27 of the information operating device 1 transmits a PIN input Web application (Web application #6) acquisition request to the information output device 2 using the HTTP processing unit 31 via the HTTP (or HTTPS) protocol. The following is an example of this request message.

http://example-Webserver.com/input_pin.php?appid=X&origin=xxxx&signature=yyyy&signature_method=rsa-sha1

As stated above, a usage certificate attached with a signature is attached to the parameters of the URL so that the information output device 2 can verify the signature for the usage certificate.

Further, this request message includes the URL of a machine operating Web application (Web application #7).

http://example-Webserver.com/input_pin.php?appid=X&origin=xxxx&signature=yyyy&signature_method=rsa-sha1&url=example-Webserver.com/appid7

Upon receiving the PIN screen request message, the information output device 2 generates a PIN input Web application (Web application #6) by the PIN input Web application generating/transmitting unit 58 (Step S182). At this time, the signature for the usage certificate may be verified using the public key accumulated in the public key management unit 38 (Step S181).

The information operating device 1 receives Web application #6 (Step S183), and executes Web application #6 by the Web application executing unit 22. The screen image of Web application #6 serving as a PIN input Web application is as shown in FIG. 15. Web application #6 acquires the PIN value inputted through the input receiver 15 (Step S184), stores the PIN (Step S185), acquires the URL included in Web application #6 or Web application #5 (Step S186), generates a machine operating Web application (Web application #7) acquisition request based on the URL, and transmits the request to the Web application distribution server 4 (Step S187). Concretely, in accordance with the instruction from Web application #6, the Web application acquisition unit 27 of the information operating device 1 transmits a machine operating Web application (Web application #7) acquisition request to the Web application distribution server 4 using the HTTP processing unit 31 via the HTTP (or HTTPS) protocol. The Web application distribution server 4 receives this request and transmits Web application #7 to the information operating device 1 (Step S188).

In the third embodiment, the PIN value inputted to acquire a usage certificate is included in a usage certificate request message and transmitted from the information operating device 1 to the information output device 2. On the other hand, in the present embodiment, the PIN value is not required to acquire a usage certificate. Accordingly, no PIN is transmitted to acquire a usage certificate.

After that, the information operating device 1 acquires Web application #7 from the Web application distribution server 4 (Step S189), and executes it by the Web application executing unit 22.

Web application #7 acquires the PIN and stored usage certificate (Step S190). Here, the PIN inputted and stored at Step S185 is utilized. At Step S185, the PIN may be stored as a cookie file of the browser, similarly to the usage certificate, or may be stored as a hash fragment.

When storing the PIN as a cookie, Web application #6 sets a URL range so that Web application #7 can acquire the PIN value. When Web application #7 acquires the PIN value from cookies, the usage certificate access controller 23 judges whether Web application #7 can acquire the PIN value, similarly to the usage certificate.

When storing the PIN as a hash fragment, Web application #6 should be configured as a PIN screen input program as shown below.

<form method="POST" action="http://example-Webserver.com/webapp7.php?getWebapplication.php#">
<input type="text" name="PIN">
<input type="submit" value="transmission">

Here, when a PIN is inputted, an acquisition request message for Web application #7 is transmitted to the Web application distribution server 4. The PIN is not transmitted to the Web application distribution server 4 since it is stored as a hash fragment. Note that the PIN value may be transmitted to the Web application distribution server 4 in order to simplify the configuration of the PIN input Web application.

Web application #7 transmits the acquired PIN and usage certificate to the information output device 2 utilizing the WebSocket connection (Steps S192 and S193). Concretely, based on an instruction from Web application #7, the WebSocket client processing unit 18 of the information operating device 1 transmits the PIN and usage certificate to the information output device 2 through the WebSocket connection. At this time, the domain attacher 70 in the WebSocket client processing unit 18 attaches the domain name (origin information) of the Web application being executed by the Web application executing unit 22 to the WebSocket header. That is, the domain name of the Web application (Web application #7) being executed by the Web application executing unit 22 is included in the header of the WebSocket connection for transmitting the PIN and usage certificate, and transmitted from the information operating device 1 to the information output device 2. The information output device 2 inspects whether the Web-application domain name included in the usage certificate corresponds to the domain name included in the WebSocket header or whether the Web-application domain name included in the header of the WebSocket connection is included in the Web-application origin information (domain name) included in the usage certificate, and if corresponds or included, the inspection is judged to be successful.

The information output device 2 inspects the received use certificate and PIN value (Step S194). The use certificate inspection unit 42 inspects whether the signature included in the use certificate is genuine. The PIN inspection unit 59 inspects whether the PIN corresponds to the value managed by the PIN management unit 39. The information operating device 1 judges whether all of the domain inspection, use certificate inspection, and PIN inspection are successful. The judgment result may be transmitted from the information output device 2 to the information operating device 1 (Step S195). If the inspections are judged to be failure, the information output device 2 may disconnect the WebSocket connection.

When transmitting the judgment result from the information output device 2 to the information operating device 1, the information operating device 1 performs error processing if the judgment result shows failure (Step S198), and transmits a machine operating command if the judgment result shows success (Step S197).

When the information output device 2 disconnects the WebSocket connection judging that the judgment result shows failure, the information operating device 1 may perform error processing judging that the disconnection means that the judgment result shows failure (Step S198). When the WebSocket connection is not disconnected, the information operating device 1 transmits a machine operating command (Step S197).

Further, based on an instruction from the machine operating Web application (Web application #7), the WebSocket client processing unit 18 of the information operating device 1 transmits a machine operating command to the information output device 2 through the WebSocket connection (Step S199).

When both of the usage certificate inspection and PIN inspection are successful, the information output device 2 accepts the machine operating commands transmitted from the information operating device 1 thereafter. If any one of the inspections is failed, the machine operating command is rejected and error processing is performed, and subsequent machine operating commands are also rejected. Similarly to the third embodiment, only when both of the inspections are successful, machine operating commands included in the operating command list are interpreted to notify the machine operating command processing unit 34 about which machine operating commands are permissible. Subsequent steps (Steps S199 and S200) are the same as FIG. 19.

In FIGS. 46 to 48, similarly to FIG. 19, Web application #5 and Web application #7 are different Web applications, but Web application #5 and Web application #7 may be the same. In this case, the URL of Web application #7 is the same as the URL of Web application #5. The process for acquiring Web application #7 (Steps S185 to S187) is omitted, and Web application #5 performs the steps from storing a usage certificate to transmitting a machine operating command (Steps S188 to S197).

As stated above, in the fourth embodiment, the data structure of the usage certificate is changed so that a plurality of information output devices 2 can hold a common usage certificate. This makes it possible to reduce the process of the usage certificate distribution server 6.

(Fifth Embodiment)

In the third embodiment, permissible machine operating commands are made different depending on each Web application.

Further, in the fourth embodiment, a plurality of Web applications in the same domain utilize the same usage certificate, and the information operating device 1 acquires a PIN input Web application from the information output device 2. In a fifth embodiment to be explained below, permissible machine operating commands are made different depending on each Web application, a plurality of Web applications in the same domain utilize the same usage certificate, and the information operating device 1 acquires a PIN input Web application from a PIN input Web application distribution server 4a.

Figure 49A:
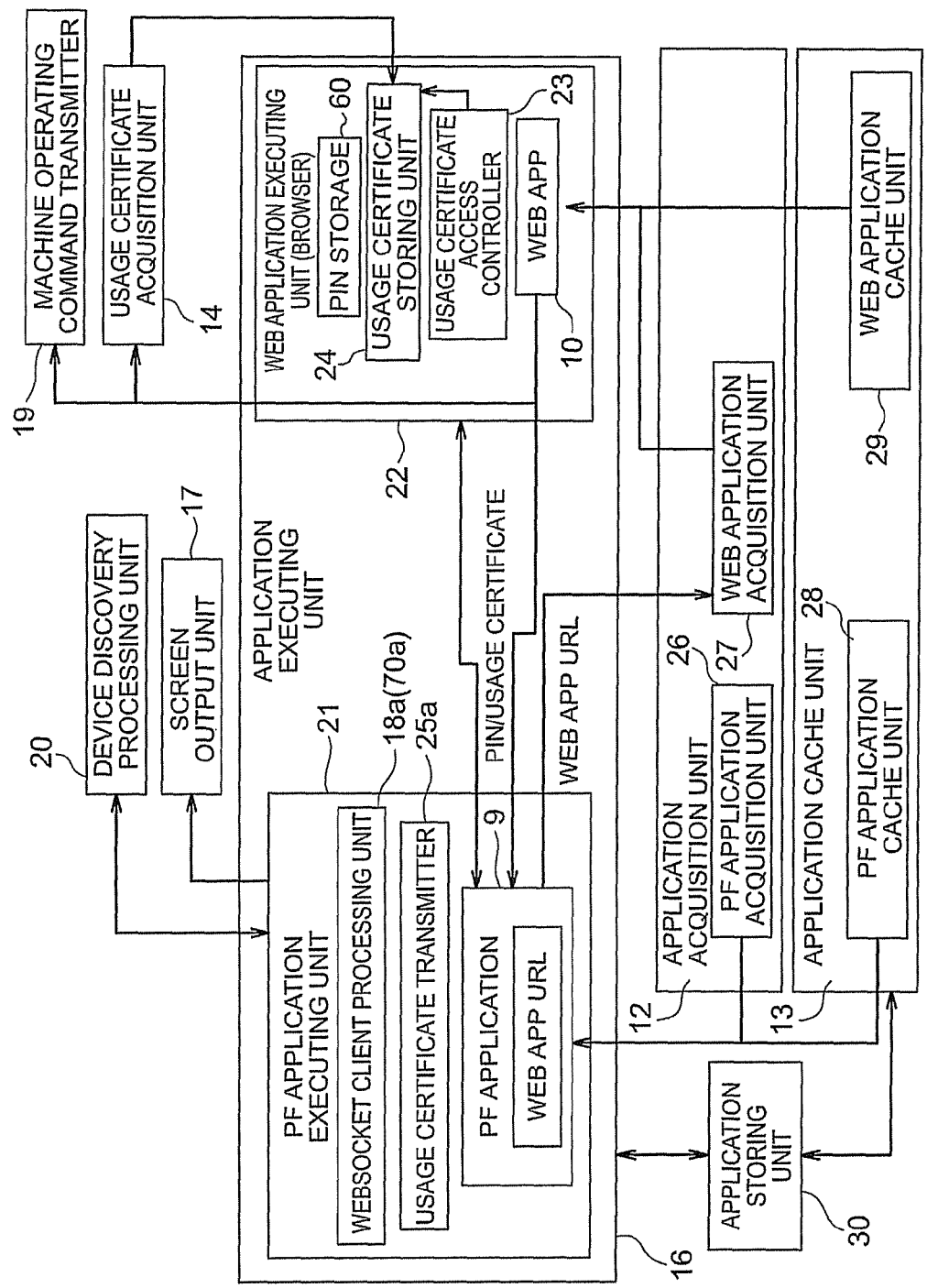
FIG. 49A is a block diagram showing the internal configuration of the information operating device 1 according to a fifth embodiment.

FIG. 49A is a block diagram showing the internal configuration of the information operating device 1 according to the fifth embodiment.

FIG. 49A is different from FIG. 24 in that the PIN storage 60 is provided in the Web application executing unit 22, and that the WebSocket client processing unit 18a in the PF application executing unit 21 transmits a PIN in addition to a usage certificate.

The PIN storage 60 stores a PIN value inputted by the user. The PIN may be stored as a cookie file of the browser, for example.

Note that the usage certificate access controller 23 manages not only the usage certificates stored in the usage certificate storing unit 24 but also the PIN values stored in the PIN storage 60, with respect to the respective domains of the Web application distribution server 4.

Figure 50:
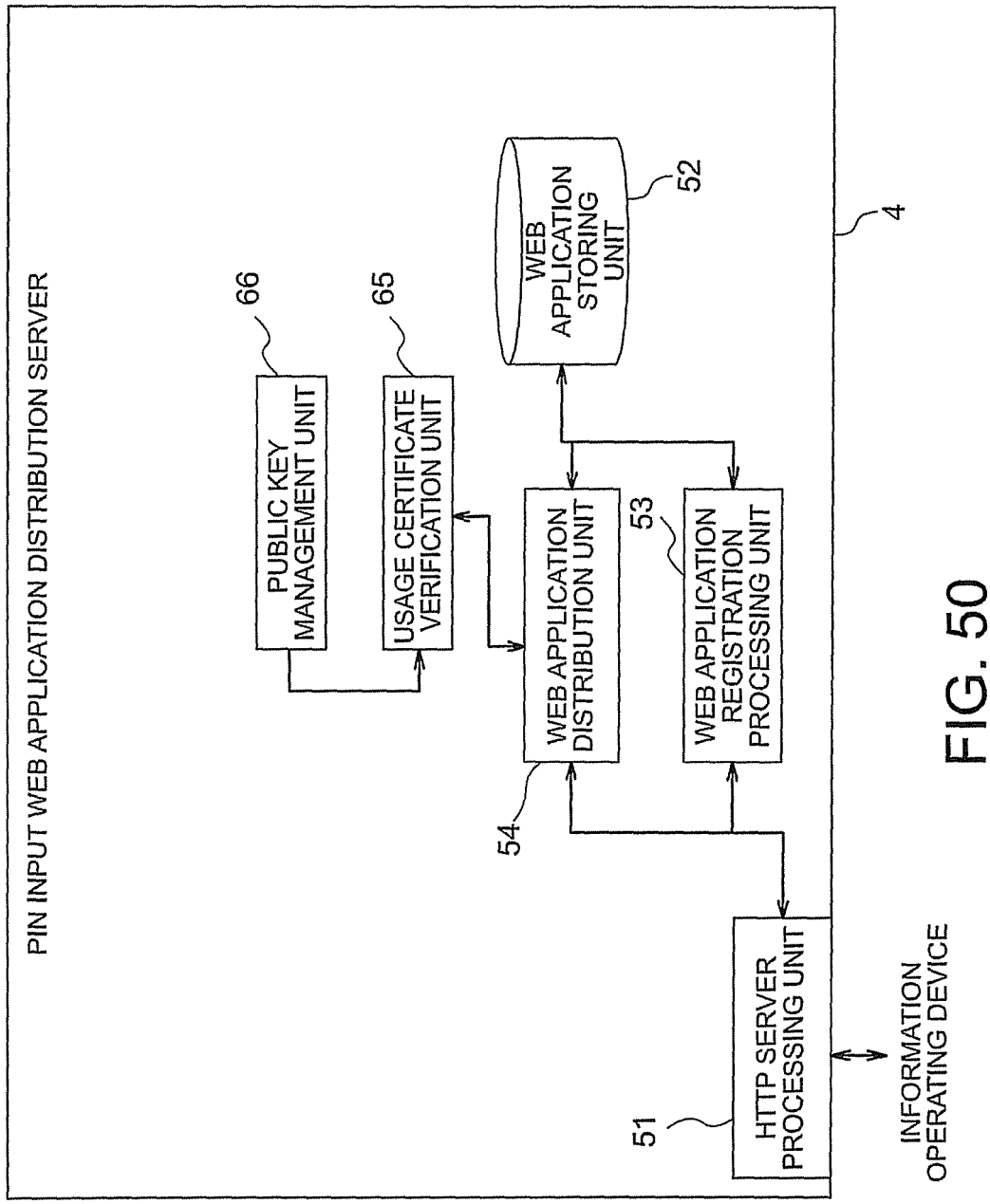

FIG. 50 is a block diagram showing the internal configuration of the PIN input Web application distribution server 4a according to the fifth embodiment. The PIN input Web application distribution server 4a has the HTTP server processing unit 51, the Web application storing unit 52, the Web application registration processing unit 53, the Web application distribution unit 54, a usage certificate inspection unit 65, and a public key management unit 66. The HTTP server processing unit 51, Web application storing unit 52, and Web application registration processing unit 53 function equivalently to those of the Web application distribution server 4 shown in FIG. 5.

The public key management unit 66 stores a public key for verifying a usage certificate transmitted from the information operating device 1 together with a PIN input Web application transmission request.

The usage certificate inspection unit 65 performs signature verification on the usage certificate transmitted from the information operating device 1 together with the PIN input Web application transmission request, by using a public key stored in the public key management unit 66.

Before transmitting a PIN input Web application to the information operating device 1, the Web application distribution unit 54 transmits a usage certificate to the usage certificate inspection unit 65 and receives the signature verification result as a response. Only when the signature verification is successful, the PIN input Web application is transmitted to the information operating device 1. When the signature verification is failed, the PIN input Web application is not transmitted to the information operating device 1. Note that this signature verification process is not essential.

Figure 51A:
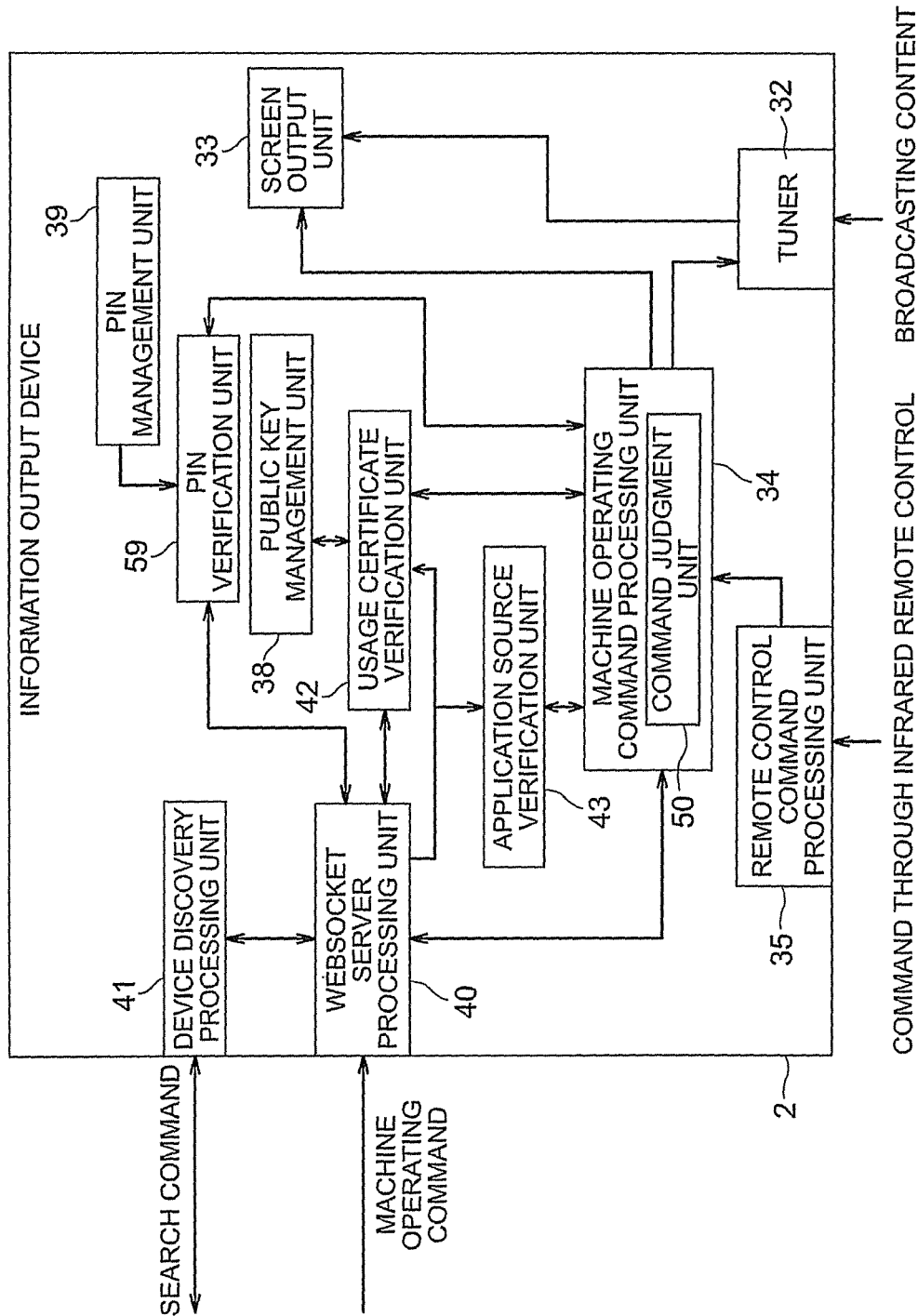
FIG. 51A is a block diagram showing the internal configuration of the information output device 2 according to the fifth embodiment.

FIG. 51A is a block diagram showing the internal configuration of the information output device 2 according to the fifth embodiment.

FIG. 51A is different from FIG. 44 in that the HTTP processing unit 31 and PIN input Web application generating/transmitting unit 58 are omitted. In the fifth embodiment, the information operating device 1 receives a PIN input Web application from the PIN input Web application distribution server 4a, and thus the information output device 2 is not required to have this function. The other components are the same as in FIG. 44.

Figure 52:
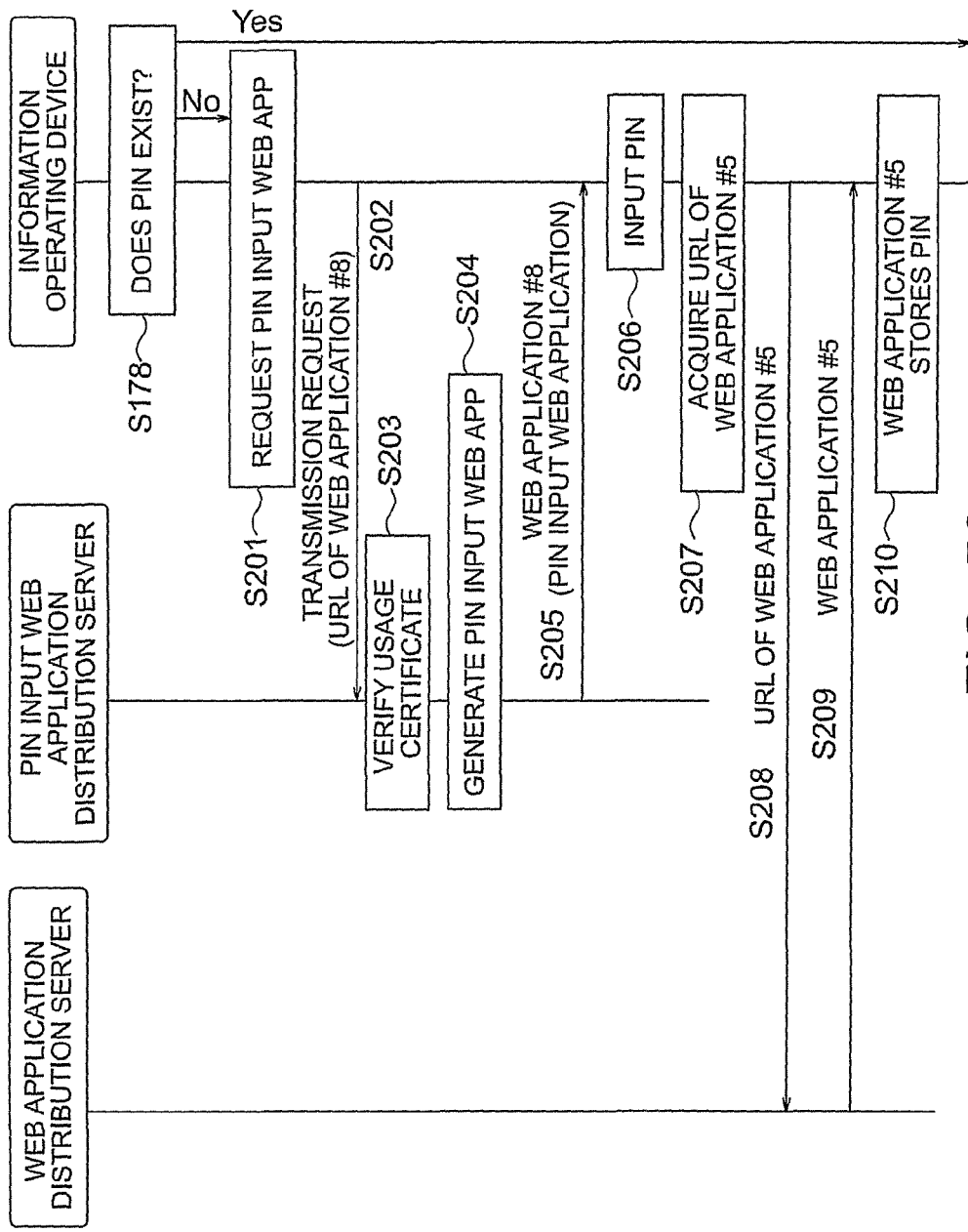
FIG. 52 is a sequence diagram showing the processing steps performed in the fifth embodiment.
Figure 53A:
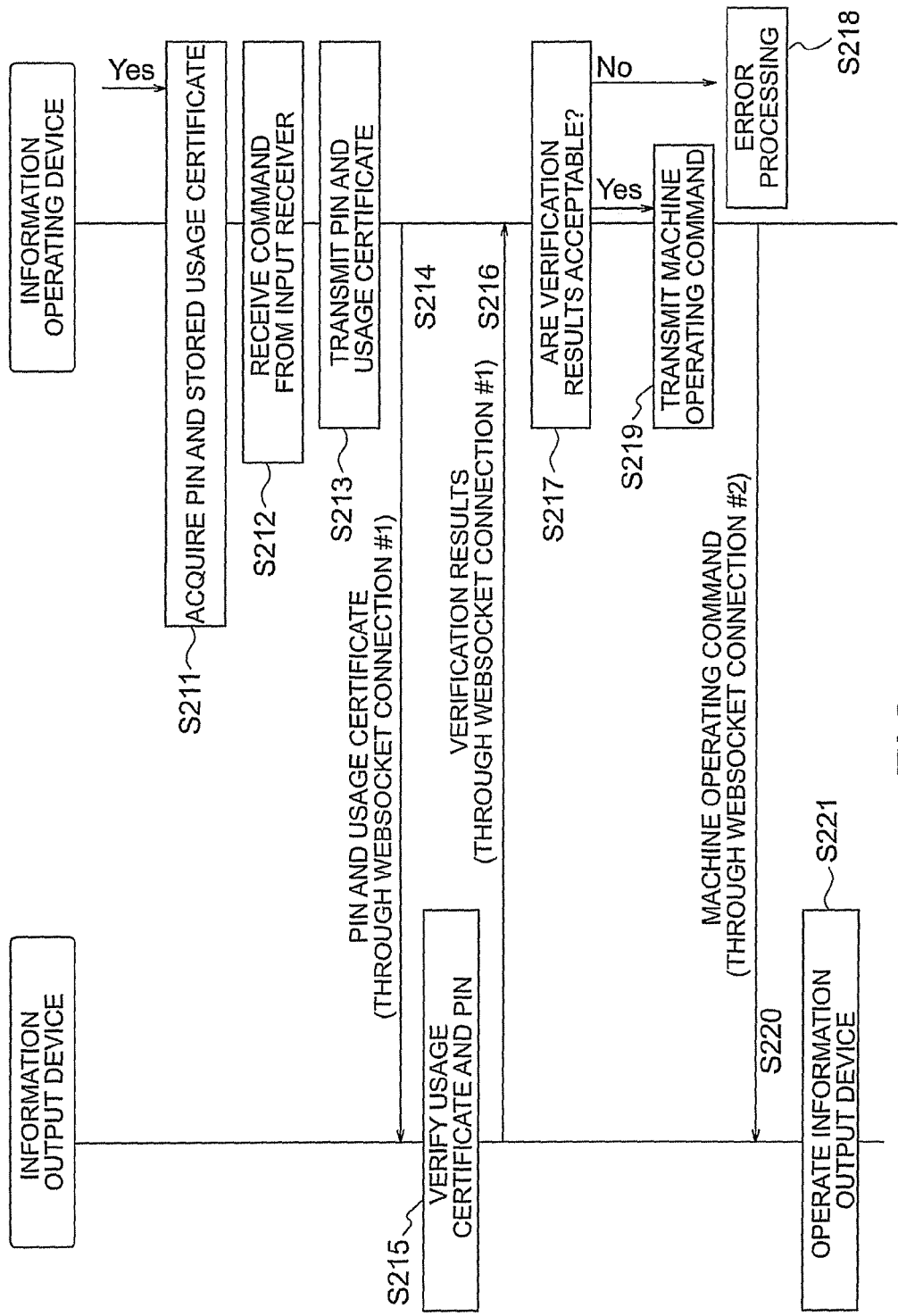
FIG. 53A is a sequence diagram following FIG. 52.

FIGS. 52 and 53A are sequence diagrams showing the processing steps performed by the information operating device 1, PIN input Web application distribution server 4a, Web application distribution server 4, and information output device 2 in the information-output-device operation phase (Level 1, Level 2) according to the fifth embodiment. The information-output-device setup phase is unnecessary, similarly to the second embodiment. The information-operating-device setup phase is executed similarly to the first or second embodiment.

In FIG. 52, the same processings as Steps S171-S178 in FIG. 46 are performed.

When no PIN exists, a local Web application (Web application #5) of the information operating device 1 transmits a PIN input Web application acquisition request to the PIN input Web application distribution server 4a (Steps S201 and S202). Concretely, based on the command from Web application #5, the Web application acquisition unit 27 of the information operating device 1 transmits a PIN input Web application (Web application #8) acquisition request to the PIN input Web application distribution server 4a using the HTTP processing unit 31 via the HTTP (or HTTPS) protocol. The following is an example of the PIN input Web application request message transmitted from the information operating device 1 to the PIN input Web application distribution server 4a.

http://example-PINserver.com/req_pin.php?appid=X&perm=xxxx&origin=zzzz&signature=yyyy&signature_method=rsa-sha1& url=example-Webserver.com/appid5

In this example, a usage certificate is transmitted to a PIN input Web application distribution server specified as "example-PINserver.com". Concretely, a value of "X" labeled with appid is specified as a unique Web-application ID, a value of "zzzz" labeled with origin is specified as origin information (domain name) corresponding to this Web application, a value of "yyyy" labeled with signature is specified as a signature for the usage certificate, and a value of "rsa-sha1" labeled with signature_method is specified to show that the signature method is RSA-SHA1. "url" is specified as the URL specified by the PF application, that is, the URL of the local Web application (Web application #5). The usage certificate is transmitted to the PIN input Web application distribution server 4a as a request for a PIN input Web application to detect the falsification of the permitted operating command list on the communication path so that the PIN input Web application can display the same permitted operating command list as the usage certificate, as in the fourth embodiment.

The reason of specifying the URL of the local Web application is because of being able to move to the local Web application after inputting a PIN by Web application #8.

The PIN input Web application distribution server 4a verifies the signature included in the usage certificate by checking whether the usage certificate transmitted from the information operating device 1 is legitimate using a public key stored in the public key management unit 66 to verify the usage certificate (Step S203). If the signature verification is successful, Web application #8 (PIN input Web application) is generated utilizing the information about the usage certificate (Step S204), and transmitted to the information operating device 1 (Step S205).

The information operating device 1 receives Web application #8 and executes it by the Web application executing unit 22 (Steps S206 to S210). Web application #8 displays a screen as shown in FIG. 39 by the screen output unit 17. Web application #8 includes a program as shown below.

<form method="POST" action="http://example-Webserver.com/appid5#">
<input type="text" name="PIN">
<input type="submit" value="transmission">

When a PIN is inputted, the program moves to the following URL. Concretely, in accordance with the instruction from Web application #8, the Web application acquisition unit 27 of the information operating device 1 transmits a Web application (Web application #5) acquisition request to the Web application distribution server 4 using the HTTP processing unit 31 via the HTTP (or HTTPS) protocol.

http://example-Webserver.com/appid5#pin

Here, "pin" shows an inputted PIN value. The PIN value is not transmitted to the Web application distribution server 4 since it is stored as a hash fragment. Web application #5 stores the PIN value in the PIN storage 60. At this time, a URL range is set so that the PIN value can be acquired by Web application #5. When Web application #5 acquires the PIN value from cookies, the usage certificate access controller 23 judges whether the PIN can be acquired by Web application #5 similarly to the usage certificate, and if allowed, Web application #5 can acquire the PIN from the PIN storage 60.

When Web application #5 is stored in the Web application cache unit 29 of the application cache unit 13, the Web application acquisition unit 27 is not required to transmit an acquisition request for Web application #5 to the Web application distribution server 4 using the HTTP processing unit 31. Instead, the Web application acquisition unit 27 may acquire Web application #5 stored in the Web application cache unit 29 to execute it by the Web application executing unit 22.

The steps from acquiring the PIN and the stored usage certificate by Web application #5 to transmitting the PIN and usage certificate (Steps S211 to S213) are similar to Steps S190 to S192 of FIG. 48.

After that, in accordance with an instruction from the machine operating Web application (Web application #5), the information operating device 1 establishes a WebSocket connection (WebSocket connection #1) with the information output device 2 using the WebSocket client processing unit 18a, and transmits the PIN and usage certificate to the information output device 2 through the WebSocket connection (Step S214).

The information output device 2 receives and inspects the usage certificate and PIN value (Step S215), and transmits the judgment results to the information operating device 1 (Step S216). These steps are the same as Steps S194 to S195 shown in FIG. 48.

When inspections performed by the information output device 2 result in success, based on an instruction from the machine operating Web application (Web application #5), the information operating device 1 establishes a WebSocket connection (WebSocket connection #2) with the information output device 2 using the WebSocket client processing unit 18, and transmits a machine operating command to the information output device 2 (Step S220).

In the example shown here, the WebSocket client processing unit 18a is used to establish WebSocket connection #1 to transmit the PIN and usage certificate, and the WebSocket client processing unit 18 is used to establish WebSocket connection #2 to transmit the machine operating command. However, the following patterns are also available.

Figure 49B:
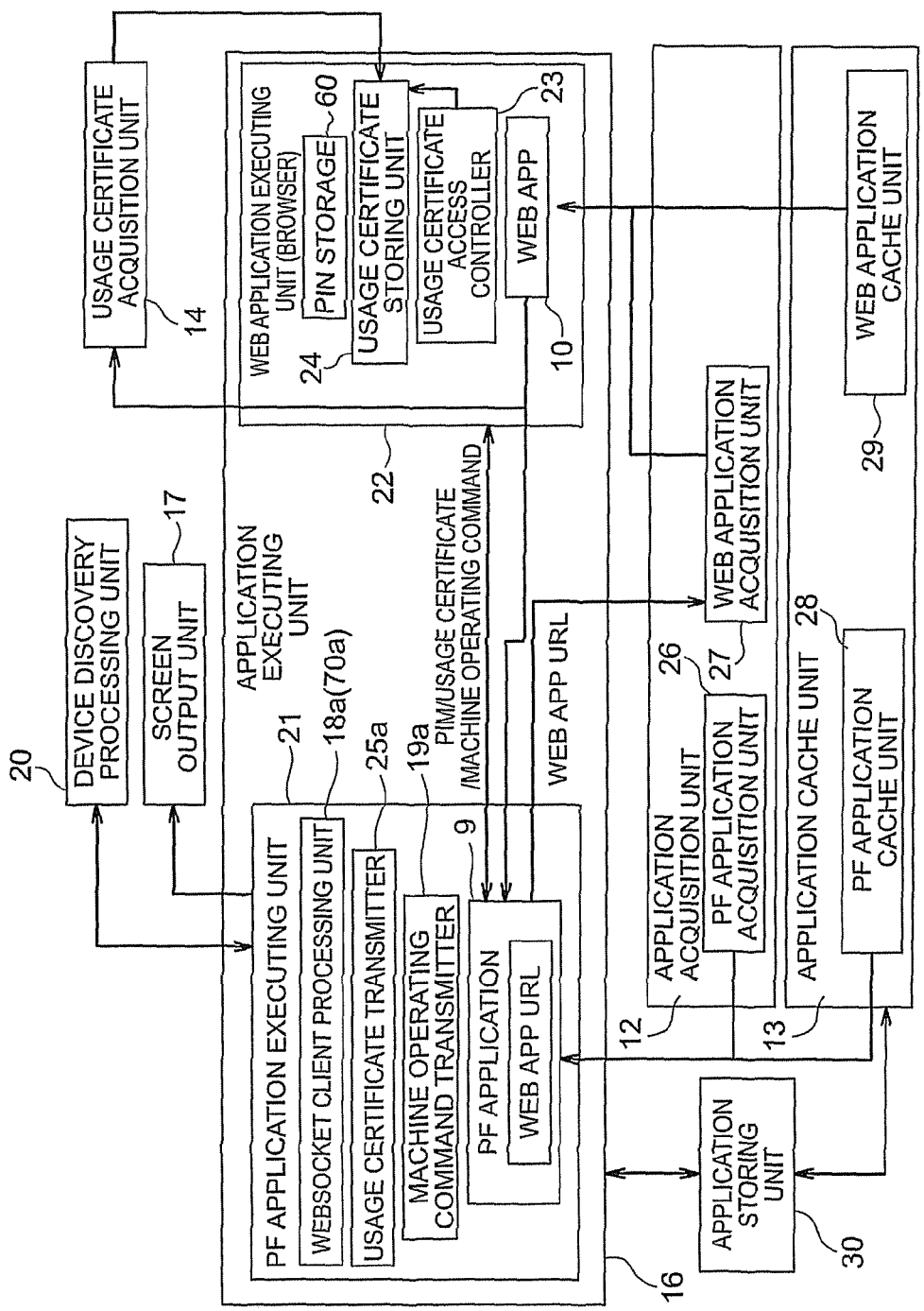
FIG. 49B is a block diagram showing a modification example derived from FIG. 49A.

(1) Both of WebSocket connection #1 and WebSocket connection #2 are established using the WebSocket client processing unit 18a. WebSocket connection #1 and WebSocket connection #2 are different from each other. This case will be explained using FIG. 49B, which is a block diagram showing an example of the internal configuration of the application executing unit 16, application acquisition unit 12, and application cache unit 13 in the information operating device 1. FIG. 49B is different from FIG. 49A in that a machine operating command transmitter 19a is provided in the PF application executing unit 21, the PF application executing unit 21 acquires, from the Web application executing unit 22 a machine operating command in addition to a PIN and a usage certificate so that the machine operating command can be transmitted from the PF application executing unit 21, and that the machine operating command transmitter 19a in the PF application executing unit 21 transmits the machine operating command to the information output device 2 using the WebSocket client processing unit 18a.

Figure 49C:
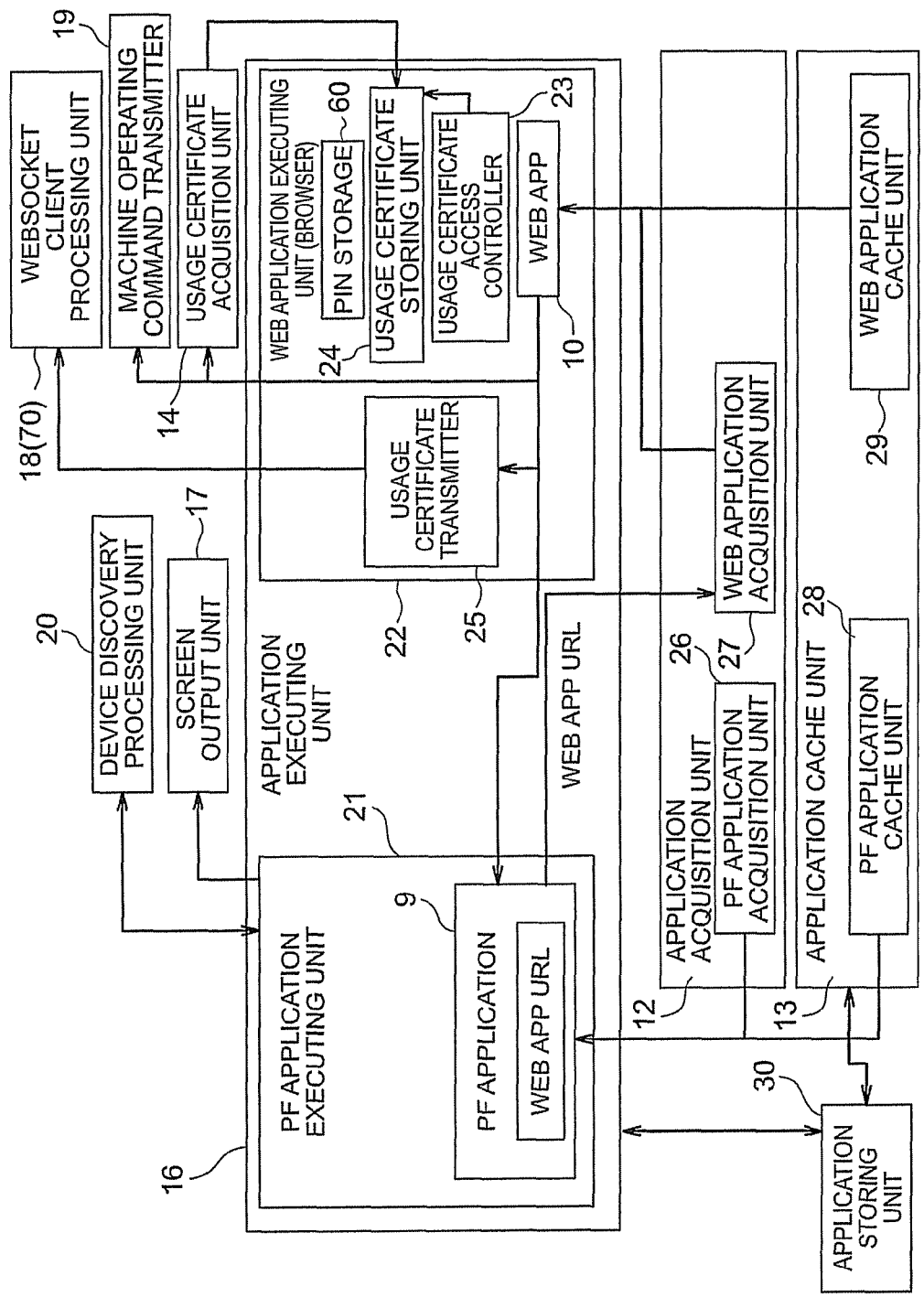
FIG. 49C is a block diagram showing another modification example derived from FIG. 49A.

(2) Both of WebSocket connection #1 and WebSocket connection #2 are established using the WebSocket client processing unit 18. WebSocket connection #1 and WebSocket connection #2 are different from each other. This case will be explained using FIG. 49C, which is a block diagram showing an example of the internal configuration of the application executing unit 16, application acquisition unit 12, and application cache unit 13 in the information operating device 1. FIG. 49C is different from FIG. 49A in that the WebSocket client processing unit 18a and usage certificate transmitter 25a are not provided in the PF application executing unit 21, the usage certificate transmitter 25 is provided in the Web application executing unit 22, and that the WebSocket client processing unit 18 is used to transmit a usage certificate to the information output device 2.

In the example explained above, the WebSocket connection for transmitting a PIN and a usage certificate and the WebSocket connection for transmitting a machine operating command are different from each other. However, all of these items may be transmitted using the same WebSocket connection as mentioned below. This case will be explained using FIG. 53B, which is a sequence diagram showing the processing steps performed by the information operating device 1 and information output device 2.

(3) The WebSocket client processing unit 18a is used to establish a WebSocket connection for transmitting a PIN, a usage certificate, and a machine operating command. In this case, the internal configuration of the application executing unit 16, application acquisition unit 12, and application cache unit 13 in the information operating device 1 is the same as FIG. 49B.

(4) The WebSocket client processing unit 18 is used to establish a WebSocket connection for transmitting a PIN, a usage certificate, and a machine operating command. In this case, the internal configuration of the application executing unit 16, application acquisition unit 12, and application cache unit 13 in the information operating device 1 is the same as FIG. 49C.

Figure 53B:
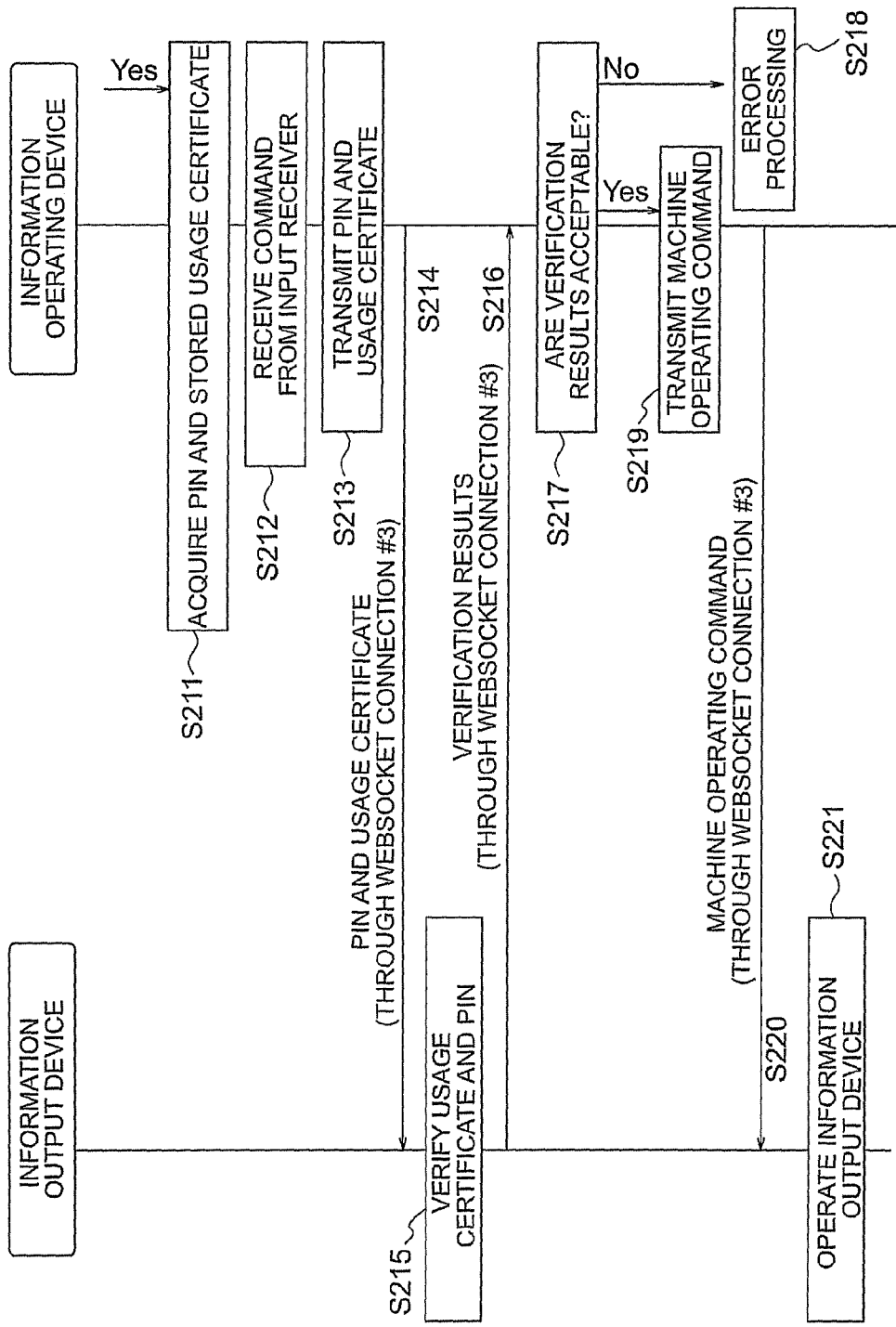
FIG. 53B is a sequence diagram showing a modification example derived from FIG. 53A.
Figure 53C:
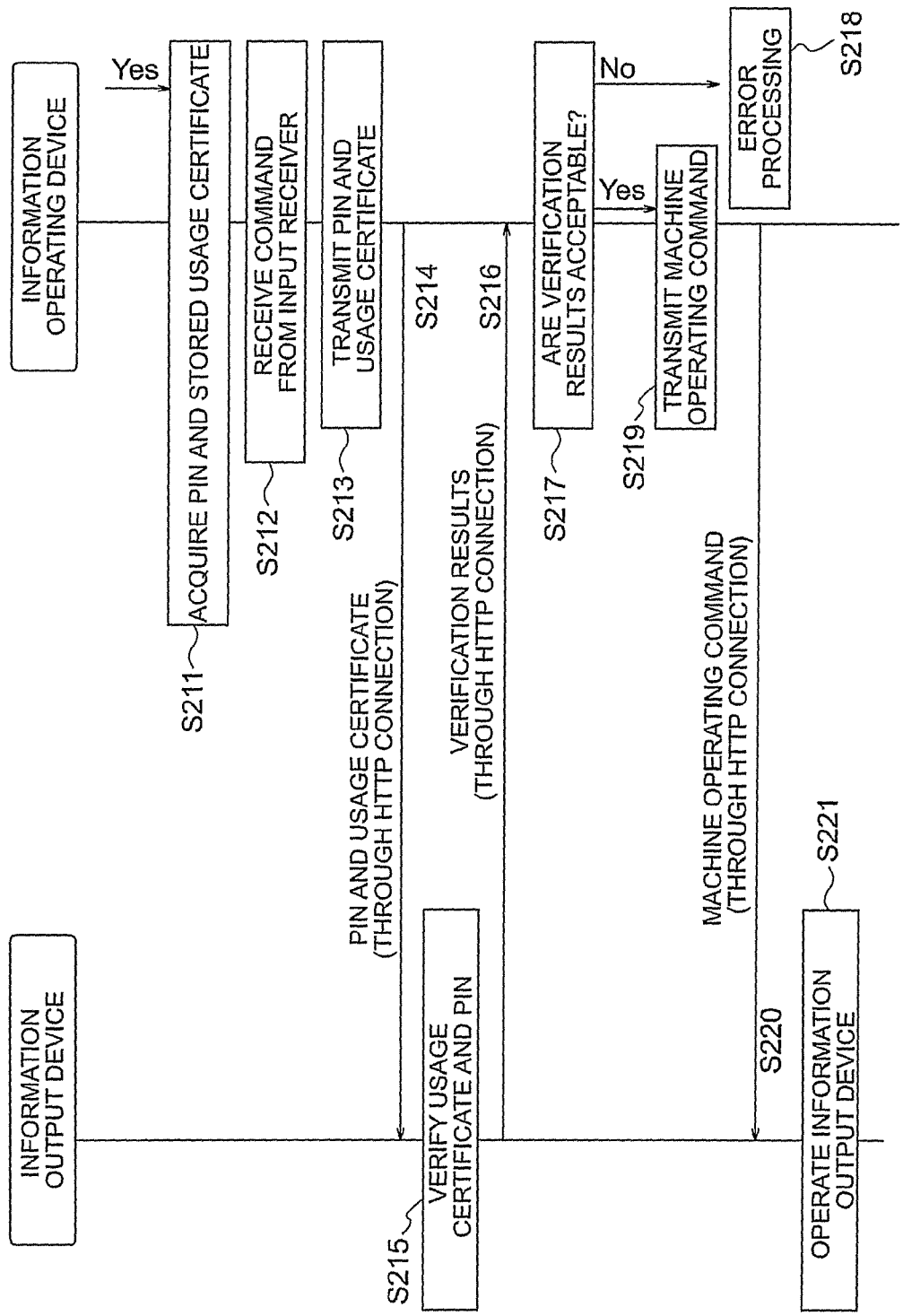
FIG. 53C is a sequence diagram showing a modification example derived from FIG. 53B.
Figure 53D:
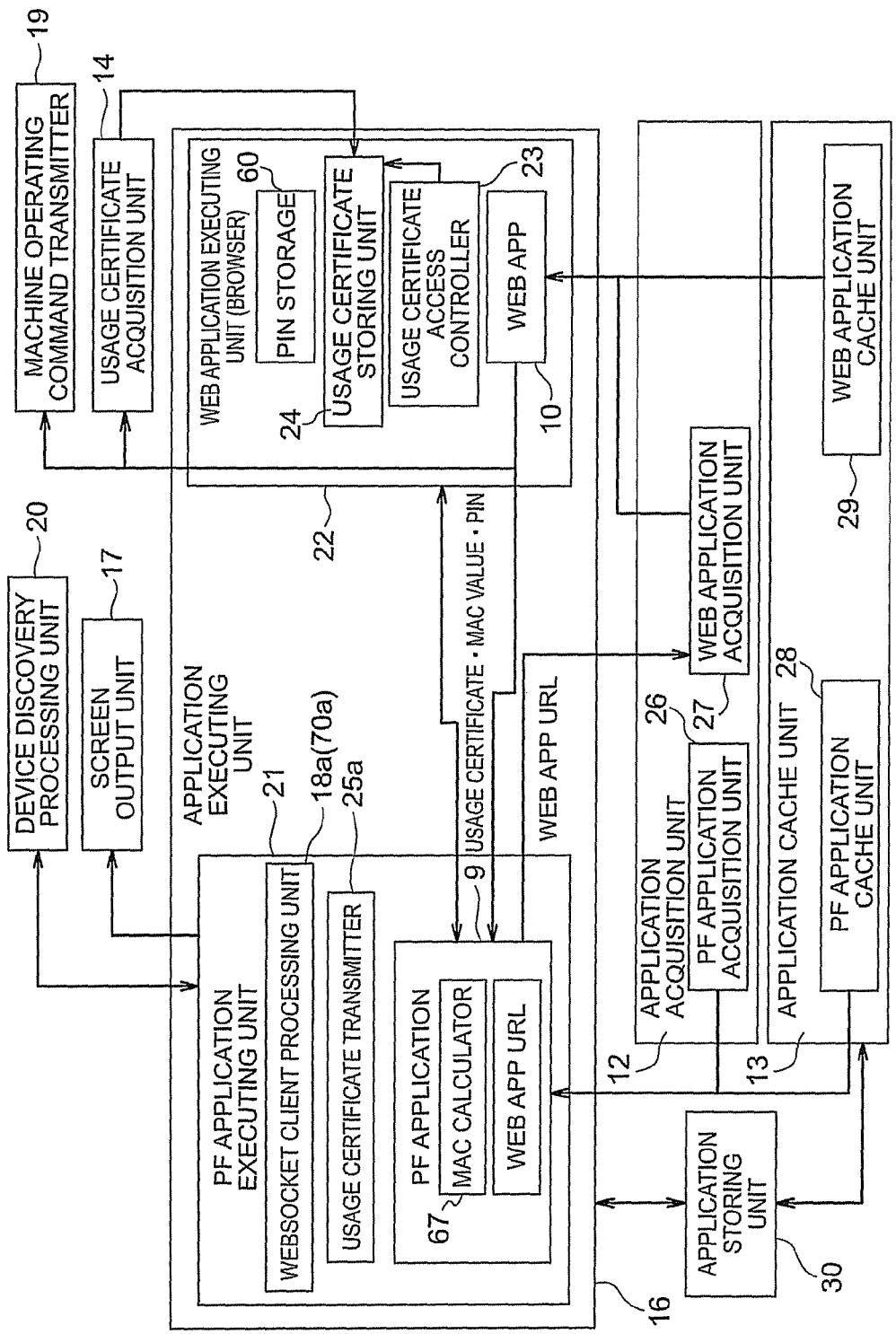
FIG. 53D is a sequence diagram showing a modification example derived from FIG. 53C.

In FIG. 53B, a WebSocket connection is used for a connection for transmitting a PIN and a usage certificate and a connection for transmitting a machine operating command, but an HTTP connection (or HTTPS connection) may be used instead. This case will be explained using FIG. 53C, which is a sequence diagram showing the processing steps performed by the information operating device 1 and information output device 2.

Figure 49D:
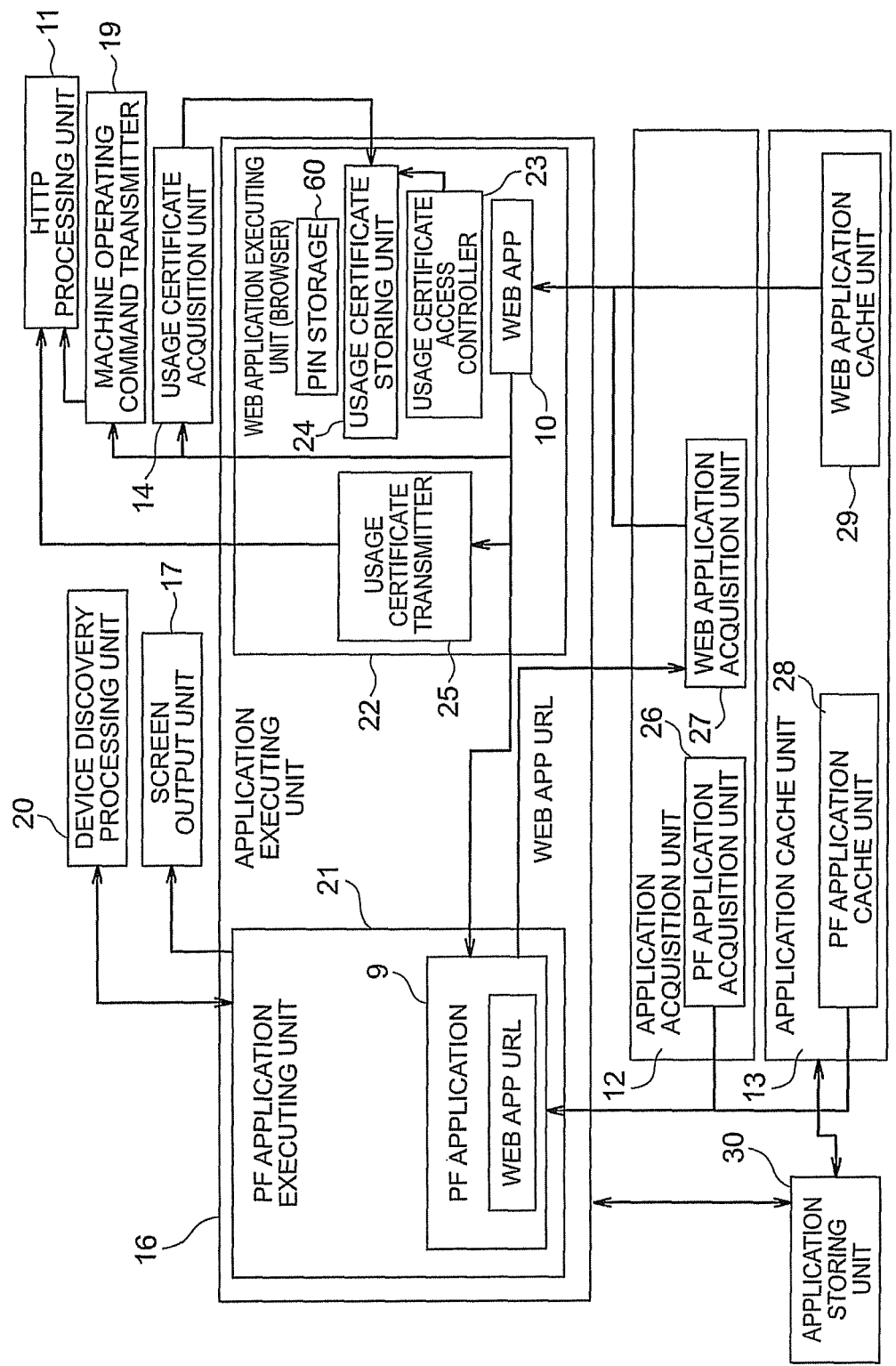
FIG. 49D is a block diagram showing a modification example derived from FIG. 49C.

(5) The HTTP processing unit 11 is used to establish a connection for transmitting a PIN and a usage certificate, and a connection for transmitting a machine operating command. In this case, the internal configuration of the application executing unit 16, application acquisition unit 12, and application cache unit 13 in the information operating device 1 is as shown in FIG. 49D. FIG. 49D is different from FIG. 49C in that the PIN, usage certificate, and machine operating command are transmitted by the HTTP processing unit 11 instead of the WebSocket client processing unit 18.

Figure 51B:
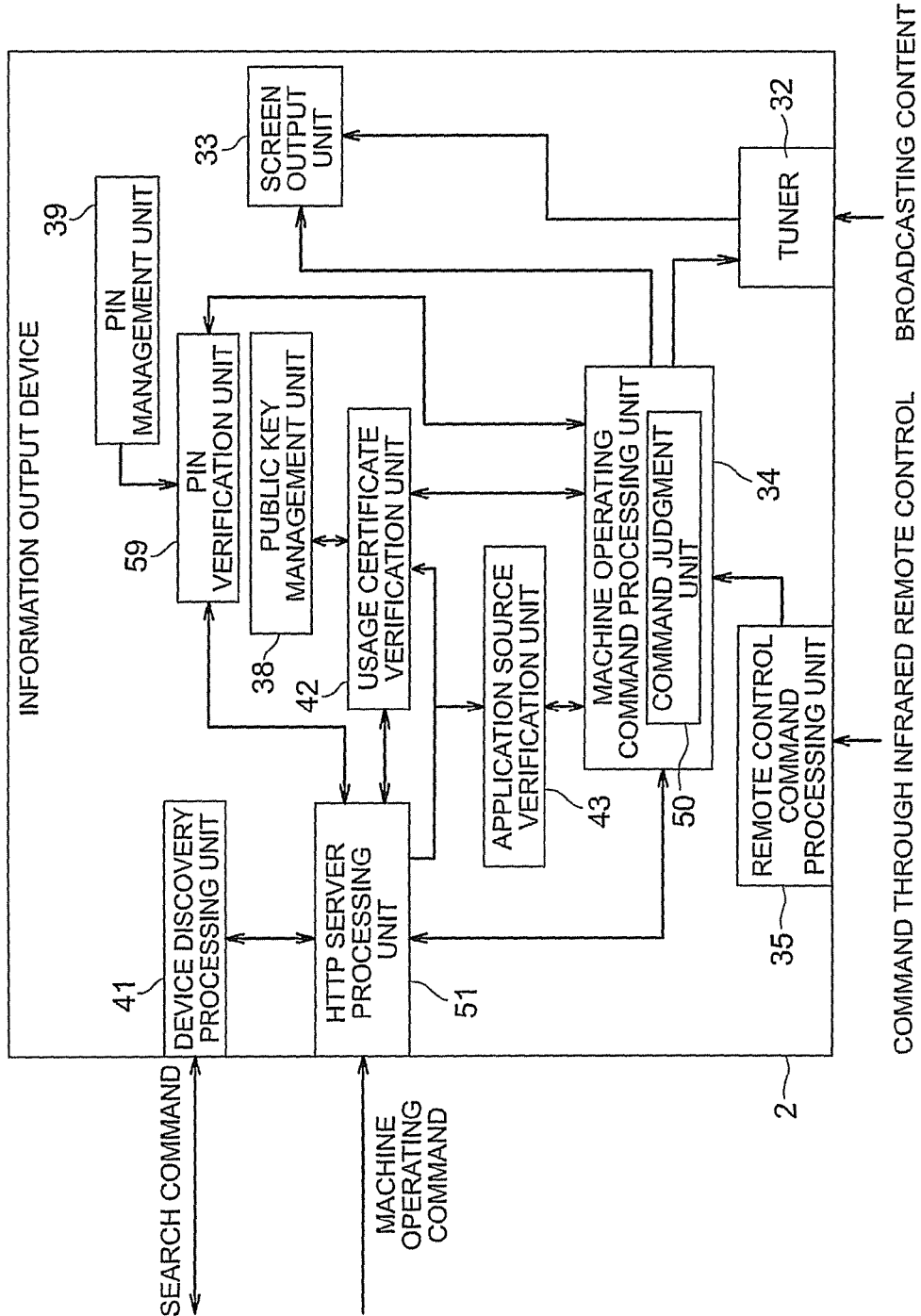
FIG. 51B is a block diagram of the information output device 2 according to a modification example derived from FIG. 51A.

In FIG. 49C, the domain attacher 70 in the WebSocket client processing unit 18 attaches the domain name of the Web application being executed by the Web application executing unit 22 to the WebSocket header, while in the information operating device 1 of FIG. 49D, the HTTP processing unit 11 attaches the domain name of the Web application being executed by the Web application executing unit 22 to the HTTP header corresponding to header of connection. FIG. 51B shows the internal configuration of the information output device 2 corresponding to this information operating device 1. FIG. 51B is different from FIG. 51A in that the HTTP server processing unit is provided instead of the WebSocket server processing unit. The PIN, usage certificate, and machine operating command are received by the HTTP server processing unit 51. Further, the domain name attached to the HTTP header is transmitted to the application source inspection unit 43, and the application source inspection unit 43 inspects whether it corresponds to the domain included in the usage certificate.

In the process flow of FIG. 53A, the PIN value is transmitted and received in plaintext between the information operating device 1 and information output device 2. In the example shown below, a MAC value is transmitted instead of a plaintext PIN and the information output device 2 verifies the MAC value to check whether the PIN is genuine or not.

Figure 54A:
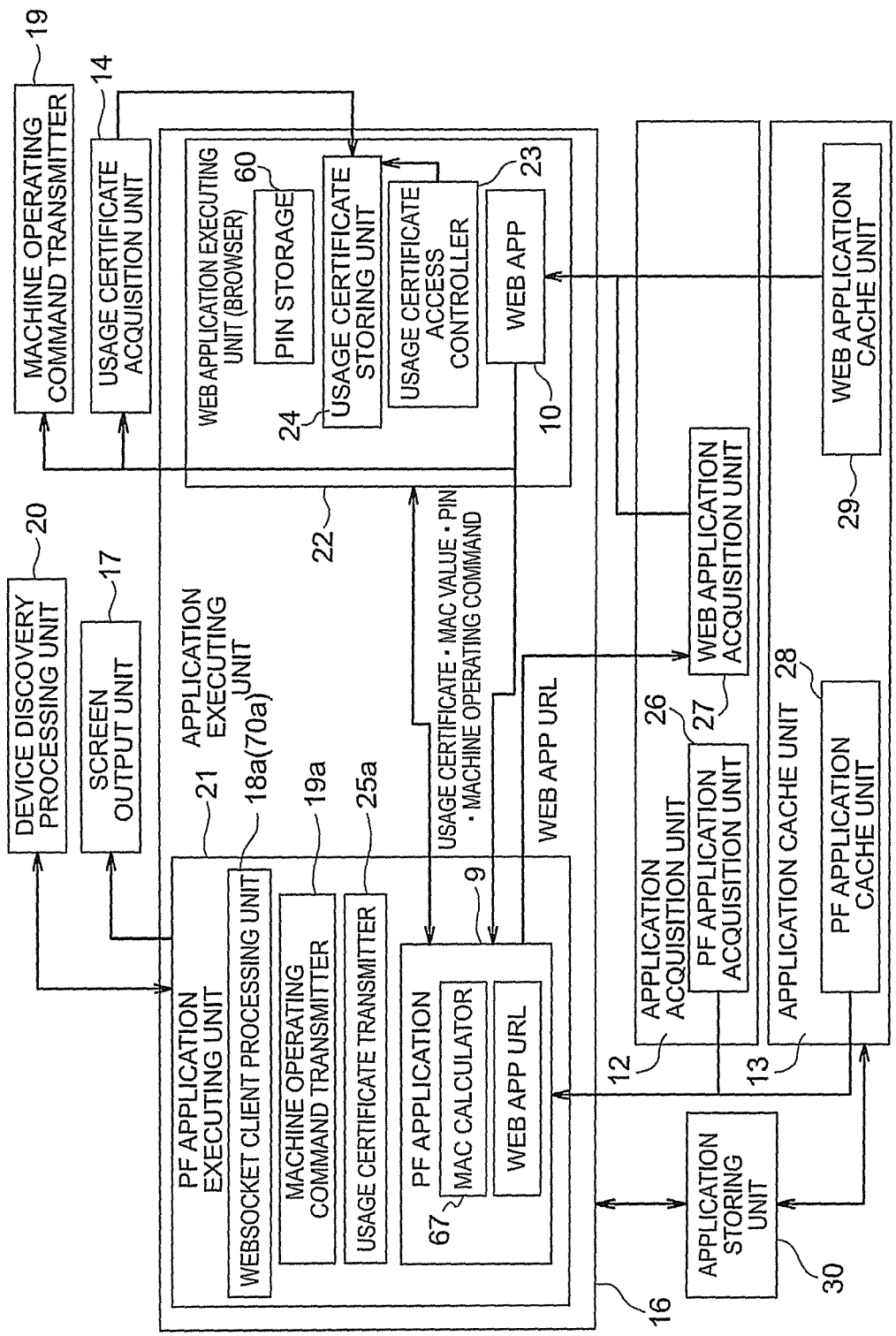
FIG. 54A is a block diagram showing another configuration of the information operating device 1.

FIG. 54A is a block diagram showing another configuration of the information operating device 1. A MAC calculator (encryption information generator) 67 is newly provided in the PF application executed by the PF application executing unit 21.

The MAC calculator 67 calculates a MAC value using a challenge (random numbers) received as a response to a usage certificate transmitted to the information output device 2 by the WebSocket client processing unit 18 in the PF application executing unit 21, based on the following calculation formula.

MAC value=HMAC_SHA1(MAC key, PIN||challenge)

Here, HMAC-SHA1 encryption algorithm is utilized to calculate a hash value for the combined value of PIN and challenge with a MAC key. Here, "MAC key" is a secret key previously stored in the MAC calculator 67, and the same value is also stored in the information output device 2. "PIN" is a PIN value stored in the PIN storage 60. When calculating the MAC value, the Web application of the Web application executing unit 22 notifies the MAC calculator 67 in the PF application of the PF application executing unit 21 about the PIN value.

The MAC calculator 67 calculates and transmits the MAC value to the Web application being executed by the Web application executing unit 22. The Web application transmits this MAC value to the machine operating command transmitter 19 before transmitting a machine operating command to the machine operating command transmitter 19.

Figure 55A:
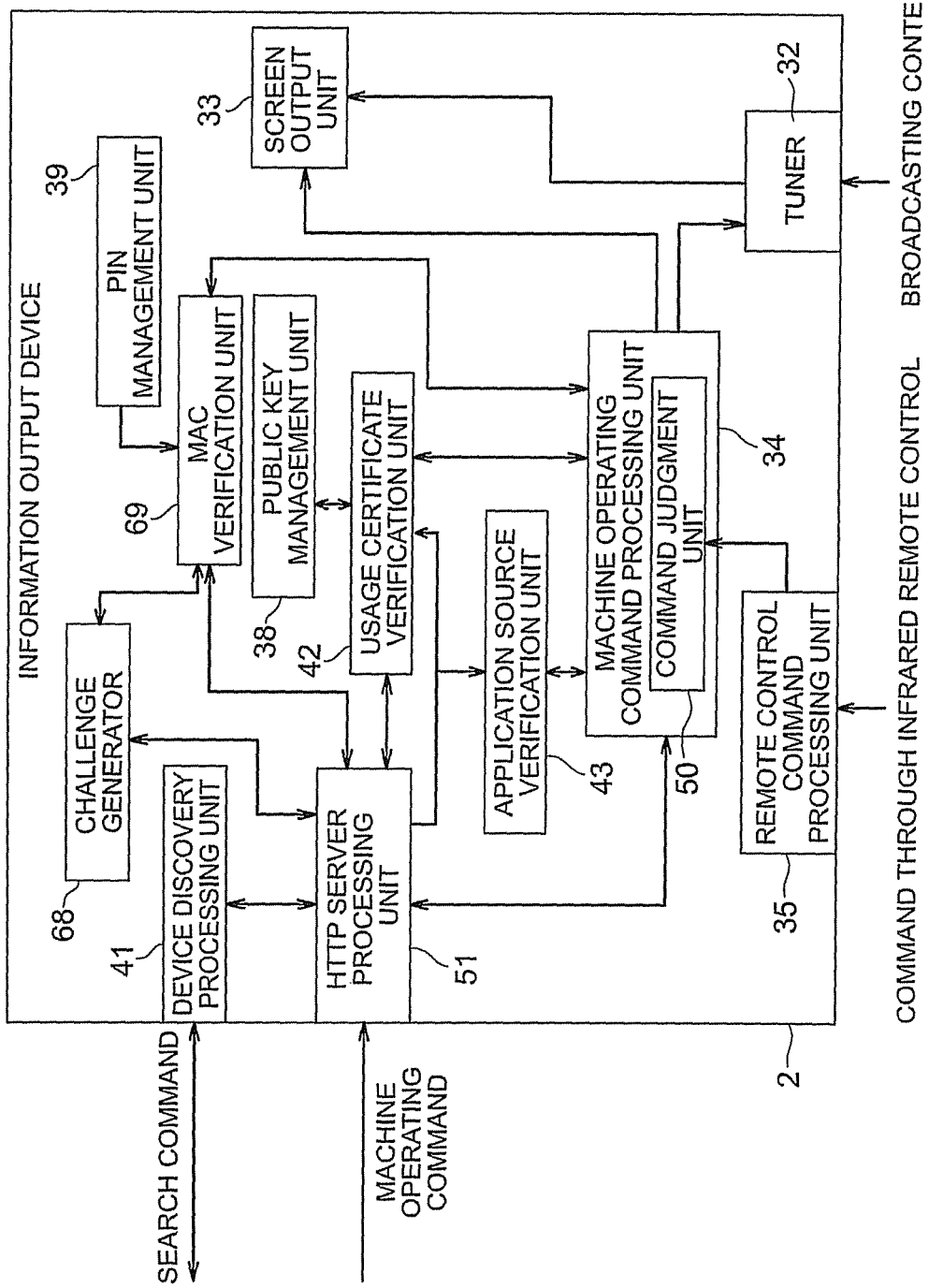
FIG. 55A is a block diagram of the information output device 2 corresponding to the information operating device 1 of FIG. 54.

FIG. 55A is a block diagram showing a configuration of the information output device 2 corresponding to the information operating device 1 of FIG. 54A. The information output device 2 shown in FIG. 55A is different from FIG. 51A in that a challenge generator 68 is newly provided and that a MAC inspection unit 69 is provided instead of the PIN inspection unit 59.

The challenge generator 68 receives a usage certificate from the information operating device 1, and if the usage certificate is successfully verified, the challenge generator 68 generates a challenge (random numbers) and transmits it to the information operating device 1. Note that this challenge random numbers are temporarily stored until the information operating device 1 receives a MAC value or until the Web-Socket connection is disconnected.

When a MAC value is transmitted from the information operating device 1, the MAC inspection unit 69 calculates the MAC value based on the following calculation formula.

MAC value=HMAC_SHA1(MAC key, PIN∥challenge)

Here, "MAC key" is a value previously stored in the MAC inspection unit 69 of the information output device 2. "challenge" is a value generated by the challenge generator 68 and transmitted to the information operating device 1. "PIN" is a value stored in the PIN management unit 39. Here, HMAC-SHA1 encryption algorithm is utilized. The MAC inspection unit 69 judges whether the MAC value obtained by this calculation corresponds to the MAC value transmitted from the information operating device 1, and notifies the machine operating command processing unit 34 about the judgment result. Only when the inspection performed by the MAC inspection unit 69 is successful, the machine operating command processing unit 34 receives subsequent machine operating commands transmitted from the information operating device 1.

Figure 56A:
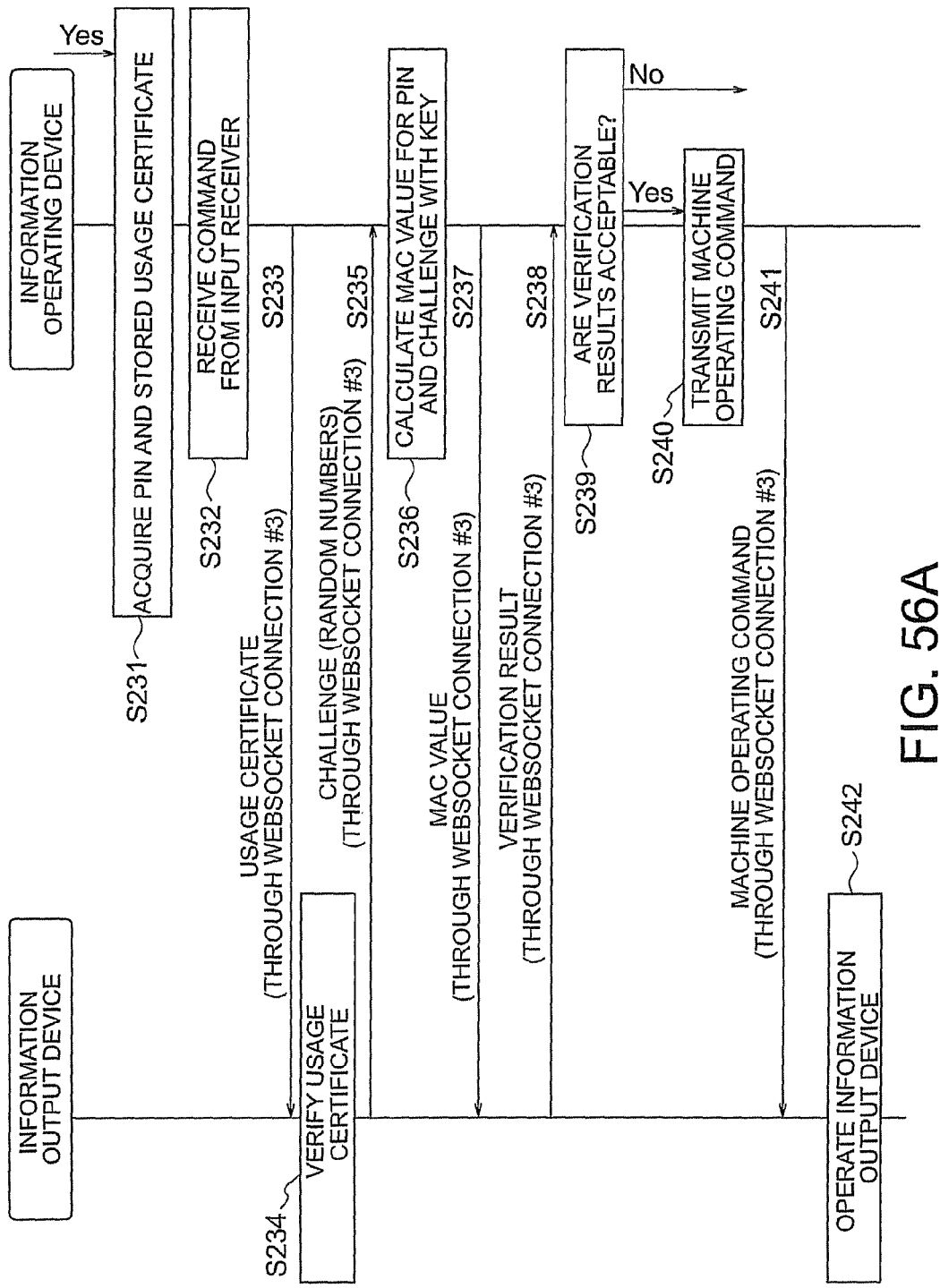
FIG. 56A is a sequence diagram showing the processing steps performed when utilizing a MAC value.

FIG. 56A is a sequence diagram showing the processing steps performed by the information operating device 1 and information output device 2 when transmitting a MAC value instead of a plaintext PIN.

First, Web application #5 acquires a PIN and a stored usage certificate and receives a command through the input receiver 15 (Step S231) similarly to FIG. 53A.

Next, Web application #5 asks the PF application 9 executed by the PF application executing unit 21 to transmit a usage certificate (Step S232). The PF application 9 transmits a usage certificate to the information output device 2 through WebSocket connection #1 (Step S233). Concretely, based on an instruction from the PF application 9, the WebSocket client processing unit 18a of the information operating device 1 establishes a WebSocket connection (WebSocket connection #1) and transmits a usage certificate to the information output device 2.

The information output device 2 verifies whether the signature for the usage certificate is legitimate (Step S234). If the signature verification is failed, subsequent steps may be cancelled by accepting no machine operating command or by disconnecting the Websocket connection. When the signature verification is successful, the information output device 2 generates a challenge (random numbers) using the challenge generator 68, and transmits the challenge to the information operating device 1 through WebSocket connection #1 (Step S235).

When the information operating device 1 receives the challenge by the WebSocket client processing unit 18a, the MAC calculator 67 of the PF application executing unit 21 calculates a MAC value utilizing the received challenge value, a MAC key stored in the MAC calculator 67, and a PIN value stored in the PIN storage 60 (Step S236), and notifies Web application #5 about the result Web application #5 transmits the MAC value to the information output device 2 by the machine operating command transmitter 19 through Web-Socket connection #2 (Step S237). Concretely, based on an instruction from Web application #5, the WebSocket client processing unit 18 of the information operating device 1 establishes a WebSocket connection (WebSocket connection #2) and transmits a MAC value to the information output device 2.

The MAC inspection unit 69 of the information output device 2 calculates a MAC value utilizing a MAC key stored in the MAC inspection unit 69, a PIN value stored in the PIN management unit, and a challenge value generated by the challenge generator 68, judges whether it corresponds to the MAC value received from the information operating device 1, and notifies the information operating device 1 about the judgment result (Step S238). If not corresponds, subsequent machine operating commands transmitted from the information operating device 1 are rejected, or the WebSocket connection is disconnected (Step S239).

If the judgment result from the information output device 2 shows failure, the information operating device 1 performs error processing. If the judgment result shows success (if the verification is successful), the Web application of the Web application executing unit 22 transmits a machine operating command through WebSocket connection #2 (Steps S240 and S241). Concretely, based on an instruction from Web application #5, the WebSocket client processing unit 18 of the information operating device 1 establishes a WebSocket connection (WebSocket connection #2) and transmits a machine operating command to the information output device 2. The information output device 2 receives the machine operating command and operates the machine in accordance with the command (Step S242).

In the example shown here, the WebSocket client processing unit 18a is used to establish WebSocket connection #1 to transmit the usage certificate, and the WebSocket client processing unit 18 is used to establish WebSocket connection #2 to transmit the MAC value and machine operating command. However, the following patterns are also available.

Figure 54B:
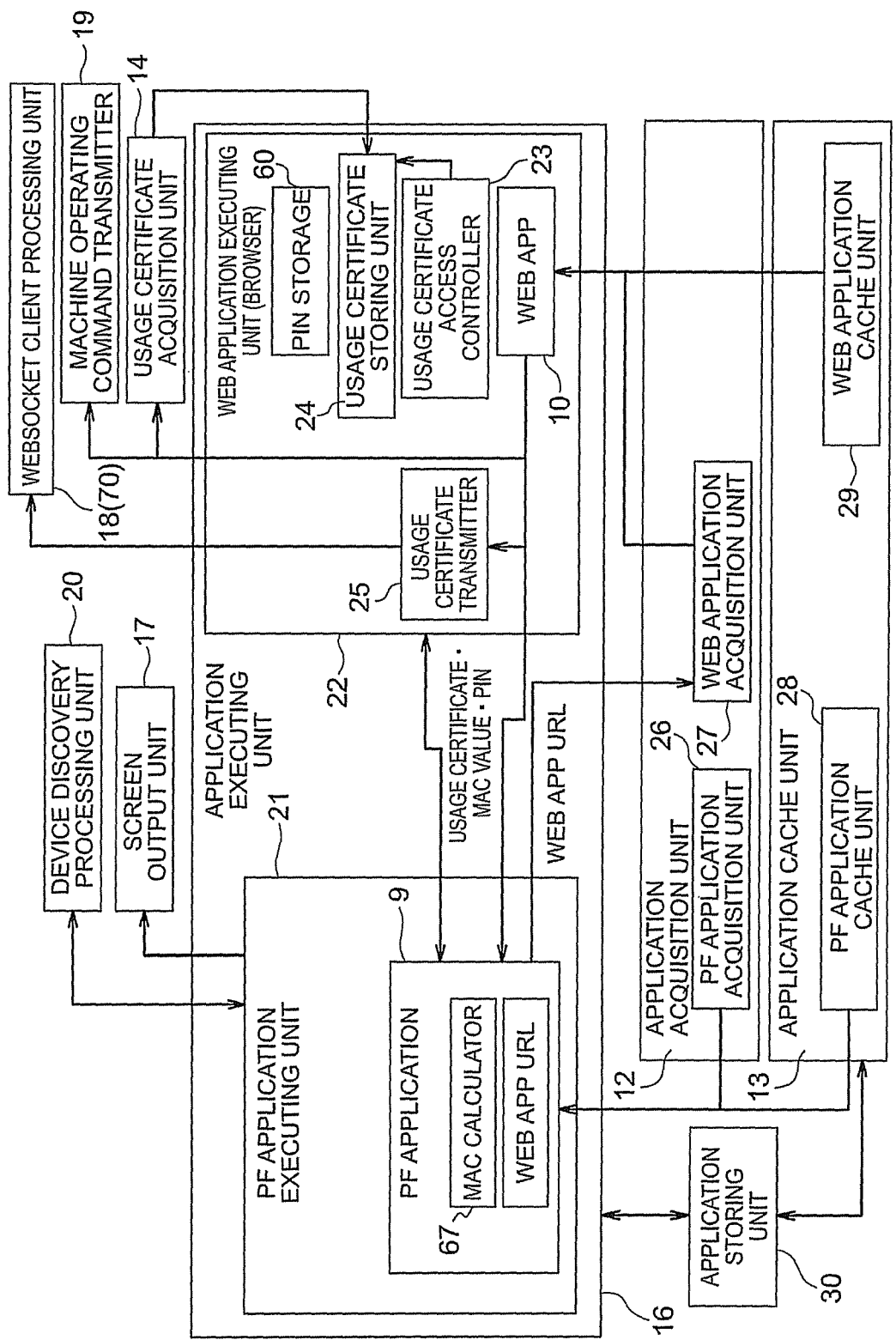
FIG. 54B is a block diagram showing a modification example derived from FIG. 54A.

(1) The WebSocket client processing unit 18a is used to establish both of WebSocket connection #1 and WebSocket connection #2. WebSocket connection #1 and WebSocket connection #2 are different from each other. This case will be explained using FIG. 54B, which is a block diagram showing an example of the internal configuration of the application executing unit 16, application acquisition unit 12, and application cache unit 13 in the information operating device 1. FIG. 54B is different from FIG. 54A in that the machine operating command transmitter is provided in the PF application executing unit, the PF application executing unit acquires, from the Web application executing unit a machine operating command in addition to a usage certificate, a MAC value, and a PIN so that the machine operating command can be transmitted from the PF application executing unit, and that the machine operating command transmitter in the PF application executing unit transmits the machine operating command to the information output device 2 using the WebSocket client processing unit 18a.

Figure 54C:
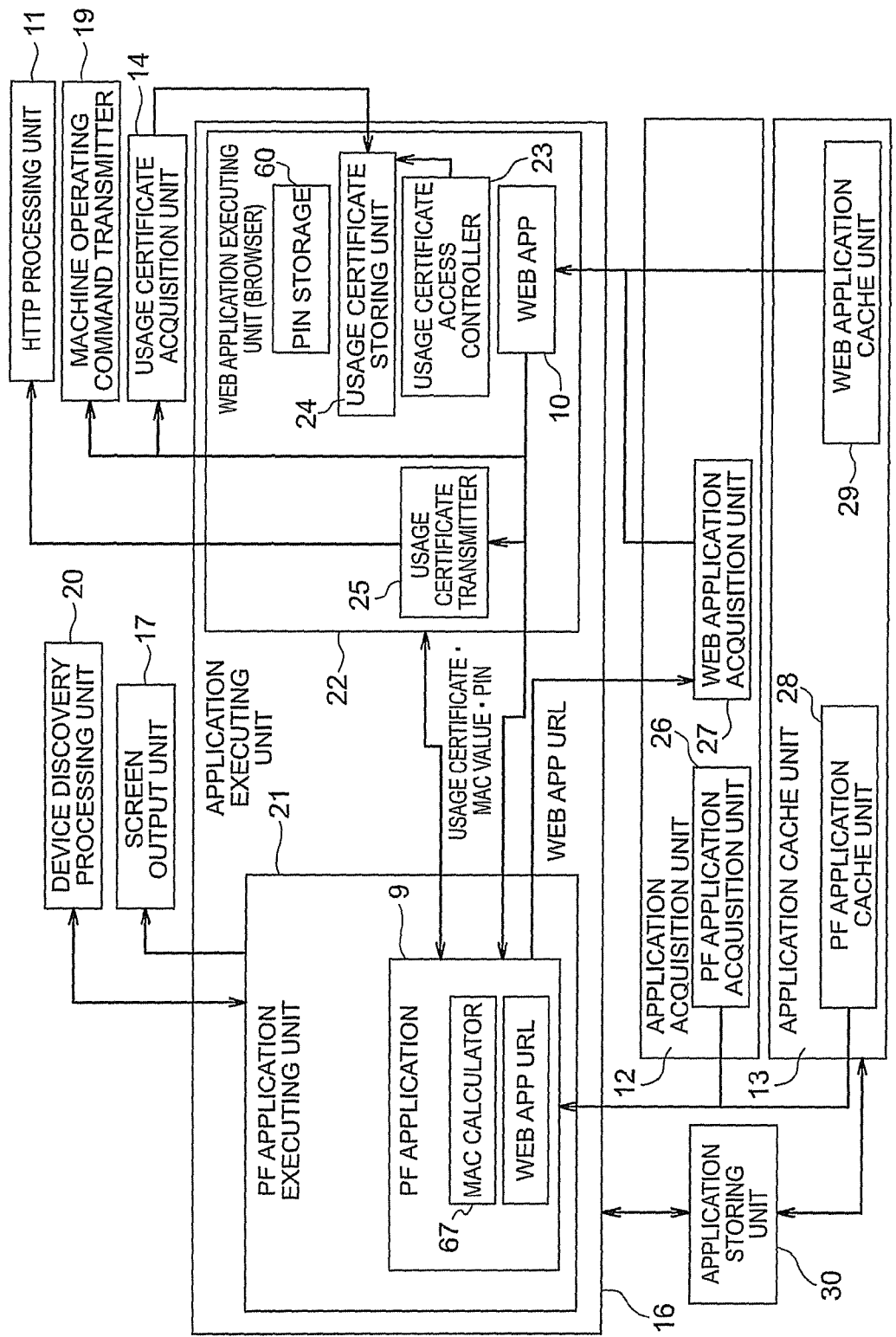
FIG. 54C is a block diagram showing another modification example derived from FIG. 54A.

(2) The WebSocket client processing unit 18 is used to establish both of WebSocket connection #1 and WebSocket connection #2. WebSocket connection #1 and WebSocket connection #2 are different from each other. This case will be explained using FIG. 54C, which is a block diagram showing an example of the internal configuration of the application executing unit 16, application acquisition unit 12, and application cache unit 13 in the information operating device 1. FIG. 54C is different from FIG. 54A in that the WebSocket client processing unit 18a and usage certificate transmitter 25a are not provided in the PF application executing unit 21, the usage certificate transmitter 25 is provided in the Web application executing unit 22, and that the WebSocket client processing unit 18 is used to transmit a usage certificate to the information output device 2.

In the example explained above, the WebSocket connection for transmitting a usage certificate and the WebSocket connection for transmitting a MAC value and a machine operating command are different from each other. However, all of these items may be transmitted using the same WebSocket connection as mentioned below. This case will be explained using FIG. 53B, which is a sequence diagram showing the processing steps performed by the information operating device 1 and information output device 2.

(3) The WebSocket client processing unit 18a is used to establish a WebSocket connection for transmitting a usage certificate, a MAC value, and a machine operating command. In this case, the internal configuration of the application executing unit 16, application acquisition unit 12, and application cache unit 13 in the information operating device 1 is the same as FIG. 54B.

(4) The WebSocket client processing unit 18 is used to establish a WebSocket connection for transmitting a usage certificate, a MAC value, and a machine operating command. In this case, the internal configuration of the application executing unit 16, application acquisition unit 12, and application cache unit 13 in the information operating device 1 is the same as FIG. 54C.

When the information operating device 1 establishes a connection for transmitting a machine operating command (i.e., WebSocket connection #2) and transmits a MAC value (Step S237), the domain attacher 70 in the WebSocket client processing unit 18 may attach the domain name of the Web application being executed by the Web application executing unit 22 to the WebSocket header to be transmitted to the information output device 2. Further, the application source inspection unit (verification unit) 43 of the information output device 2 inspects whether the domain name included in the WebSocket header of the WebSocket connection used to transmit and receive a machine operating command (WebSocket connection #2) corresponds to the Web-application domain name included in the usage certificate, and notifies the machine operating command processing unit 34 about the inspection result. The inspection is judged to be successful when these domain names correspond to each other or when the Web-application domain name included in the header of the WebSocket connection is included in the Web-application origin information (domain name) included in the usage certificate. The machine operating command processing unit of the information output device 2 may accept subsequent machine operating commands transmitted from the information operating device 1 only when the inspection is successful. Similarly, when the information operating device 1 establishes a connection for transmitting a usage certificate (i.e., WebSocket connection #1) and transmits a MAC value (Step S223), the domain attacher 70 in the WebSocket client processing unit 18 may attach the domain name of the Web application being executed by the Web application executing unit 22 to the WebSocket header to be transmitted to the information output device 2. Further, the application source inspection unit (verification unit) 43 of the information output device 2 inspects whether the domain name included in the WebSocket header of the WebSocket connection used to transmit and receive a machine operating command (WebSocket connection #1) corresponds to the Web-application domain name included in the usage certificate, and notifies the machine operating command processing unit 34 about the inspection result. The inspection is judged to be successful when these domain names correspond to each other or when the Web-application domain name included in the header of the WebSocket connection is included in the Web-application origin information (domain name) included in the usage certificate. The machine operating command processing unit of the information output device 2 may accept subsequent machine operating commands transmitted from the information operating device 1 only when the inspection is successful.

Figure 56B:
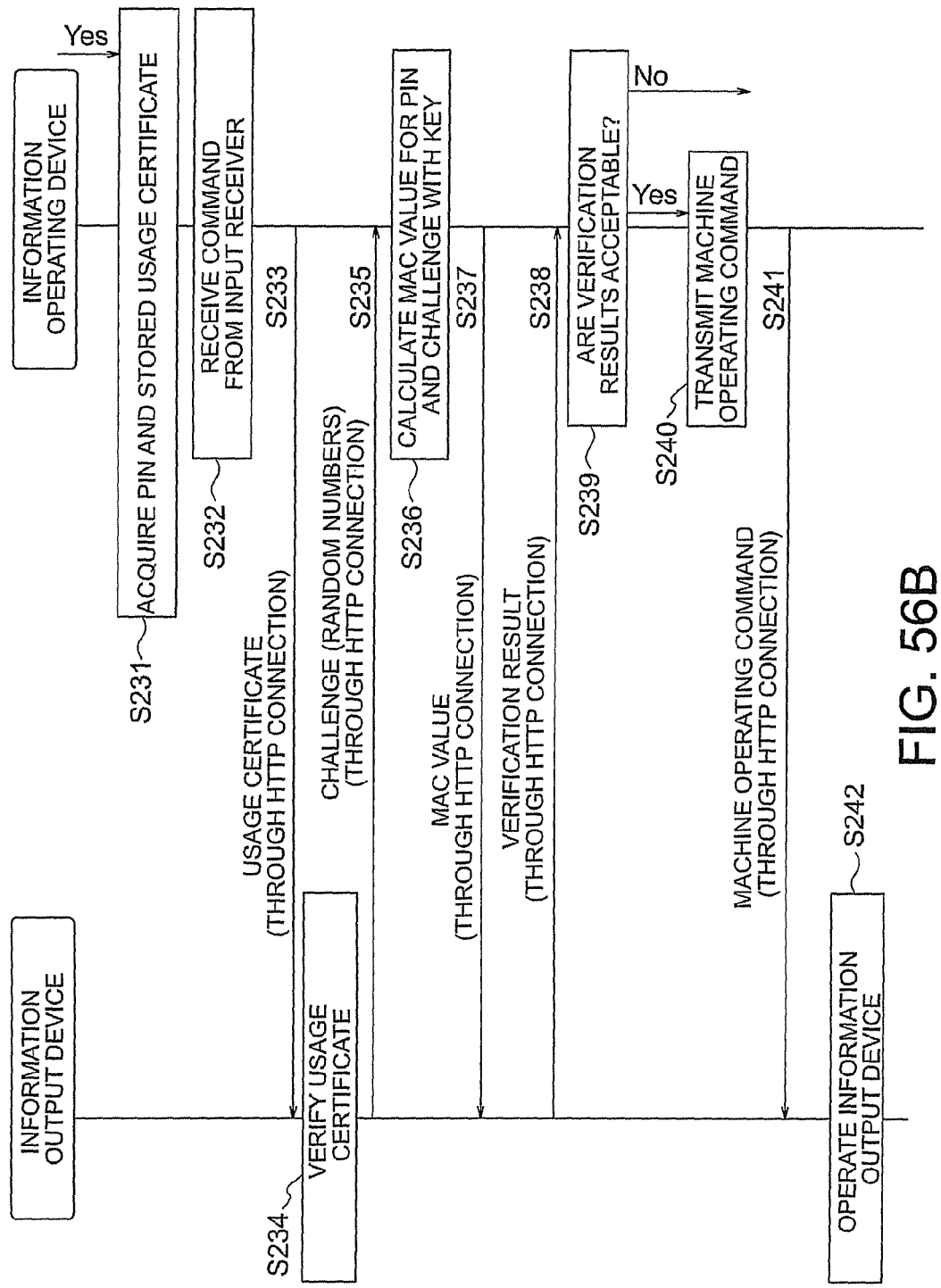
FIG. 56B is a sequence diagram showing a modification example derived from FIG. 56A.
Figure 57:
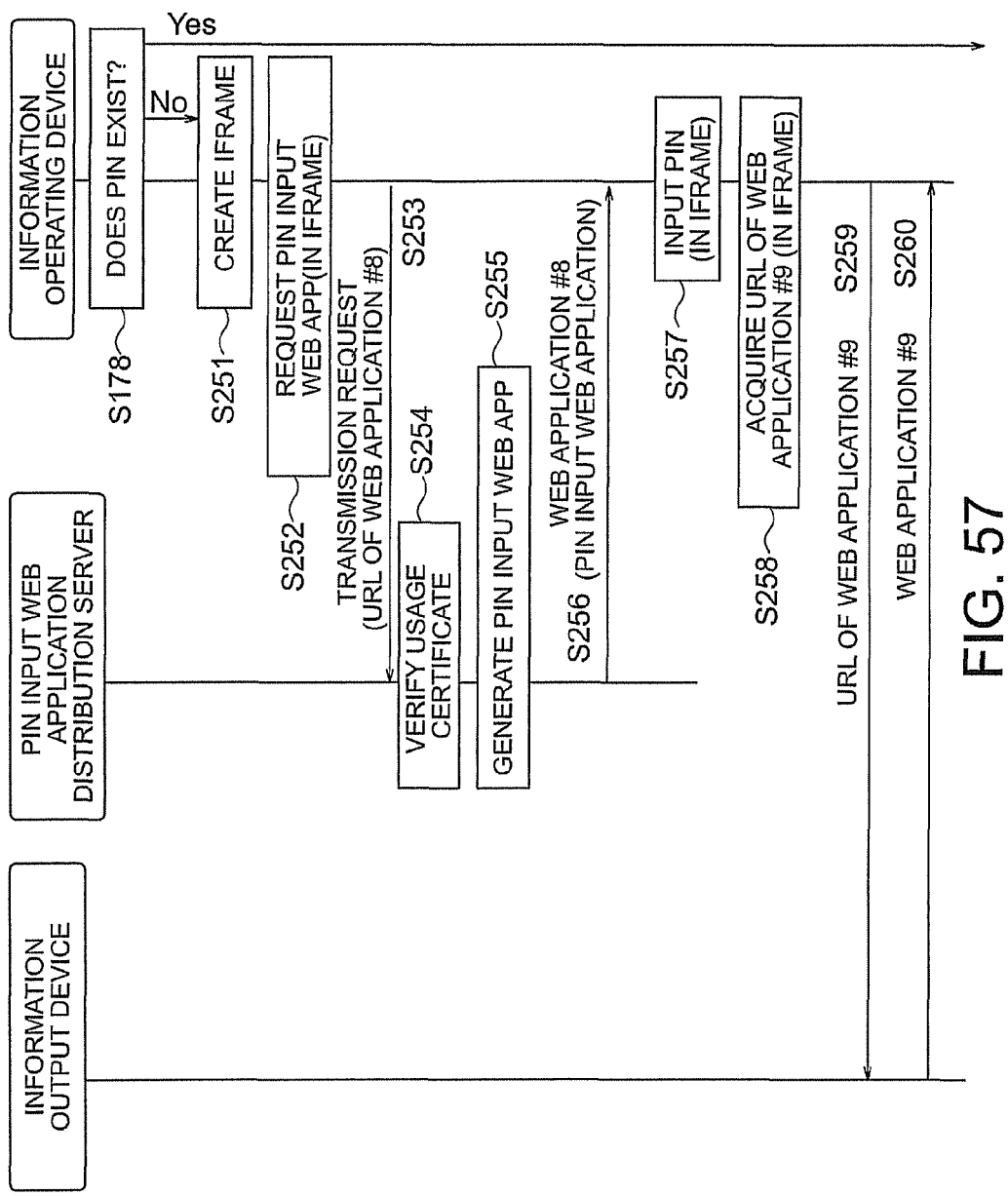
FIG. 57 is a sequence diagram following FIG. 56.

In the example shown FIG. 56A, WebSocket connection #1 is used to transmit and receive a usage certificate and a challenge, and WebSocket connection #2 is used to transmit and receive a MAC value, a MAC value inspection result, and a machine operating command. However, all of these items may be transmitted and received through the same WebSocket connection #3, as shown in FIG. 56B.

Figure 54D:
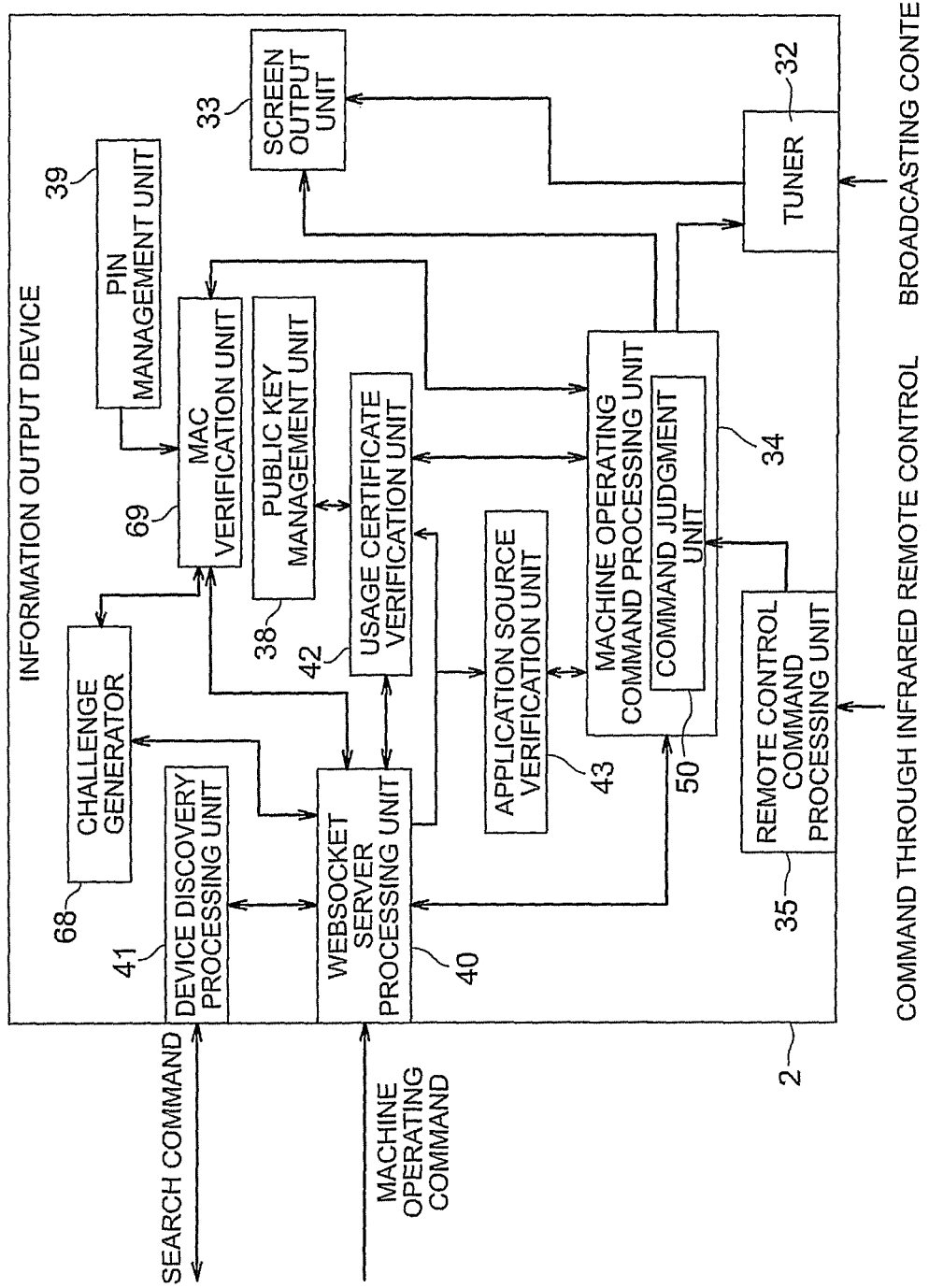
FIG. 54D is a block diagram showing a modification example derived from FIG. 54C.
Figure 55B:
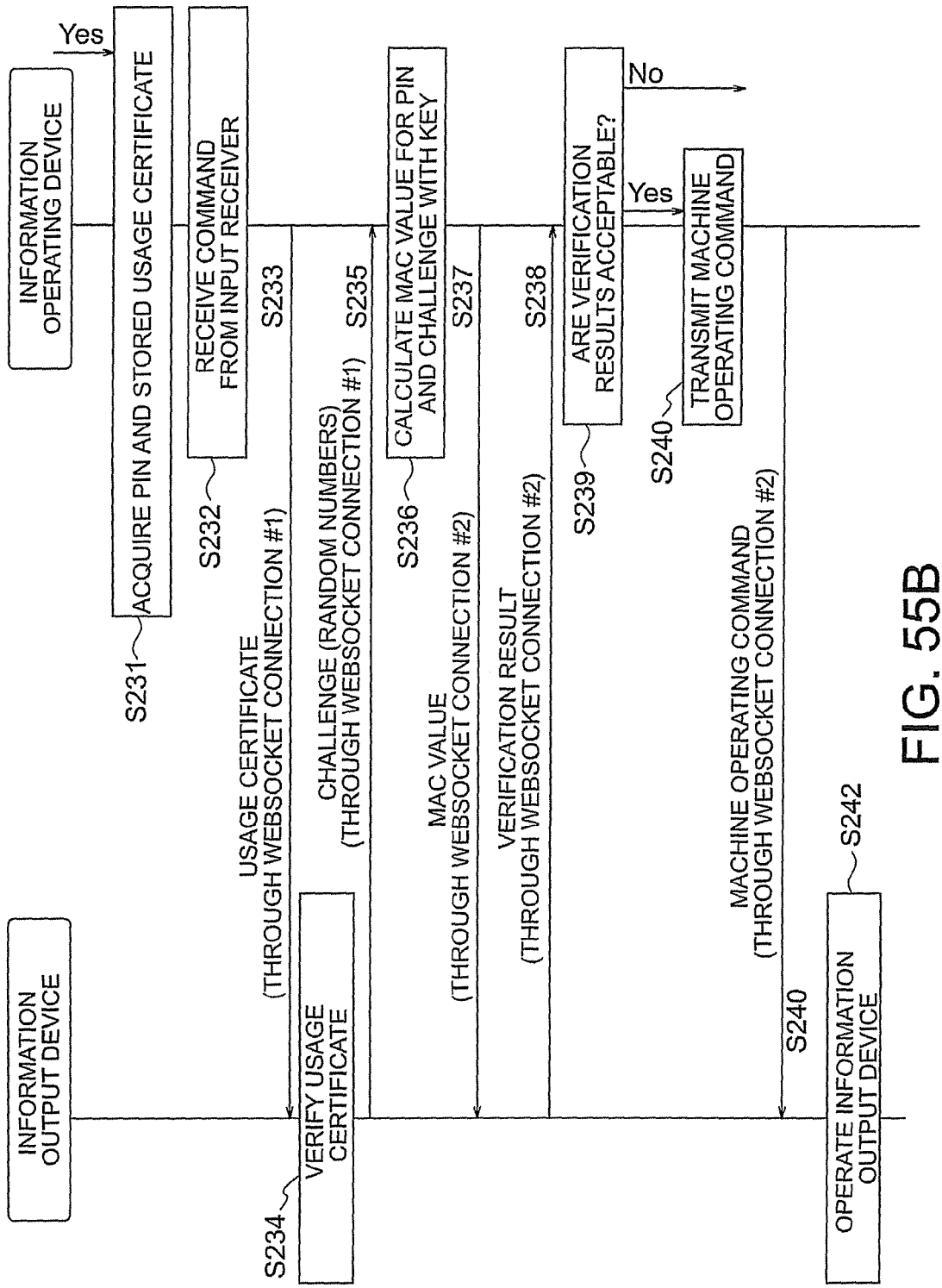
FIG. 55B is a block diagram of the information output device 2 according to a modification example derived from FIG. 55A.

Further, as shown in FIG. 56C, all of these items may be transmitted and received through the same HTTP connection. In this case, the internal configuration of the application executing unit 16, application acquisition unit 12, and application cache unit 13 in the information operating device 1 is as shown in FIG. 54D. FIG. 54D is different from FIG. 54C in that the usage certificate, MAC value, and machine operating command are transmitted by the HTTP processing unit 11 instead of the WebSocket client processing unit 18. In FIG. 54C, the domain attacher 70 in the WebSocket client processing unit 18 attaches the domain name of the Web application being executed by the Web application executing unit 22 to the WebSocket header, while in the information operating device of in FIG. 54D, the HTTP processing unit 11 attaches the domain name of the Web application being executed by the Web application executing unit 22 to the HTTP header. FIG. 55B shows the internal configuration of the information output device 2 corresponding to this information operating device 1. FIG. 55B is different from FIG. 55A in that the HTTP server processing unit 51 is provided instead of the WebSocket server processing unit 40. The PIN, MAC value, and machine operating command are received by the HTTP server processing unit 51. Further, the domain name attached to the HTTP header is transmitted to the application source inspection unit 43, and the application source inspection unit 43 inspects whether it corresponds to the domain included in the usage certificate.

In the process flow of FIG. 52, the PIN input Web application (Web application #8) is executed following the local Web application (Web application #5), but the PIN input Web application (Web application #8) may be executed as an inline frame (iframe) of the local Web application (Web application #5). The processing steps performed in this case are shown in FIGS. 57 to 59A.

First, Step S178 is the same as FIG. 52. When no PIN exists the PIN storage 60, the local Web application (Web application #5) creates an inline frame (iframe) (Step S251), and specifies the URL of the PIN input Web application (Web application #8) in the inline frame to transmit an acquisition request for Web application #8 to the PIN input Web application distribution server 4a (Steps S252 and S253). Concretely, in accordance with the instruction from Web application #5, the Web application acquisition unit 27 of the information operating device 1 transmits a PIN input Web application (Web application #8) acquisition request to the Web application distribution server 4 using the HTTP processing unit 31 via the HTTP (or HTTPS) protocol. The following is an example of the PIN input Web application request message transmitted from the information operating device 1 to the PIN input Web application distribution server 4a.

http://example-PINserver.com/req_pin.php?appid=X&perm=xxxx&origin=zzzz&signature=yyyy&signature_method=rsa-sha1& url=example-Webserver.com/appid9

Here, the URL of a PIN recording Web application (Web application #9) is transmitted to the PIN input Web application distribution server 4a so that the PIN recording Web application (Web application #9) is executed after a PIN is inputted.

The steps performed by the PIN input Web application distribution server 4a are the same as FIG. 52. The information operating device 1 executes the PIN input Web application (Web application #8) in the inline frame. The PIN input Web application (Web application #8) includes a program as shown below. That is, when a PIN is inputted, the inline frame is instructed to move to the PIN recording Web application (Web application #9).

```
<form                              method="POST"
action="http://example-Webserver.com/appid9#">
<input type="text" name="PIN">
<input type="submit" value="transmission">
```

When a PIN is inputted, the inline frame moves to the PIN recording Web application (Web application #9) based on the following URL (Step S259). Concretely, in accordance with the instruction from Web application #8, the Web application acquisition unit 27 of the information operating device 1 transmits a PIN recording Web application (Web application #9) acquisition request to the Web application distribution server 4 using the HTTP processing unit 31 via the HTTP (or HTTPS) protocol. Then, the PIN recording Web application (Web application #9) is executed.

http://example-Webserver.com/appid9#pin

Here, "pin" shows an inputted PIN value. The PIN value is not transmitted to the Web application distribution server 4 since it is stored as a hash fragment. The PIN recording Web application (Web application #9) stores the PIN value in the PIN storage 60. At this time, a URL range is set so that the PIN value can be acquired by Web application #5. When Web application #5 acquires the PIN value from cookies, the usage certificate access controller 23 judges whether the PIN can be acquired by Web application #5 similarly to the usage certificate, and if possible, Web application #5 can acquire the PIN from the PIN storage 60. After the PIN is stored, the PIN recording Web application (Web application #9) notifies its parent frame (Web application #5) that the PIN is completely stored. Web application #5 terminates the inline frame generated by itself.

In other words, the PIN recording Web application (Web application #9) is terminated. After that, Web application #5 acquires, from the PIN storage 60, the PIN stored by the PIN recording Web application (Web application #9). At this time, the usage certificate access controller 23 inspects the domain of the Web application trying to acquire the PIN. Web application #5 can acquire the PIN since the PIN recording Web application (Web application #9) sets a URL range so that Web application #5 can acquire the PIN. Web application #5 acquires the PIN and the stored usage certificate (Step S264), and performs subsequent steps similarly to the process flow shown in FIG. 56.

Figure 58A:
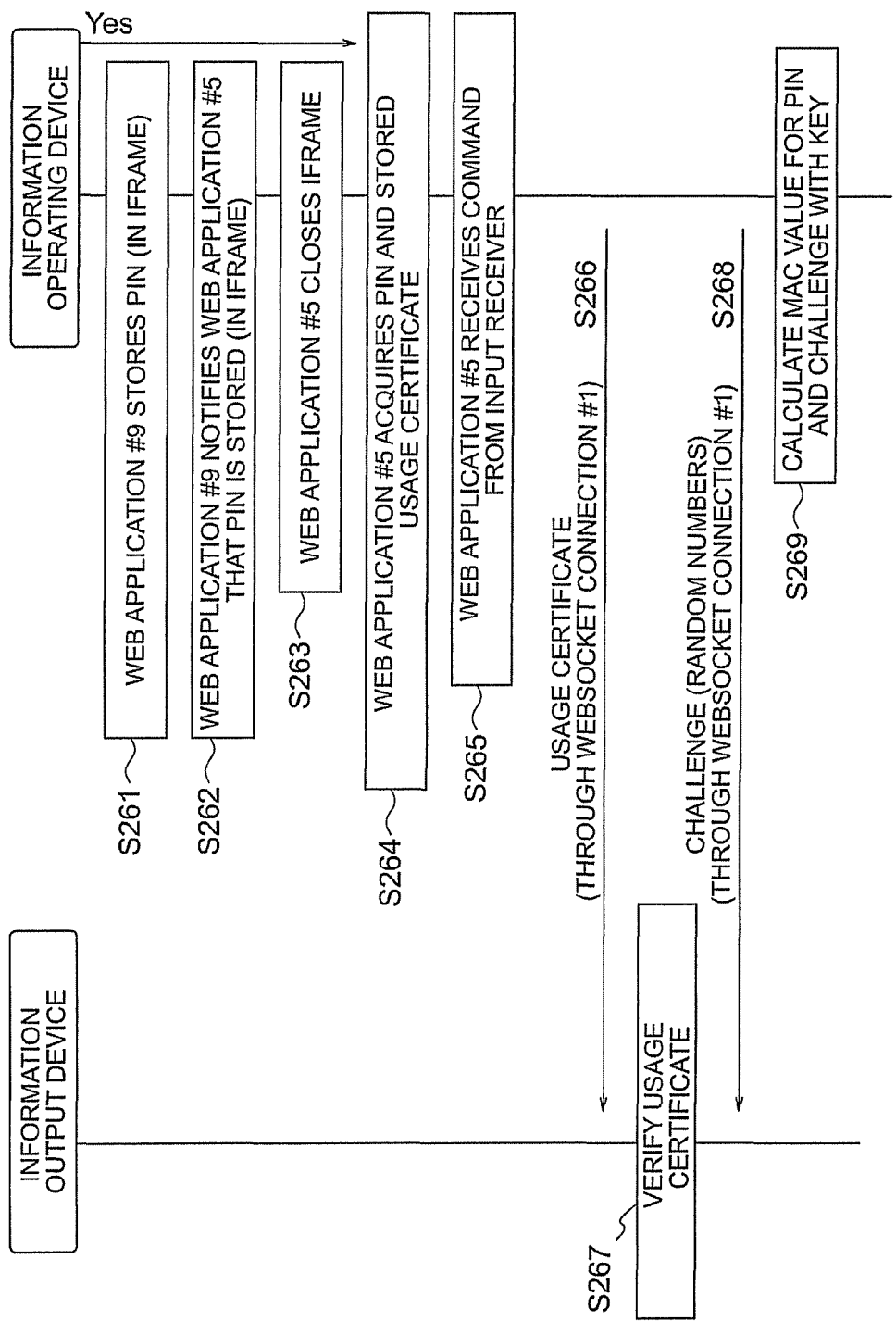
FIG. 58A is a sequence diagram following FIG. 57.
Figure 58B:
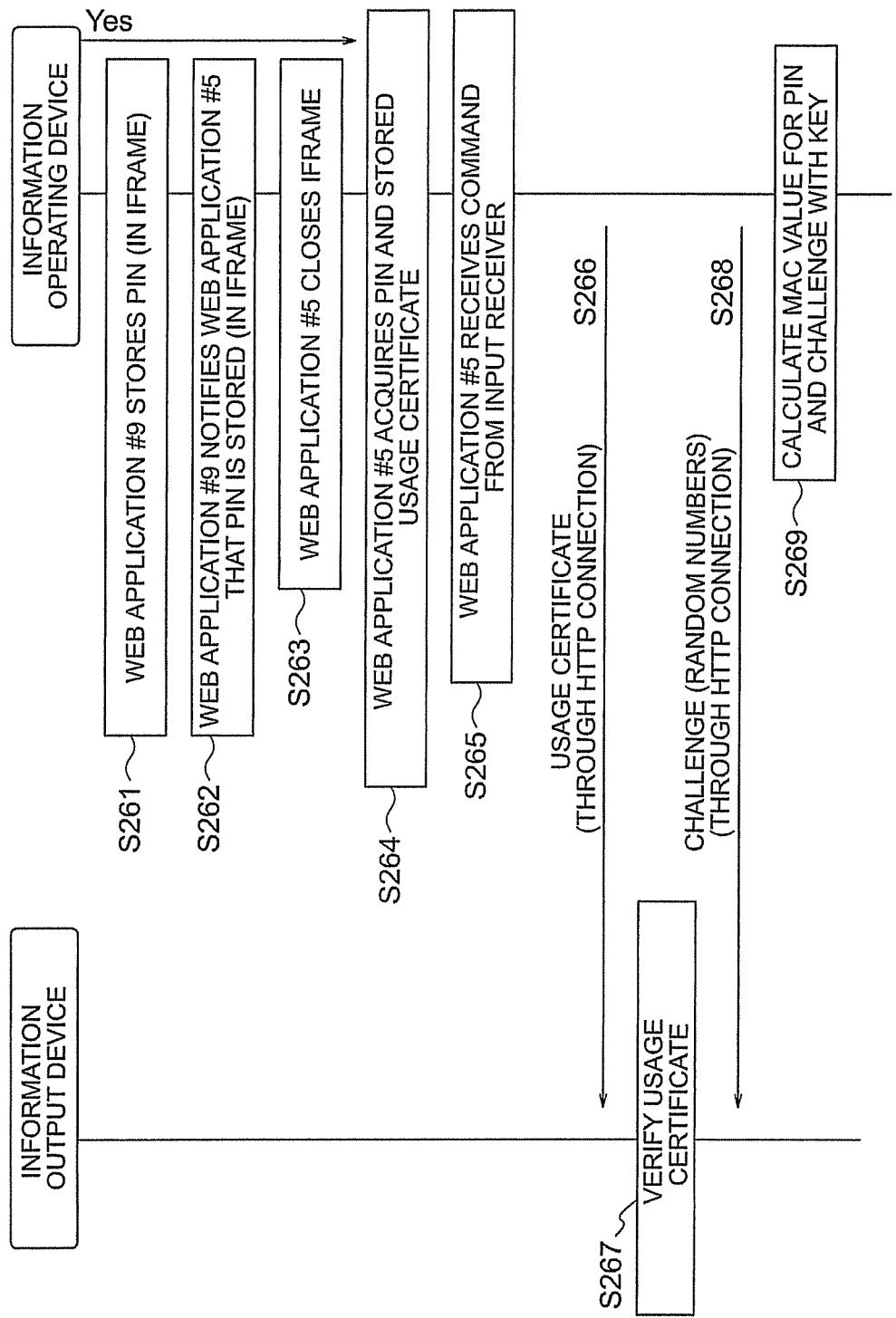
FIG. 58B is a sequence diagram showing a modification example derived from FIG. 58A.
Figure 59A:
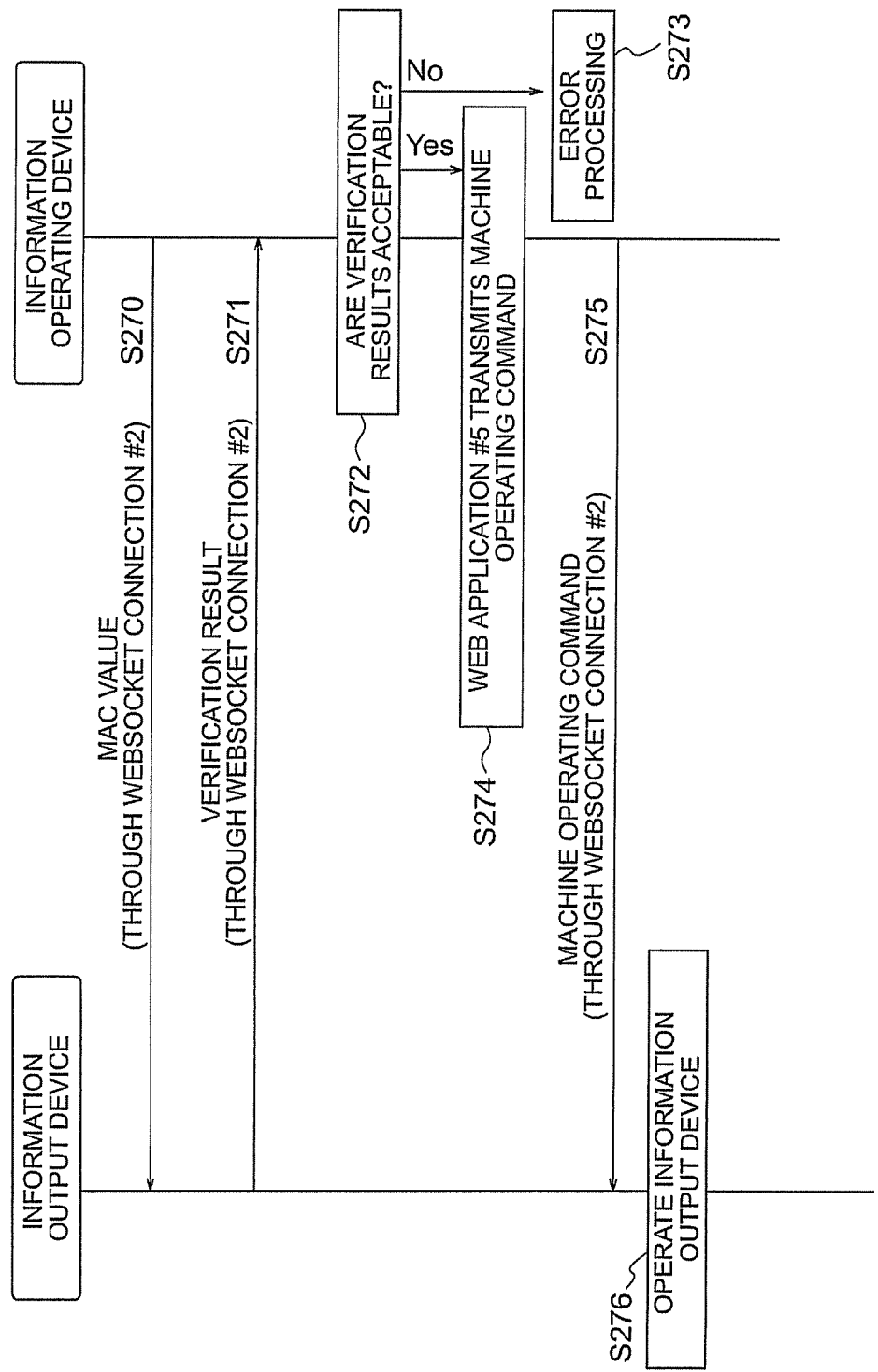
FIG. 59A is a sequence diagram following FIG. 58.
Figure 59B:
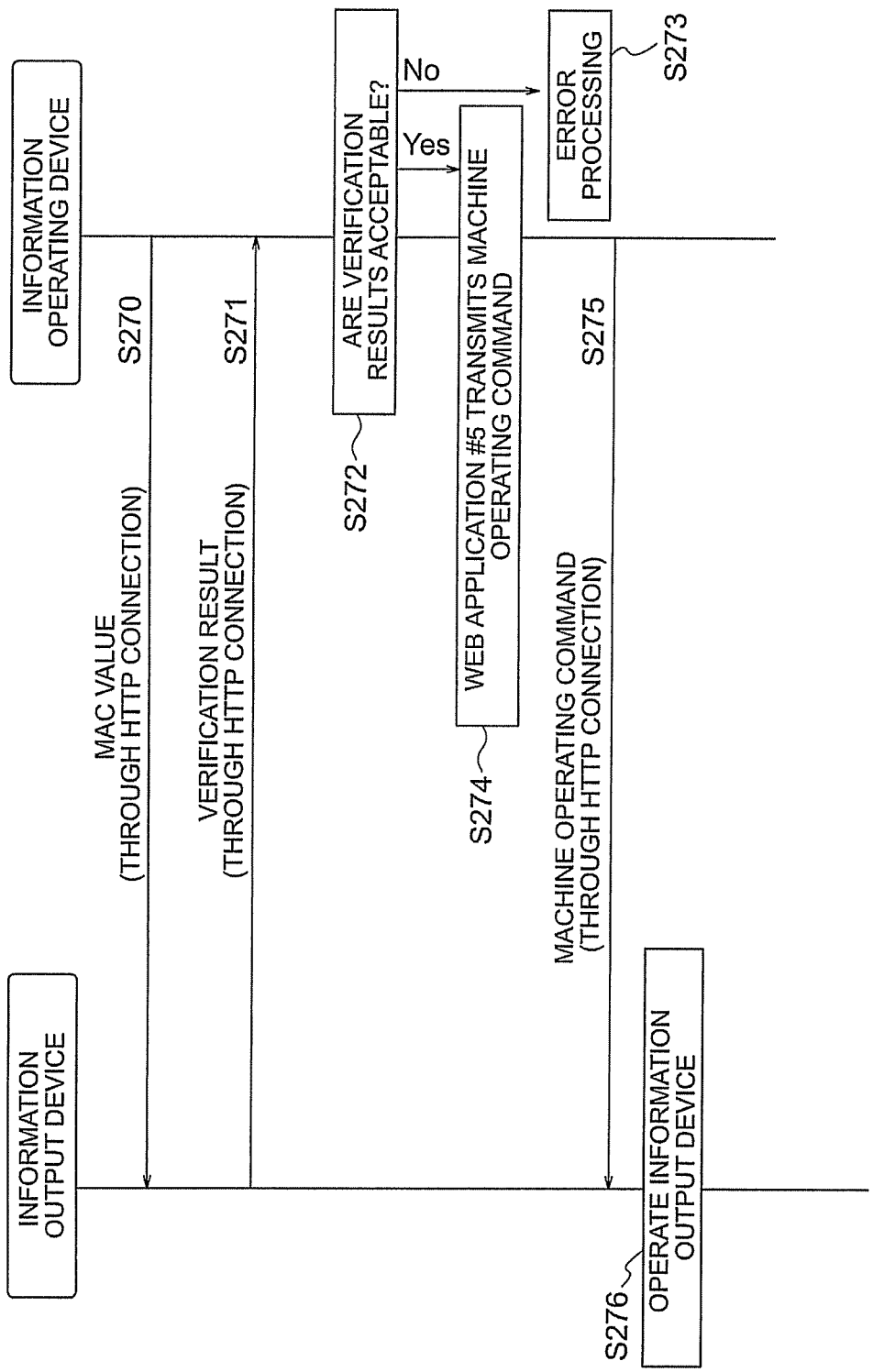
FIG. 59B is a sequence diagram showing a modification example derived from FIG. 59A.

In the examples shown in FIGS. 58A and 59A, the usage certificate, challenge (random numbers), MAC value, and machine operating command are transmitted and received using the WebSocket connection. However, these items may be transmitted and received through the HTTP connection (or HTTPS connection). The process flow in this case is shown in FIGS. 58B and 59B. These are the same as FIGS. 58A and 59A except that the protocol used for the connection is different.

As stated above, in the fifth embodiment, permissible machine operating commands are made different depending on each Web application, a plurality of Web applications in the same domain utilize the same usage certificate, and the information operating device 1 acquires a PIN input Web application from the PIN input Web application distribution server 4a. Further, instead of a plaintext PIN, a MAC value calculated by encrypting a PIN using a secret key shared between the information operating device 1 and the information output device 2 is transmitted from the information operating device 1 to the information output device 2. Accordingly, even if an illegitimate machine exists between the information operating device 1 and information output device 2, the PIN of the user can be protected from being acquired by the illegitimate machine.

At least a part of the information operating device 1, information output device 2, Web application distribution server 4, PF application distribution server 5, and usage certificate distribution server 6 explained in the above embodiments may be formed of hardware or software. In the case of software, a program realizing at least a partial function of the devices and servers may be stored in a recording medium such as a floppy disc, CD-ROM, etc. to be read and executed by a computer. The recording medium is not limited to a removable medium such as a magnetic disk, optical disk, etc., and may be a fixed-type recording medium such as a hard disk device, memory, etc.

Further, a program realizing at least a partial function of the information operating device 1, information output device 2, Web application distribution server 4, PF application distribution server 5, and usage certificate distribution server 6 can be distributed through a communication line (including radio communication) such as the Internet 8. Furthermore, this program may be encrypted, modulated, and compressed to be distributed through a wired line or a radio link such as the Internet 8 or through a recording medium storing it therein.

Here, explanation will be given on the scenes where the invention according to the above embodiments can be utilized.

Mobile terminals called tablets or smartphones and widely used in recent years have a function of establishing a connection with the Internet through a wireless LAN or a 3G network. Such a terminal generally has a Web browser, and the user can easily input characters, scroll the screen, and select a link (hyperlink) embedded in a Web page, by using a touch pad. Further, the user can freely customize the terminal and add/expand the functions of the terminal by downloading application software (hereinafter referred to as application) from the Internet.

On the other hand, digital TVs having functions concerning Internet connection and Web browsing and becoming popular in recent years can receive not only broadcast waves but also video content from the Internet. The digital TV is excellent in that a high-definition audiovisual content such as digital broadcasting can be displayed in a large screen. However, the infrared remote controller for operating the digital TV is originally intended to select the channel of a broadcast program and to adjust volume, and thus its keys are generally used only for direct channel tuning and up/down operation.

However, when operating a Web browser to utilize Internet functions or when selecting a specific content item from a recorded content list on the TV, it is required to select an arbitrary item from a plurality of list items or to point (click) an arbitrary part on the screen like a mouse for PC. Thus, the functions of the conventional infrared remote control are not enough.

On the other hand, smartphones and tablets are generally equipped with a wireless LAN interface since those devices are made to be connected to the Internet as a matter of course. Further, since those devices have a touch pad interface, users can easily select (click) an arbitrary point, and expand/reduce an arbitrary part on the screen (pinch operation). It is convenient if the users can utilize the touch pad interface of the smartphones or tablets as a remote control for TV by connecting these devices and TV through a wireless LAN interface.

Here, security should be considered. In the case of infrared remote control, the distance between an available TV and a remote control is limited according to the physical characteristics of infrared rays. Further, it is impossible to add functions to a general infrared remote control after it is assembled.

However, when a smartphone or a tablet is connected to a TV through a wireless LAN interface to operate the TV from an application downloaded to the smartphone or tablet, there is a likelihood that an illegitimate application operates the TV or a remote control application freely operates the TV regardless of the user's intention. In such a case, the invention according to the above embodiments makes it possible to operate an information output device from an information operating device while preventing the information output device from being freely operated without the user's permission, which leads to improvement in convenience.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information operating device being coupled to a hardware processor and memory, comprising:
    a first connection unit to establish a first connection for acquiring a machine operating web application and a PIN code input web application from a first communication device;
    a second connection unit to establish a second connection for transmitting, to an information output device, a machine operating command for operating functions of the information output device and a usage certificate certifying that the machine operating web application requesting transmission of the machine operating command has been acquired from a legitimate first communication device, the usage certificate including origin information regarding an origin of the machine operating web application;
    a domain name attacher to attach a domain name of the first communication device transmitting the machine operating web application to a header of the second connection with the information output device, when the second connection is established by the second connection unit to transmit the machine operating command for operating the information output device using the second connection;
    an application executing unit to execute the PIN code input web application acquired from the first communication device through the first connection unit, execute the machine operating web application acquired through the first connection unit, and receive, from the first communication device, a usage certificate for the machine operating web application;
    an encryption information generator to generate encryption information and transmit the encryption information to the information output device, the encryption information being generated using a common key shared with the information output device, based on random numbers and a PIN code inputted by a user as the result of the execution of the PIN code input web application; and
    a client processing unit to transmit the usage certificate and the encryption information to the information output device through the second connection unit, and transmit the machine operating command included in the machine operating web application to the information output device through the second connection unit if the usage certificate and the encryption information are judged to be legitimate based on inspection performed by the information output device.

2. An information operating device being coupled to a hardware processor and memory, comprising:
    a first connection unit to establish a connection for acquiring a web application from a first communication device;
    a second connection unit to establish a connection for transmitting, to an information output device, a machine operating command for operating functions of the information output device and a usage certificate certifying that the web application requesting transmission of the machine operating command has been acquired from a legitimate first communication device, the usage certificate including origin information regarding an origin of the web application;
    a domain name attacher to attach a domain name of the first communication device transmitting the machine operating web application, when the second connection unit transmits the machine operating command for operating the information output device;
    an application executing unit to execute the web application acquired through the first connection unit, follow a command included in the web application to transmit a usage-certificate transmission request message for the web application to a second communication device which issues the usage certificate through the first connection unit, and receive the usage certificate issued by the second communication device based on first identification information for identifying the web application, second identification information for identifying the information output device, and third identification information related to the information output device specified through user input, each of the first, second, and third identification information being included in the transmission request message; and
    a client processing unit to transmit the machine operating command and the usage certificate for the web application to the information output device through the second connection unit.

3. The device of claim 2,
wherein the usage-certificate transmission request message includes the first identification information, the second identification information, and a PIN code unique to the information output device used for the user input, and
the usage certificate includes the first identification information, origin information regarding origin-of the web application and signature information generated by performing public key encryption on the first identification information, the second identification information, the PIN code and the origin information using a secret key of the second communication device.

4. The device of claim 1,
wherein the usage certificate includes list information about the machine operating command to be permitted.

5. The device of claim 4,
wherein the application executing unit has a verification unit to verify whether a uniform resource locator (URL) address regarding origin of the machine operating web application corresponds to the origin information included in the usage certificate received by the application executing unit, and
in response to determining that the URL address regarding the origin of the machine operating web application does not correspond to the origin information included in the usage certificate received by the application executing unit, the second connection unit prohibits establishing the connection for transmitting the machine operating command and the usage certificate to the information output device.

6. The device of claim 2,
wherein before transmitting the machine operating command, the second connection unit transmits a domain name of a uniform resource locator (URL) address of the first communication device from which the web application is acquired, the domain name being transmitted attached to a header.

7. The device of claim 1, further comprising:
a first application acquisition unit to acquire an application including at least a uniform resource locator (URL) and an executable file including a command depending on an operating system or a virtual machine from a third communication device through the first connection unit,
the application executing unit comprising:
a first application executing unit to execute the application acquired by the first application acquisition unit from the third communication device through the first connection unit, follow a command included in the application to acquire a URL address which indicates a location of a web application, and starts a second application executing unit; and
a browsing unit to acquire, through the first connection unit, the corresponding web application from the URL address acquired by the first application executing unit, and execute the corresponding web application by the second application executing unit.

8. The device of claim 2, further comprising:
a third connection unit to establish a connection for acquiring identification information of the information output device,
wherein the second connection unit establishes a connection for transmitting the machine operating command arid the usage certificate to the information output device, based on the identification information of the information output device acquired by the third connection unit.

9. The device of claim 2,
wherein the second communication device is provided in the Information output device.

10. The device of claim 1,
wherein the first connection unit establishes a hypertext transfer protocol (HTIP) connection, and the second connection unit establishes a WebSocket connection.

11. The device of claim 1,
wherein the client processing unit is incorporated into the application executing unit, and the application executing unit performs processes of the client processing unit.

12. An information output device being coupled to a hardware processor and memory, comprising:
a connection unit to establish a connection for receiving a usage certificate, a machine operating command for operating functions of the information output device, and an encryption information from an information operating device;
an application source inspection unit to, when receiving the machine operating command by the connection unit, receive a domain name expressing a source of a machine operating web application, and inspect whether the domain name is included in a domain name included in the usage certificate including origin information regarding an origin of the machine operating web application, the domain name being attached to a header of a connection when a domain name attacher in the information operating device establishes tile connection by the connection unit;
a PIN code management unit to manage a PIN code;
a public key management unit to manage a public key for verifying a signature included in the usage certificate;
a usage certificate inspection unit to verify whether the usage certificate received from the information operating device is genuine by using the public key;
a challenge generator to generate random numbers;
an encryption information inspection unit to generate encryption information using the PIN code, the random numbers, and a common key shared with the information output device in order to inspect whether the encryption information corresponds to the encryption information received from the information operating device; and
a machine operating command processing unit to execute the machine operating command received from the information operating device only when the inspection performed by the application source inspection unit and the inspection by the encryption information inspection unit are successful.

13. An information output device being coupled to a hardware processor and memory, comprising:
a first connection unit to establish a first connection for communicating with a second communication device;
a second connection unit to establish a second connection for receiving a machine operating command transmitted from an information operating device, a usage certificate certifying that a web application including a transmission request of the machine operating command is acquired from a legitimate first communication device, and origin information regarding origin of the web application including transmission request of the machine operating command, the machine operating command operating functions of the information output device, the origin information including a domain name being attached to a header of the second connection when a domain name attacher in the information operating device establishes the second connection by the second connection unit;
a public key management unit to register identification information unique to the information output device in the first communication device through the first connection unit, receive a public key as' a response to the registration, and manage the public key;
a PIN code management unit to manage a PIN code;
a usage certificate inspection unit to verify a signature attached to the usage certificate received through the second connation unit, by using the public key and the PIN code;
a source inspection unit to inspect whether the origin information included in a header of the second connection received by the second connection unit to show origin of the web application including transmission request of the machine operating command corresponds to the origin information of the web application, the origin information being included in the usage certificate; and
a machine operating command processing unit to permit executing the machine operating command only when the verification performed by the usage certificate inspection unit and the inspection performed by the source inspection unit are successful.

14. The device of claim 13, further comprising:
a third connection unit to establish a third connection for transmitting identification information of the information output device, responding to a request from the information operating device.

15. The device of claim 12,
wherein the first connection unit establishes a hypertext transfer protocol (HTTP) connection, and the second connection unit establishes a WebSocket connection.

16. The device of claim 12,
wherein the usage certificate includes an operating command list, and when the verification performed by the usage certificate inspection unit and the inspection performed by the source inspection unit are successful, the machine operating command processing unit inspects whether the machine operating command transmitted from the information operating device is included in the operating command list, and if included, the machine operating command processing unit permits executing the machine operating command.

17. An information operating device being coupled to a processor and memory, comprising:
a first connection unit to establish a first connection for acquiring a machine operating web application and a PIN code input web application from a first communication device;
a second connection unit to establish a second connection for transmitting, to the information output device, a machine operating command for operating functions of the information output device and a usage certificate including first origin information regarding origin of the machine operating web application;
a domain name attacher to attach a domain name of the first communication device transmitting the machine operating web application, when the second connection unit transmits the machine operating command for operating the information output device;
an application executing unit to execute the PIN code input web application acquired from the first communication device through the first connection unit, execute the machine operating web application acquired through the first connection unit, and receive, from the first communication device, a usage certificate for the machine operating web application;
an encryption information generator to generate encryption information and transmit the encryption information to the information output device, the encryption information being generated using a common key shared with the information output device, based on random numbers and the PIN code inputted by a user responding to the executed PIN code input web application; and
a client processing unit to transmit the usage certificate and the encryption information to the information output device through the second connection unit, and transmit the machine operating command included in the machine operating web application to the information output device through the second connection unit if the usage certificate and the encryption information are judged to be legitimate based on inspection performed by the information output device,
wherein the client processing unit corresponds to origin information regarding origin of the machine operating web application being executed.

18. An information processing method for processing a machine operating command transmitted from an information operating device to an information output device, comprising:
establishing a connection for receiving a usage certificate including origin information regarding an origin of a machine operating web application, a machine operating command for operating functions of the information output device, and an encryption information transmitted from an information operating device by the information output apparatus;
when the information output device receives the machine operating command, receiving a domain name expressing a source of a machine operating web application, and inspecting whether the domain name is included in a domain name included in the usage certificate;
managing a PIN code;
managing a public key for verifying a signature included in the usage certificate; verifying whether the usage certificate transmitted from the information operating device to the information output device is genuine by using the public key; generating random numbers;
generating encryption information using the PIN code, the random numbers, and a common key shared with the information output device in order to inspect whether the encryption information corresponds to the encryption information transmitted from the information operating device to the information output device; and
executing the machine operating command transmitted from the information operating device to the information output device only when the domain name received by the information output device coincides with the domain name included in the usage certificate and the generated encryption information coincides with the encryption information received by the information output device.

* * * * *